United States Patent [19]

Young

[11] Patent Number: 4,564,798

[45] Date of Patent: Jan. 14, 1986

[54] BATTERY PERFORMANCE CONTROL

[75] Inventor: James E. Young, Newton, Mass.

[73] Assignee: Escutcheon Associates, Boston, Mass.

[21] Appl. No.: 433,049

[22] Filed: Oct. 6, 1982

[51] Int. Cl.$^4$ .............................................. H02J 7/00
[52] U.S. Cl. ........................................ 320/6; 320/18; 320/31; 320/48
[58] Field of Search .................. 320/6, 15, 17, 18, 39, 320/40, 48, 31

[56] References Cited

U.S. PATENT DOCUMENTS

| | | | |
|---|---|---|---|
| 3,786,343 | 1/1974 | Ehlers | 320/48 X |
| 3,872,457 | 3/1975 | Ray et al. | 320/48 X |
| 3,928,791 | 12/1975 | Mullersman | 320/18 X |
| 3,930,192 | 12/1975 | Dinkler | 320/17 X |
| 4,061,955 | 12/1977 | Thomas et al. | 320/18 X |
| 4,217,645 | 8/1980 | Barry et al. | 364/483 |

OTHER PUBLICATIONS

Alvin J. Salkind Associates, "Aluminum-Air Battery System Assessment of Technical and Market Viability for Electric Vehicle Application—Final Report", Dec. 1980; Upton, New York.

Ault Incorporated, "Proposal for an Advanced Power and Control System for Battery Powered Wheelchairs", Apr. 1980; Minneapolis, Minnesota.

Primary Examiner—R. J. Hickey

[57] ABSTRACT

A system for controlling a multi-cell battery having a first set of the cells thereof comprising an active partition adapted for connection to a load and a second set of the cells thereof not connected to the load and comprising a passive partition. Sensors in the cells monitor the temperature, vapor pressure, capacity, pH, current, and voltage of different cells. Signals representative of data values from the sensors are sent to controls which compare it to reference data values and switch cells from the active partition to the passive partition in response to changes in differences between the sensed and reference data values. Cells in the passive partition are recharged from reserve cells. The controls also provide read-outs of the amount of charge remaining in the battery and of the battery's remaining useful life.

83 Claims, 30 Drawing Figures

BATTERY PERFORMANCE CONTROL

BACKGROUND OF THE INVENTION

This invention relates to batteries and, more particularly, to a system for controlling the charge state of a multi-cell battery.

In recent years, there has been considerable effort directed to developing electric automobiles. One principal problem has been obtaining accurate information about the amount of energy still available in the batteries of such vehicles. Another has been to operate such vehicles in such a way that the energy in the batteries, and the batteries themselves, are used in an efficient manner. The present invention makes electric automobiles a possible and attractive option for the consumer.

One principal object of the present invention is to provide a system for controlling a multi-cell battery according to what I have found to be the six important operating parameters identifying the charge state of the battery, thus making it possible to operate the battery near its optimum level, prolong its life, and increase its efficiency. A second is to inform the operator of a battery-driven vehicle of the usable life-time (i.e., amount of charge) and number of cycle life times (i.e., the number of times the battery can be recharged from an external source) of the battery.

SUMMARY OF THE INVENTION

I have discovered that six primary operating parameters (cell temperature, vapor pressure, capacity, pH, current, and voltage) describe the electro-chemical state of a battery under load and that the operating efficiency of a battery can be greatly increased by holding the values of those operating parameters of battery cells connected to load within predetermined ranges about desired values. The present invention provides a system for monitoring selected ones of these six parameters while the battery is under load, disconnecting from the load battery cells whose operating parameter values are not within the predetermined ranges about desired values, restoring cells off-load to bring the values of their operating parameters to within the predetermined ranges, and reconnecting these cells to load only when the values of their operating parameters have been so restored.

According to the invention, the cells for a multicell battery are selectively switched between two partitions: an active partition which includes those cells connected to the load and a passive partition including those cells not connected to the load. Sensors within the cells of the two partitions of the battery ascertain operating values of different parameters during battery discharge. These parameters are compared to predetermined acceptable values. When the difference between sensed and acceptable values exceeds a predetermined difference, controls cause those battery cells which are operating too far from the acceptable levels to be switched off load and into the passive partition. Cells which were in the passive partition but are in good operating order are switched into the active partition to replace them. A reserve of cells, never connected to the load, charges cells in the passive partition to bring them up to acceptable operating levels.

Preferred embodiments feature also a master and two secondary controls (one for switching cells between partitions, i.e., into and out of the active and passive partitions, and the second for controlling restoration of cells in the passive partition) for controlling battery operation such that the values of the operating parameters of the battery under load together describes a point closely adjacent a desired operating surface in a hyperspace, the surface defined by the values of six putative operating parameters (dependent on time and the moment in battery discharge life) and the six operating parameters' permitted variances; a load monitor for monitoring the demands of the load and increasing or decreasing the number of cells connected to load in response to corresponding changes in demand; controls responsive to the sensed capacity, pH, temperature and vapor pressure of cells in the passive partition for restoring such parameters to desirable levels; and light-emitting diodes responsive to the controls which inform the operator of the battery when the individual cells can no longer be restored or recharged from the reserve cells and the entire battery must be recharged from an external source, and when recharging the battery from an external source is no longer effective and the entire battery must be replaced.

In such preferred embodiments, cells are monitored and switched in multiple cell units; cell-units in the active partition are not switched off-load unless a cell-unit monitoring of two related parameters (typically temperature and pressure or cell capacity and pH) indicates that the sensed value of at least one parameter differs significantly from its predetermined desired value, and further unless a measure of the conjoint difference between the sensed and desired values of both related parameters also exceeds a predetermined level; cell-units in the passive partition are first recharged from the reserve cells to increase their cell capacity to the predetermined desired capacity value and, if required, the cell-units' pressure, pH and/or temperature are then adjusted to bring the cell units' sensed parameter values closer to the desired values; and the predetermined desired values of the operating parameters are periodically up-dated from point-to-point on the desired operating surface as the battery ages.

Other objects, features, and advantages of the present invention will appear from the following detailed description of embodiments thereof, taken together with the attached drawings in which.

Figure 6:
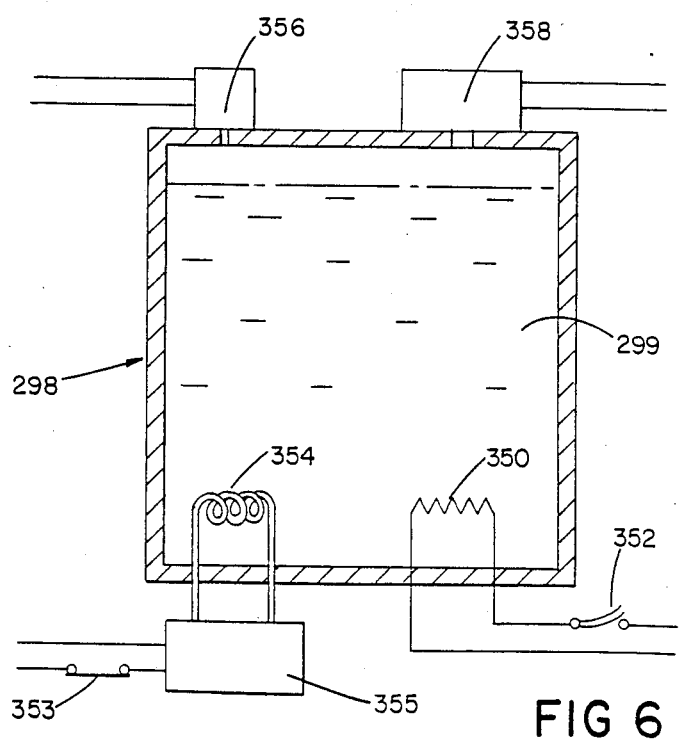

FIG. 6 schematically illustrates cell restoration.

Figure 7:
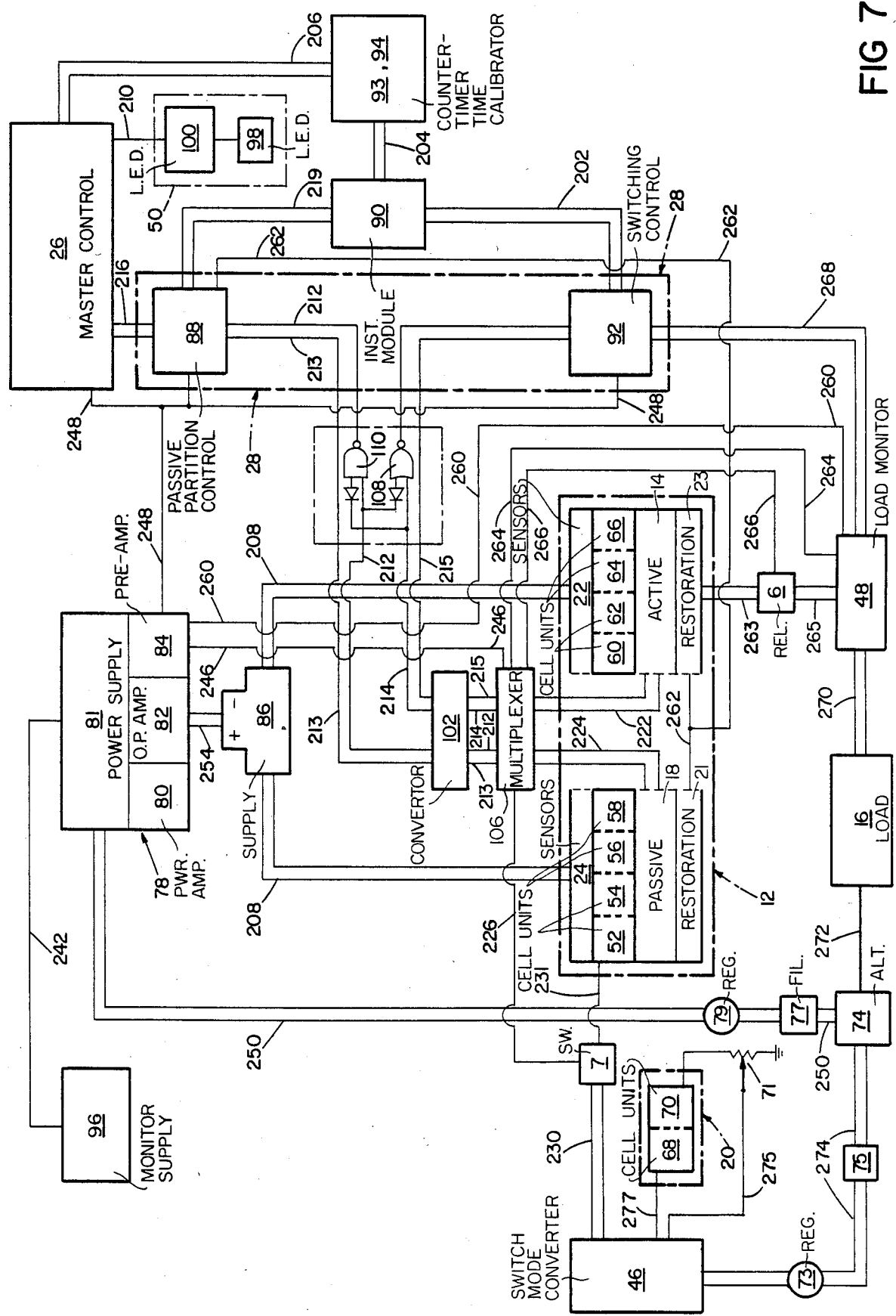

FIG. 7 is a diagrammatic view of a preferred embodiment.

Figure 8:
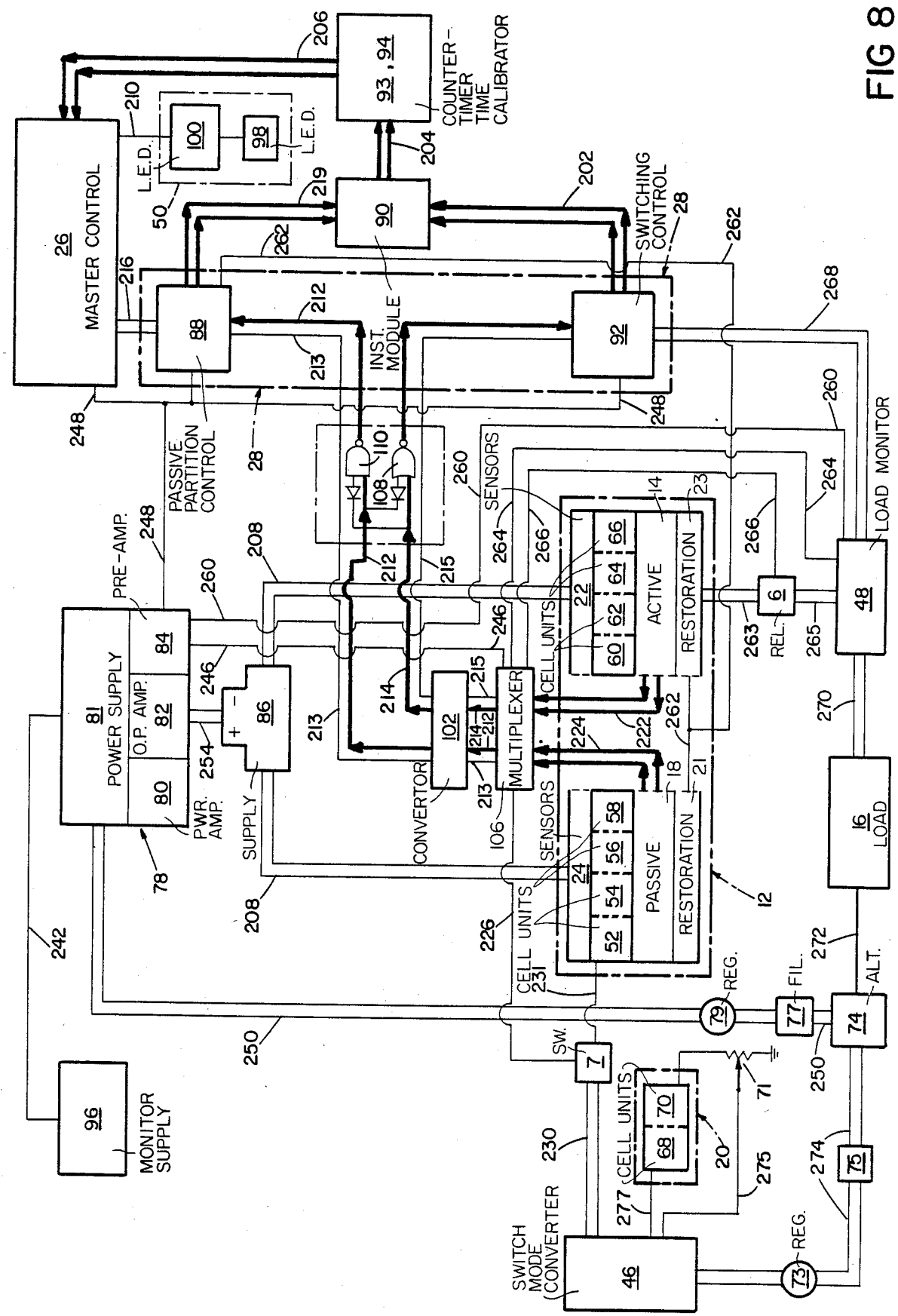

FIG. 8 shows diagrammatically the flow of active and passive sensor data of the preferred embodiment.

Figure 9:
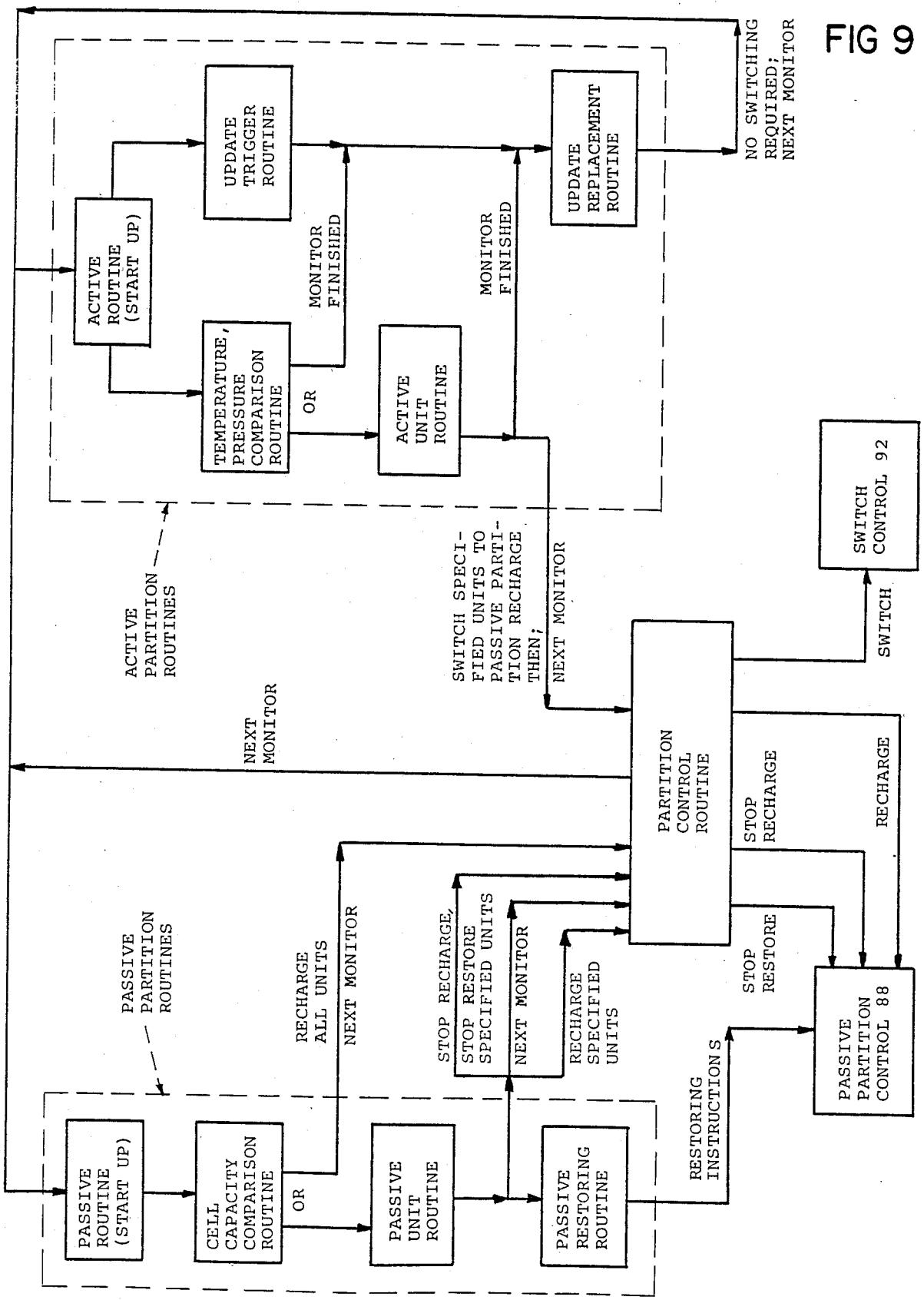

FIG. 9 is an overview diagram showing generally the passive routines, the active monitoring and updating routines, and the partition control routines.

FIGS. 10, 12–13, 15–29 show diagrammatically control routines of the preferred embodiment.

Figure 10:
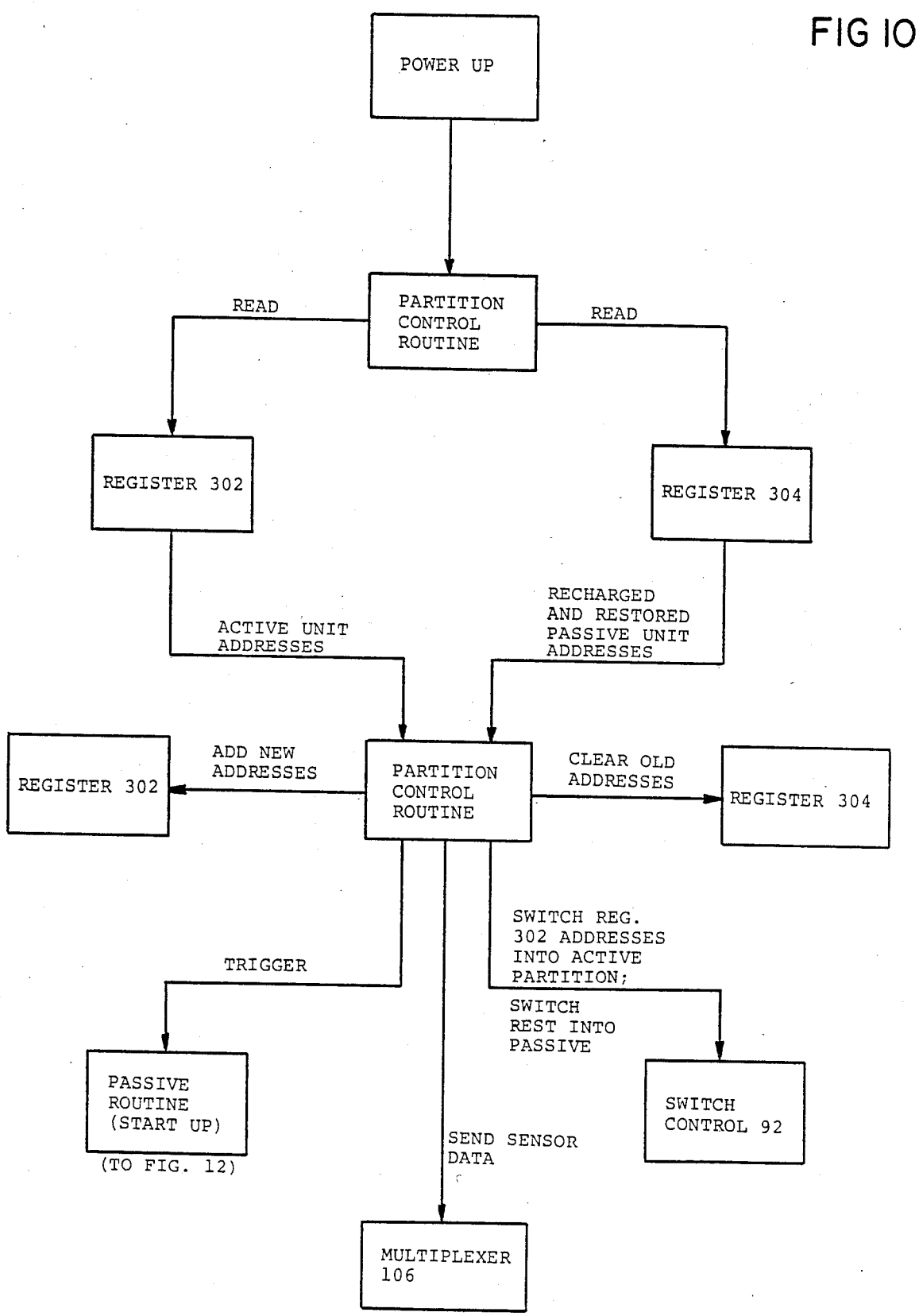

FIG. 10 shows one initializing routine.

Figure 11:
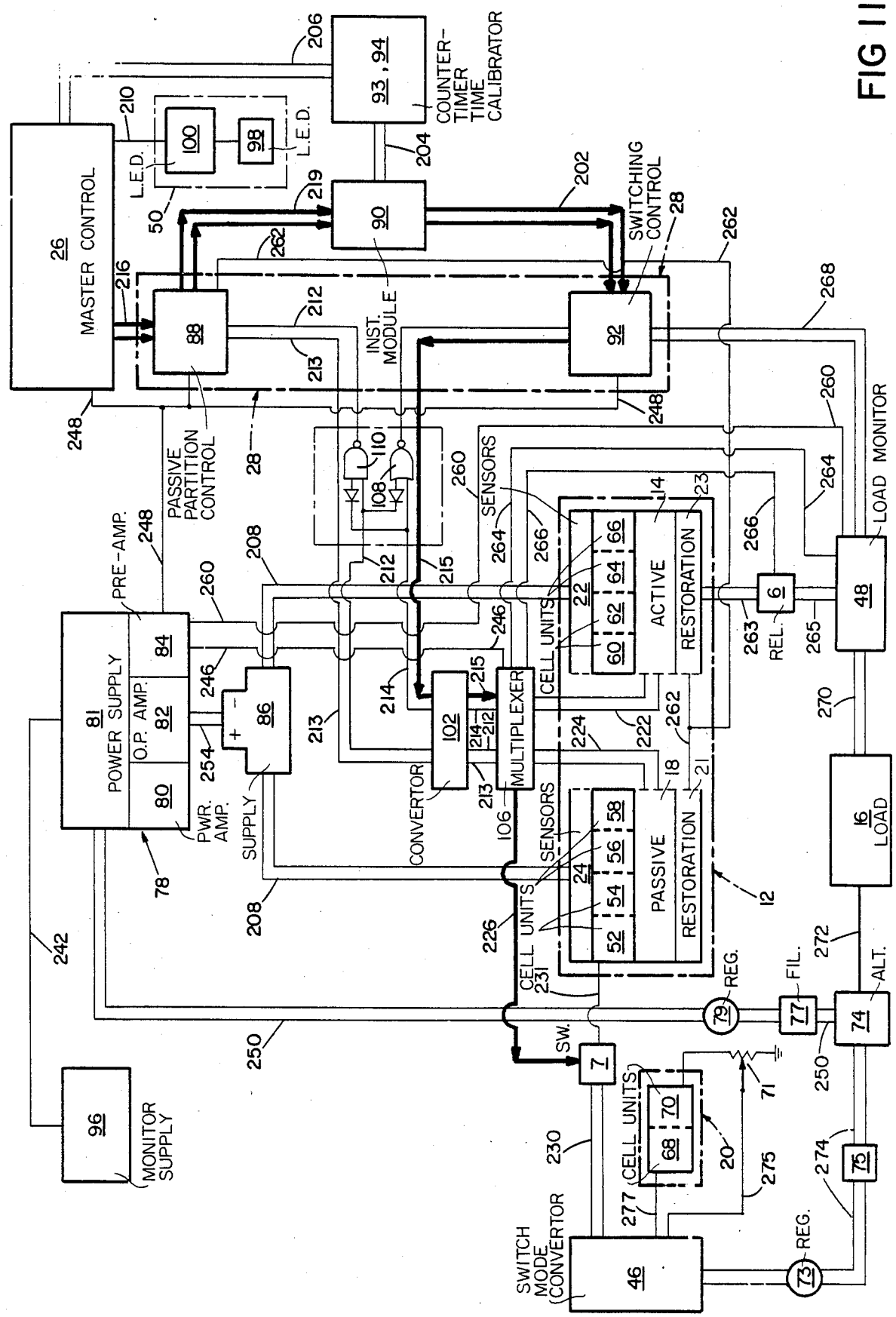

FIG. 11 shows diagrammatically change partition instructions.

Figure 12:
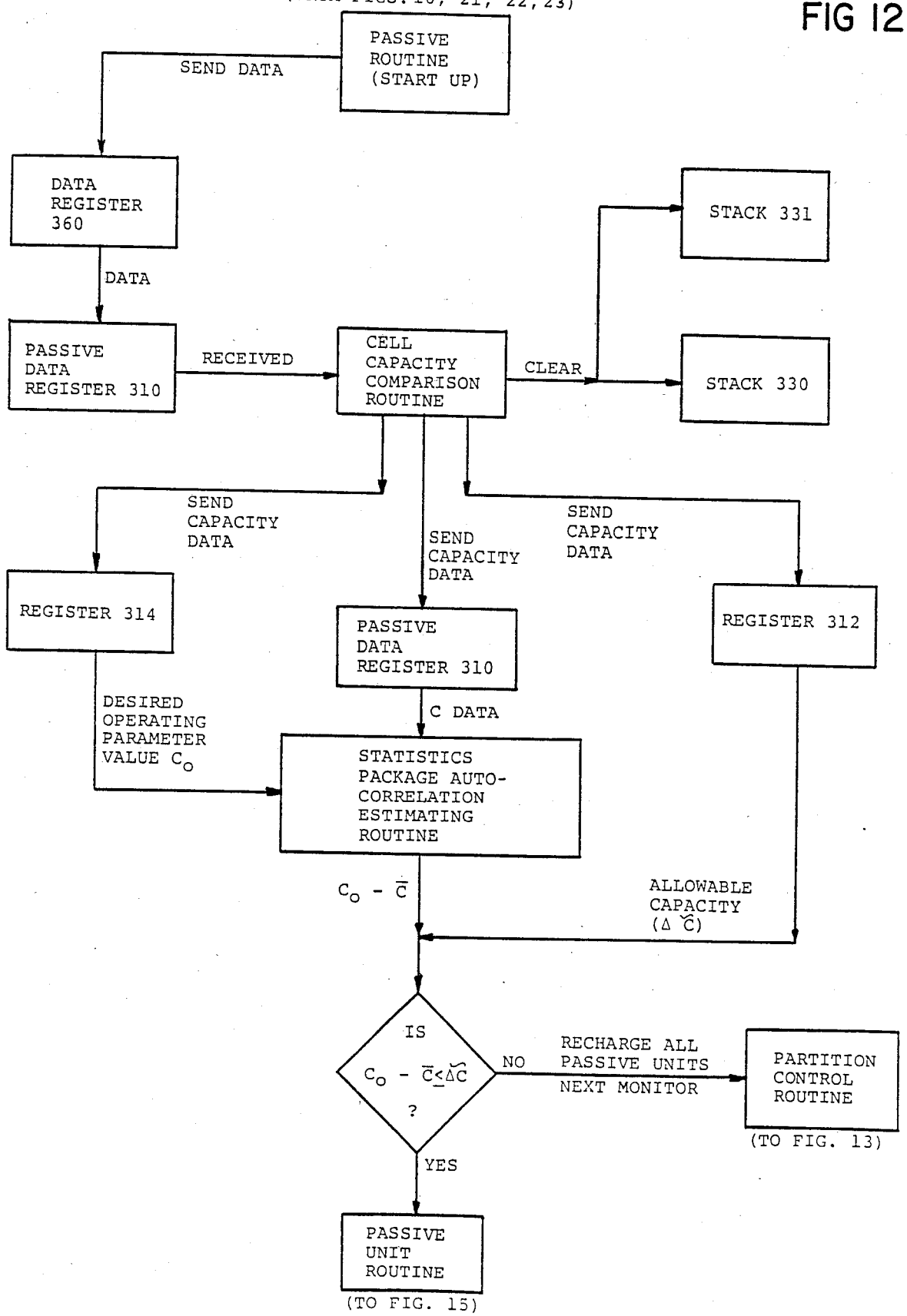

FIG. 12 shows the passive routine's start up and cell capacity comparison routines.

Figure 13:
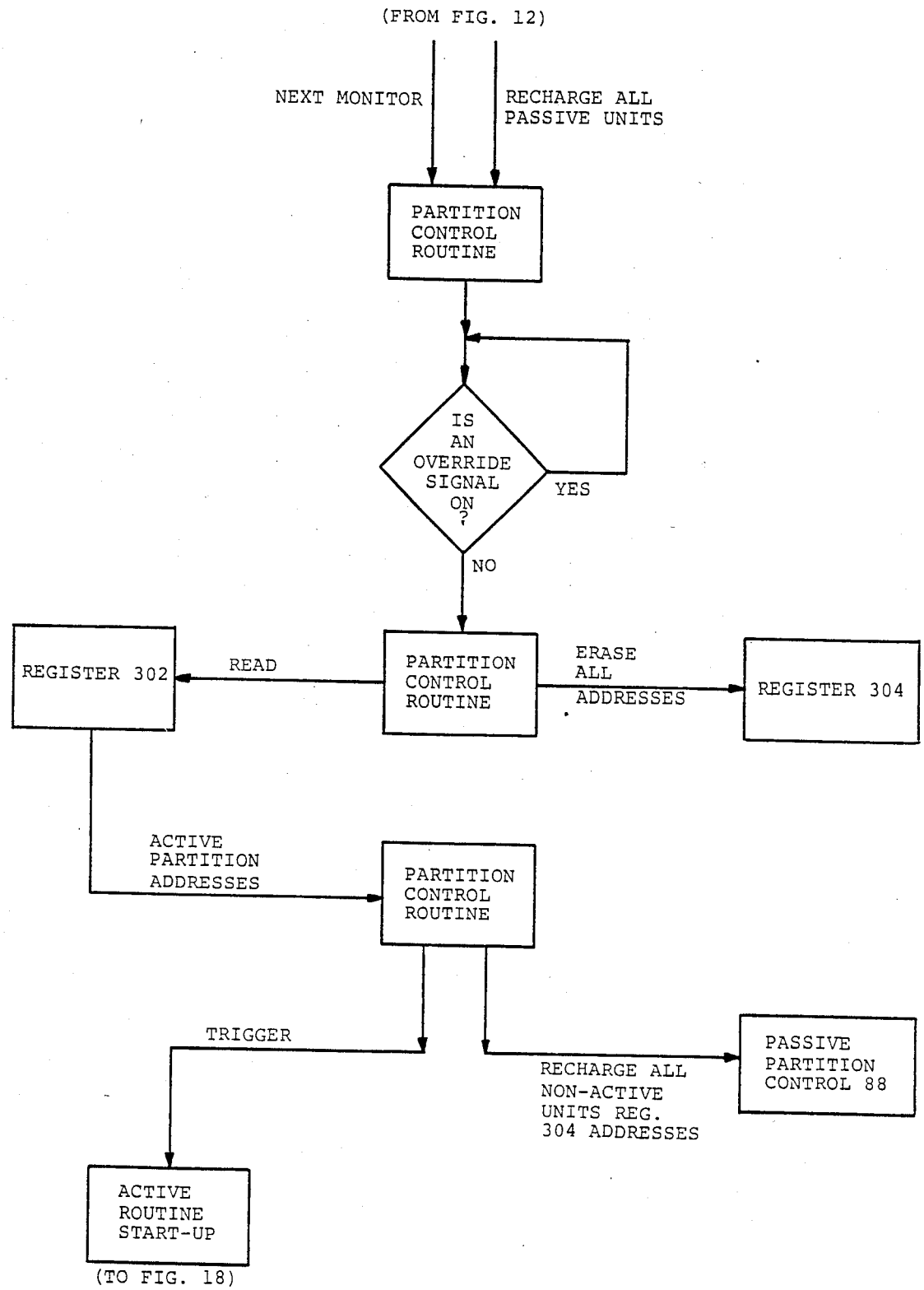

FIG. 13 shows the unrecharged passive partition control routine.

Figure 14:
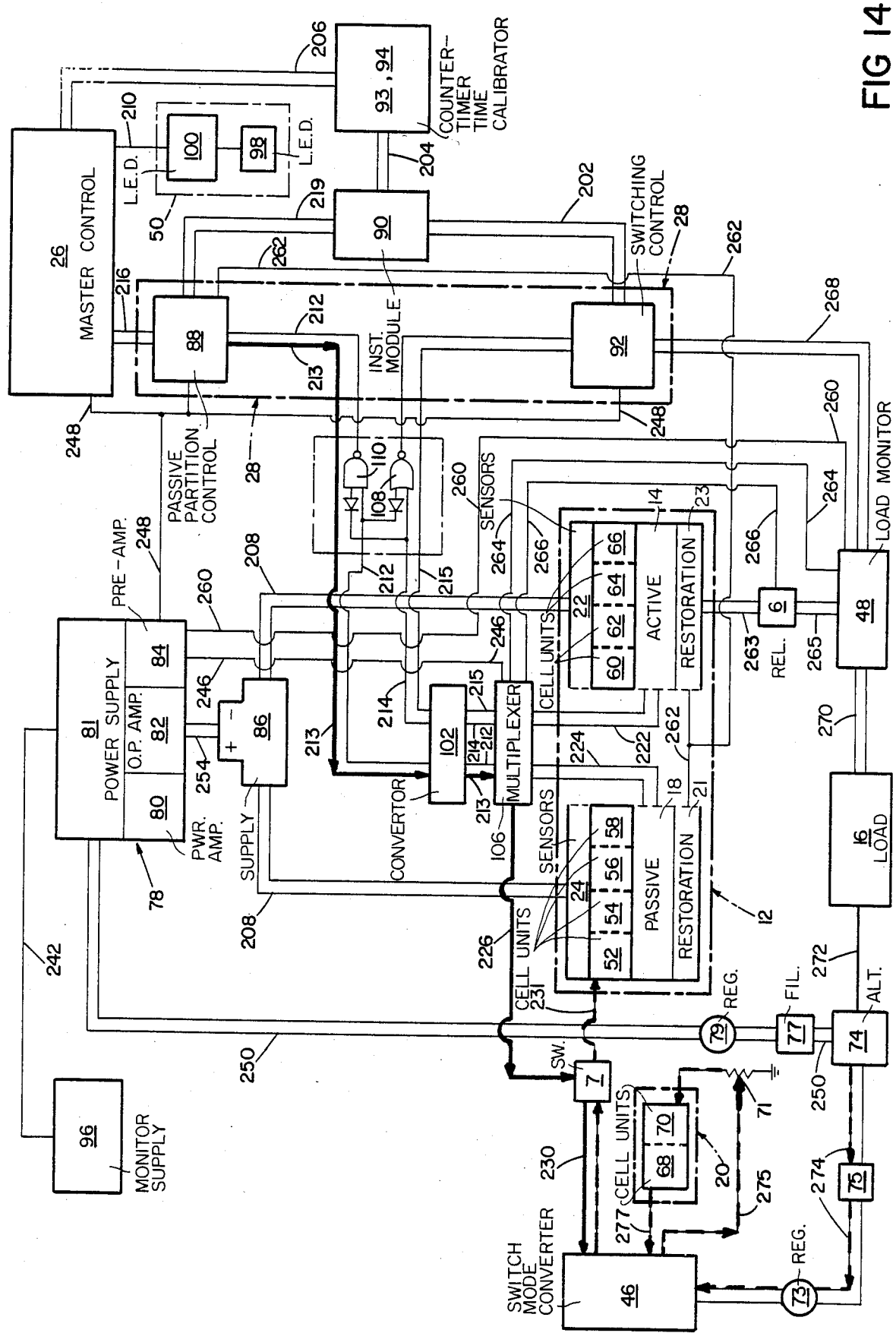

FIG. 14 shows diagrammatically the passive partition restoration instructions of the preferred embodiment.

Figure 15:
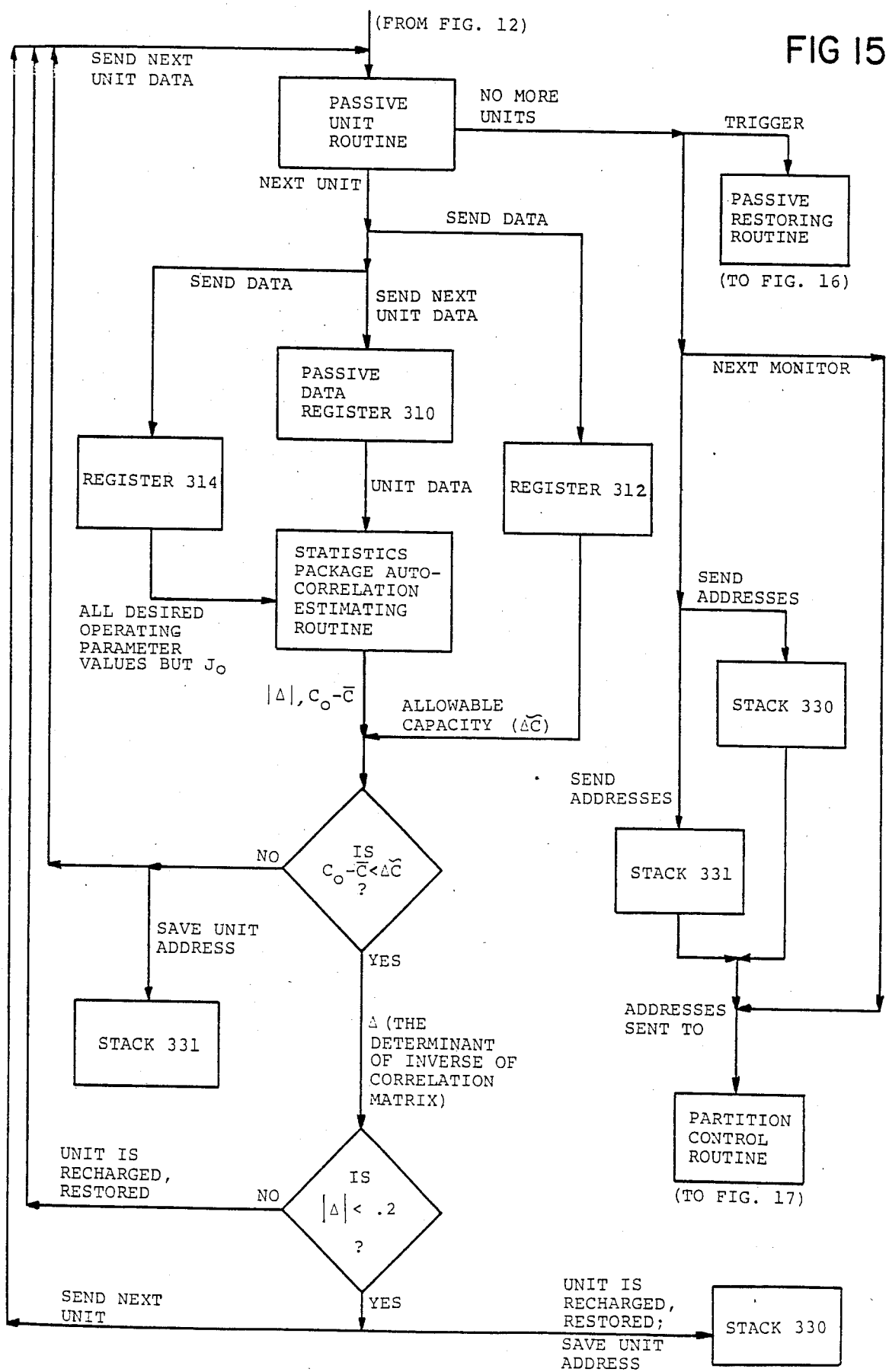

FIG. 15 shows the passive unit monitoring routine.

Figure 16:
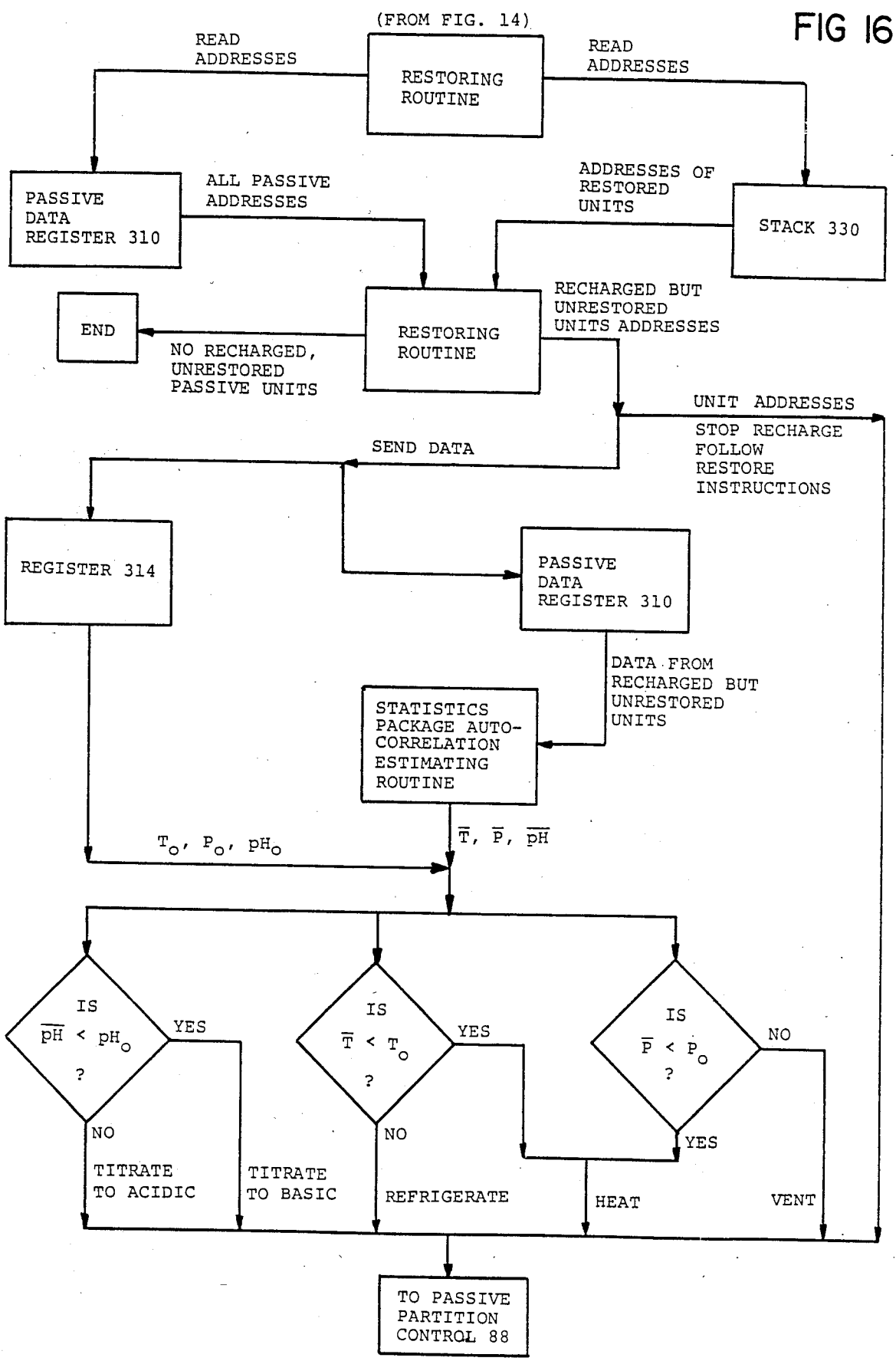

FIG. 16 shows the passive restoring routine.

Figure 17:
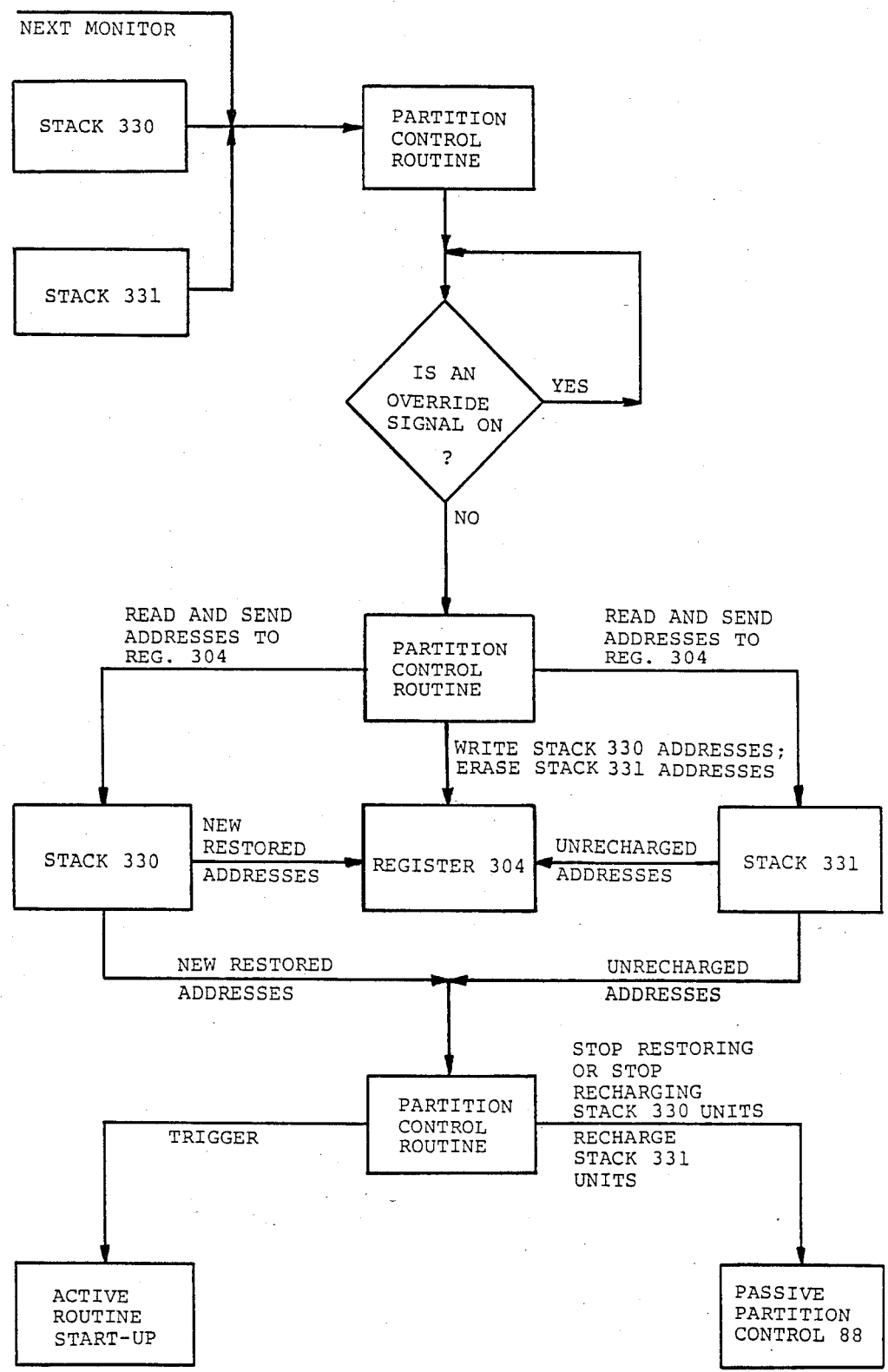

FIG. 17 shows the restored passive unit partition control routine.

Figure 18:
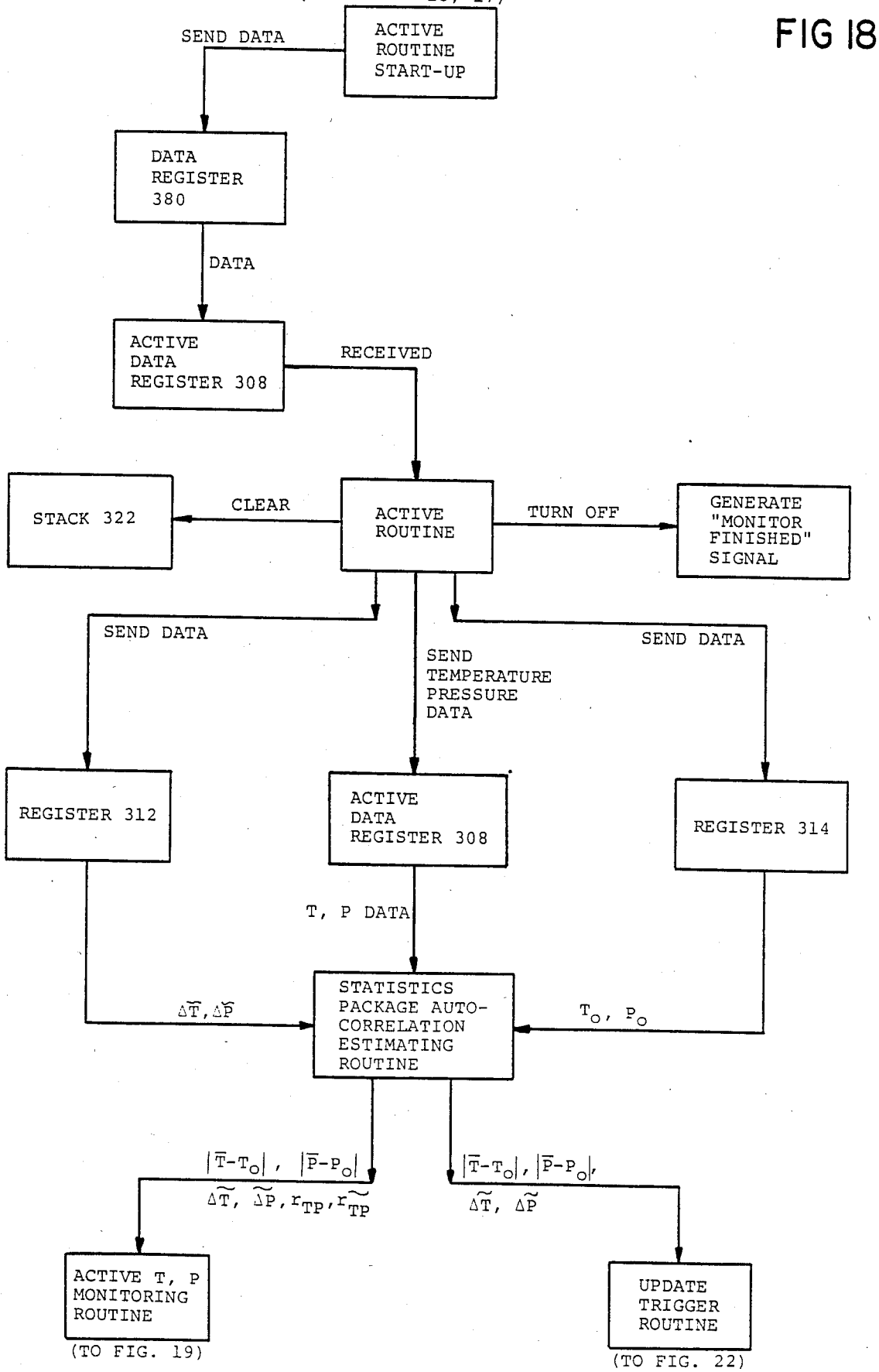

FIG. 18 shows the active routines' start up routine.

Figure 19:
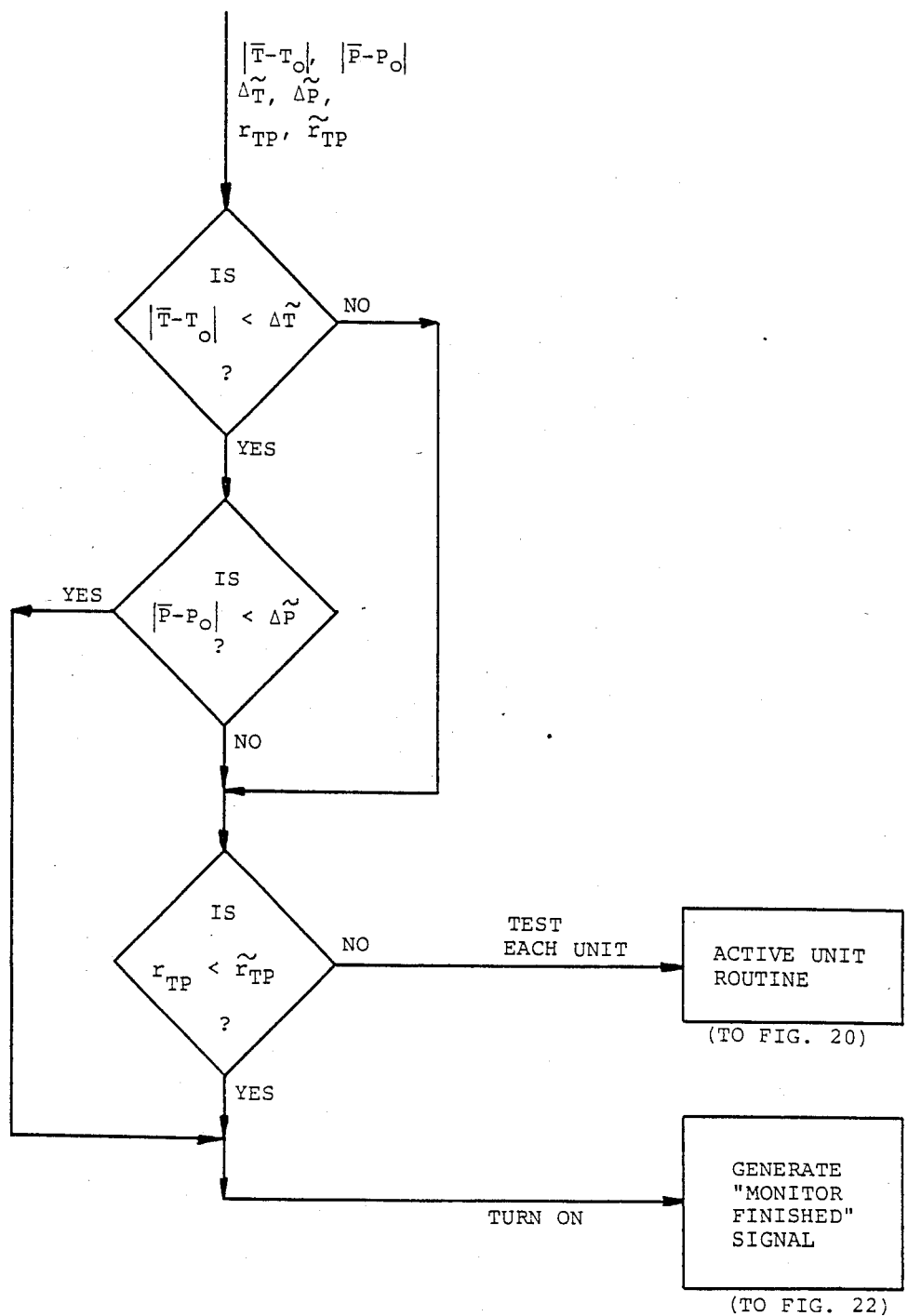

FIG. 19 shows the active temperature and pressure monitoring routine.

Figure 20:
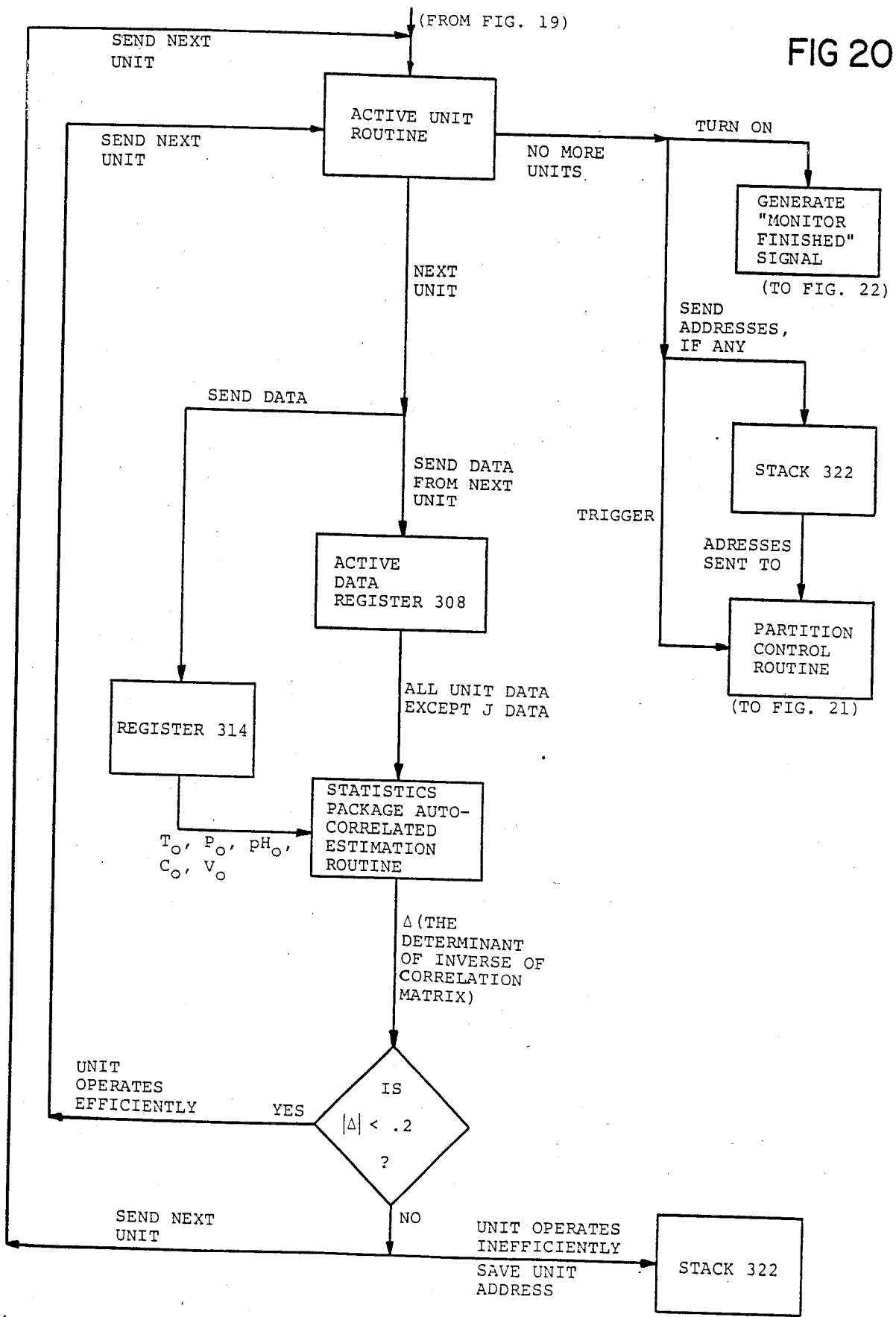

FIG. 20 shows the active unit monitoring routine.

Figure 21:
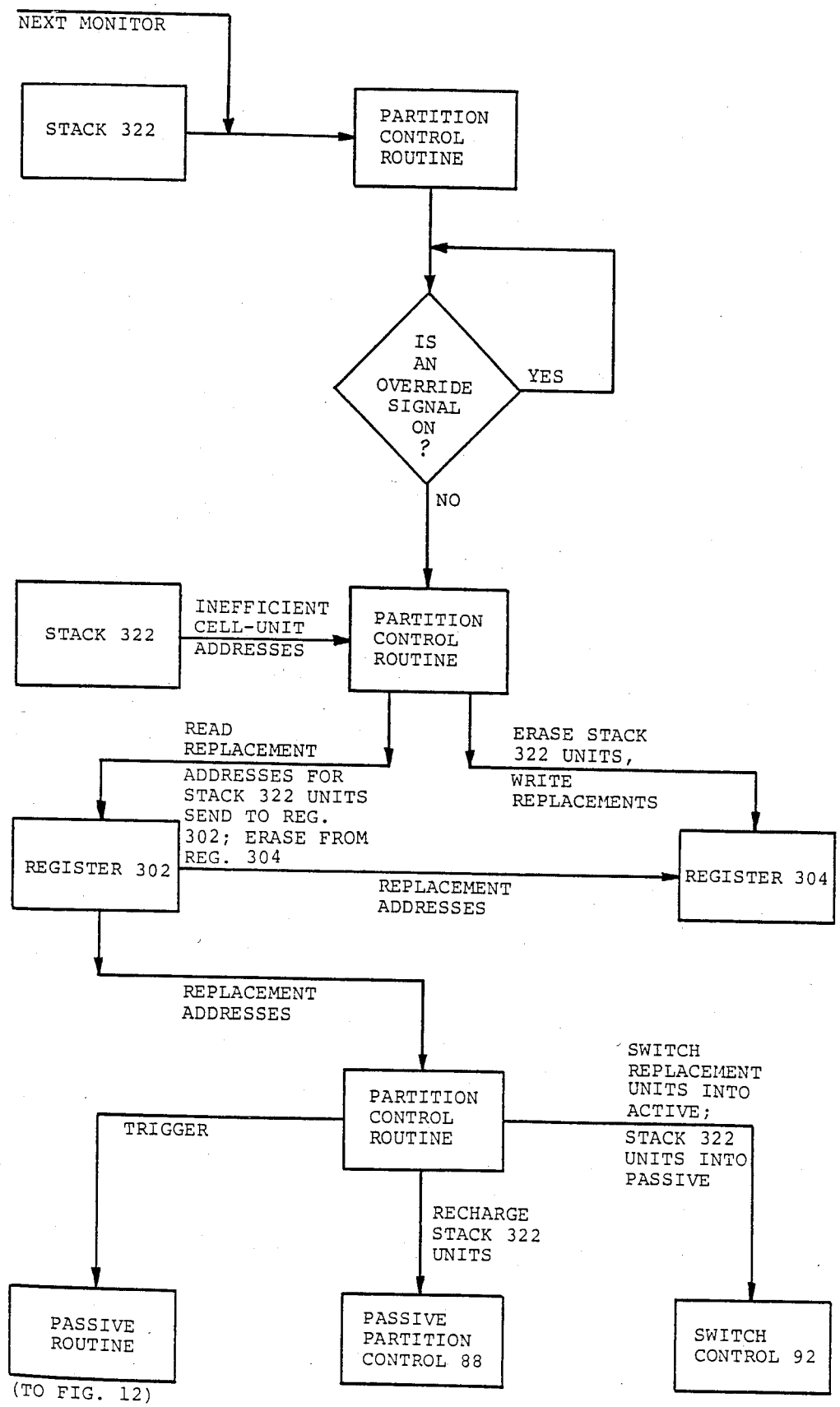

FIG. 21 shows the active to passive partition control routine.

Figure 22:
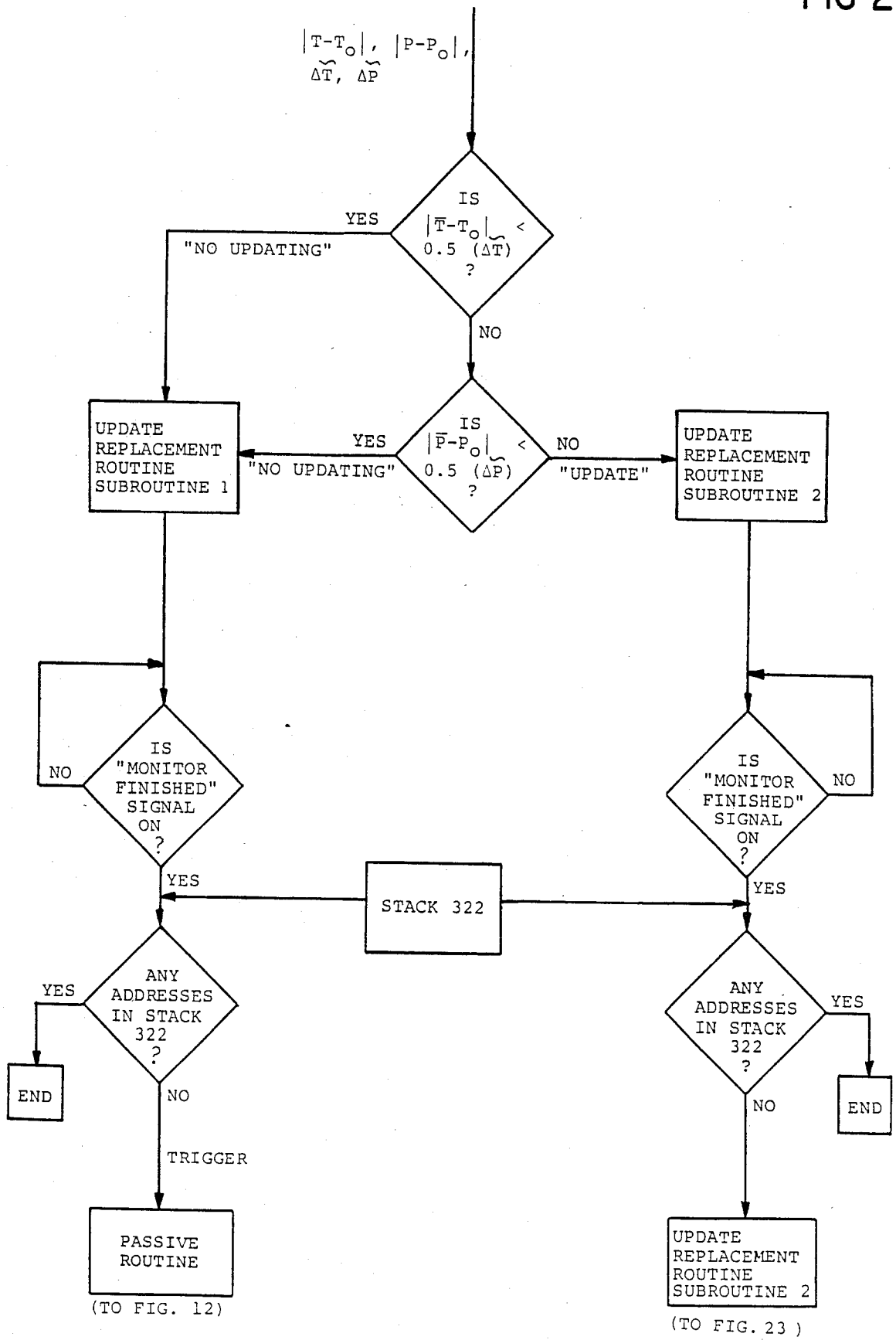

FIG. 22 shows the update trigger routine.

Figure 23:
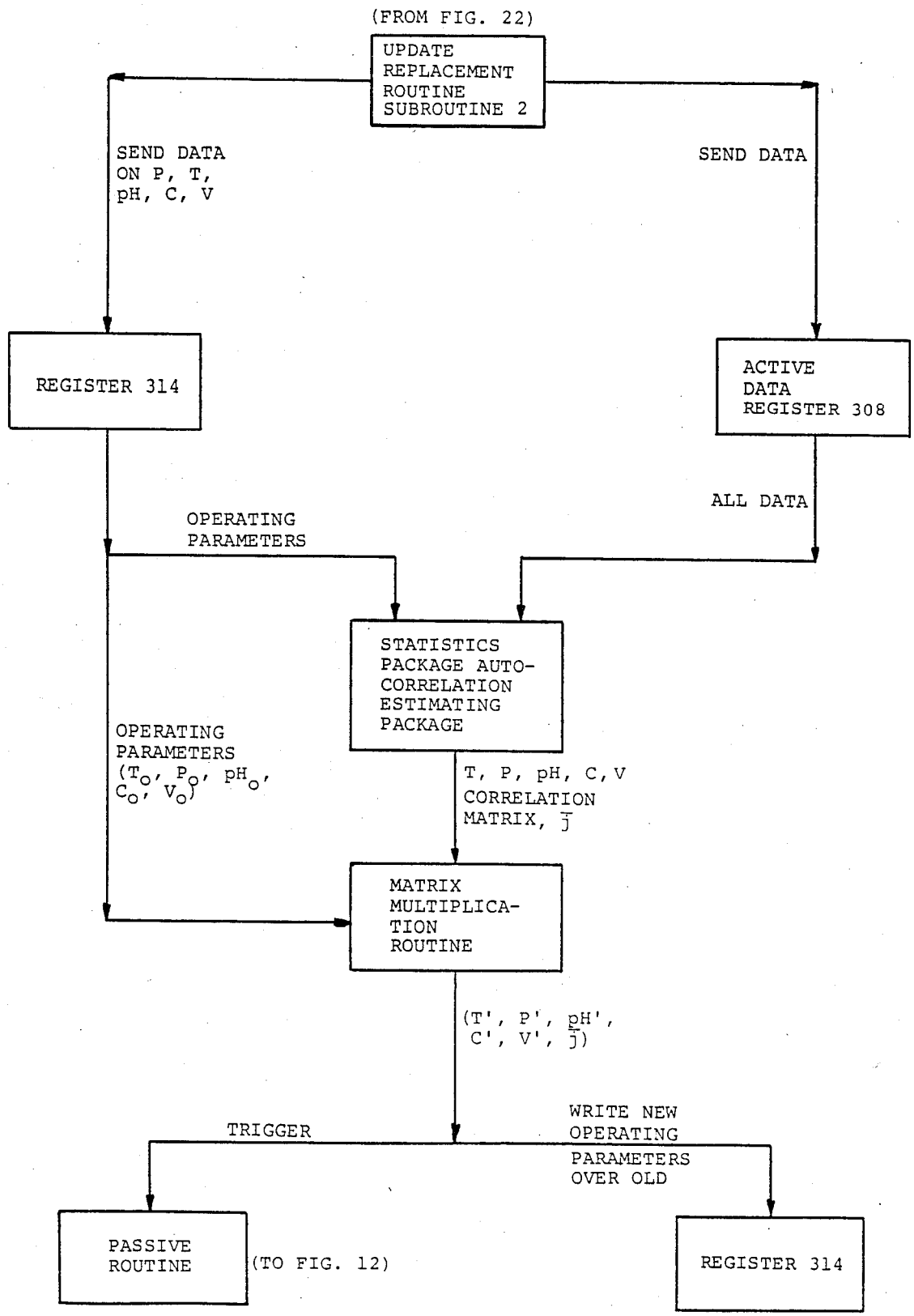

FIG. 23 shows the update replacement routine.

Figure 24:
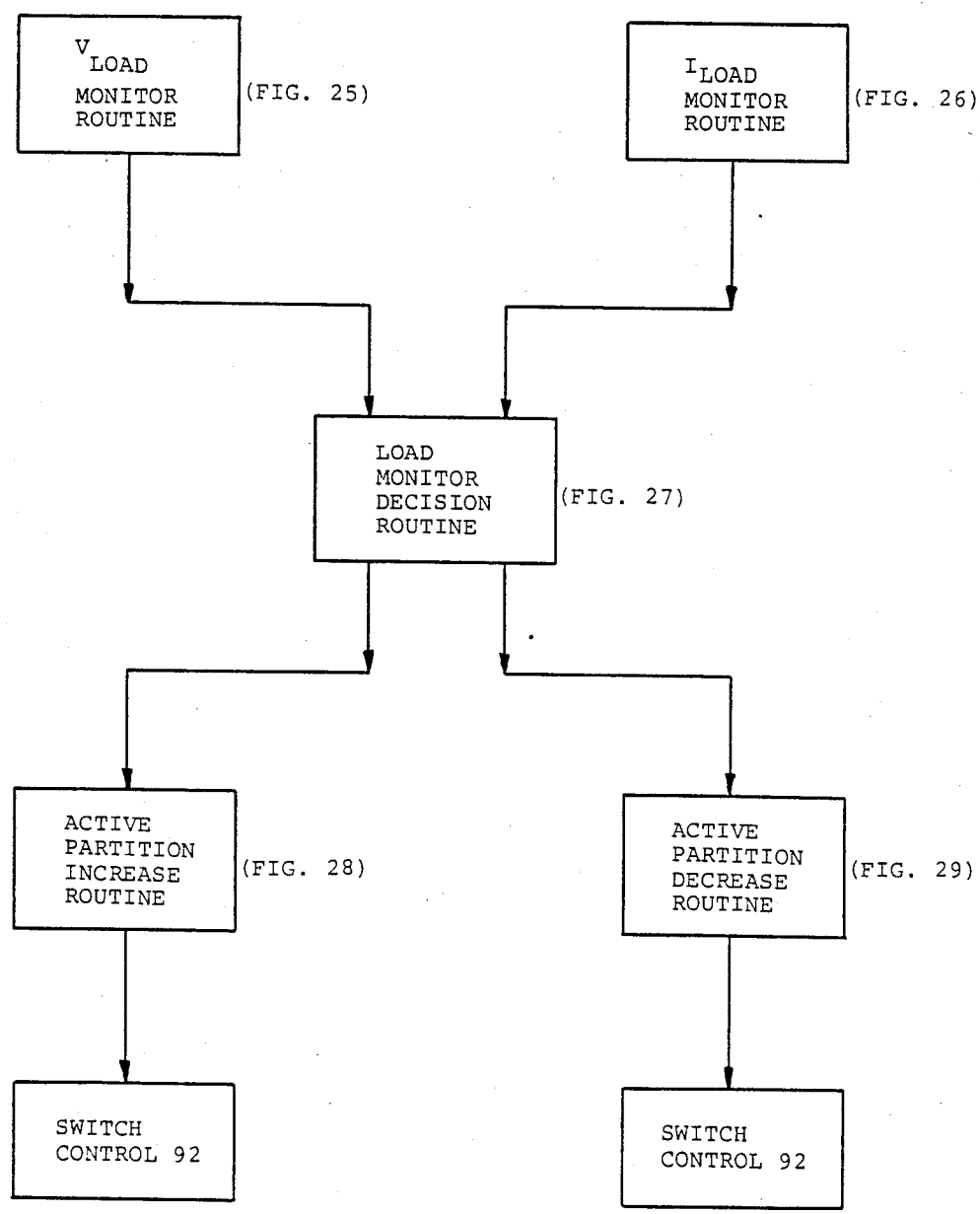

FIG. 24 is an overview diagram, showing the load monitor routines.

Figure 25:
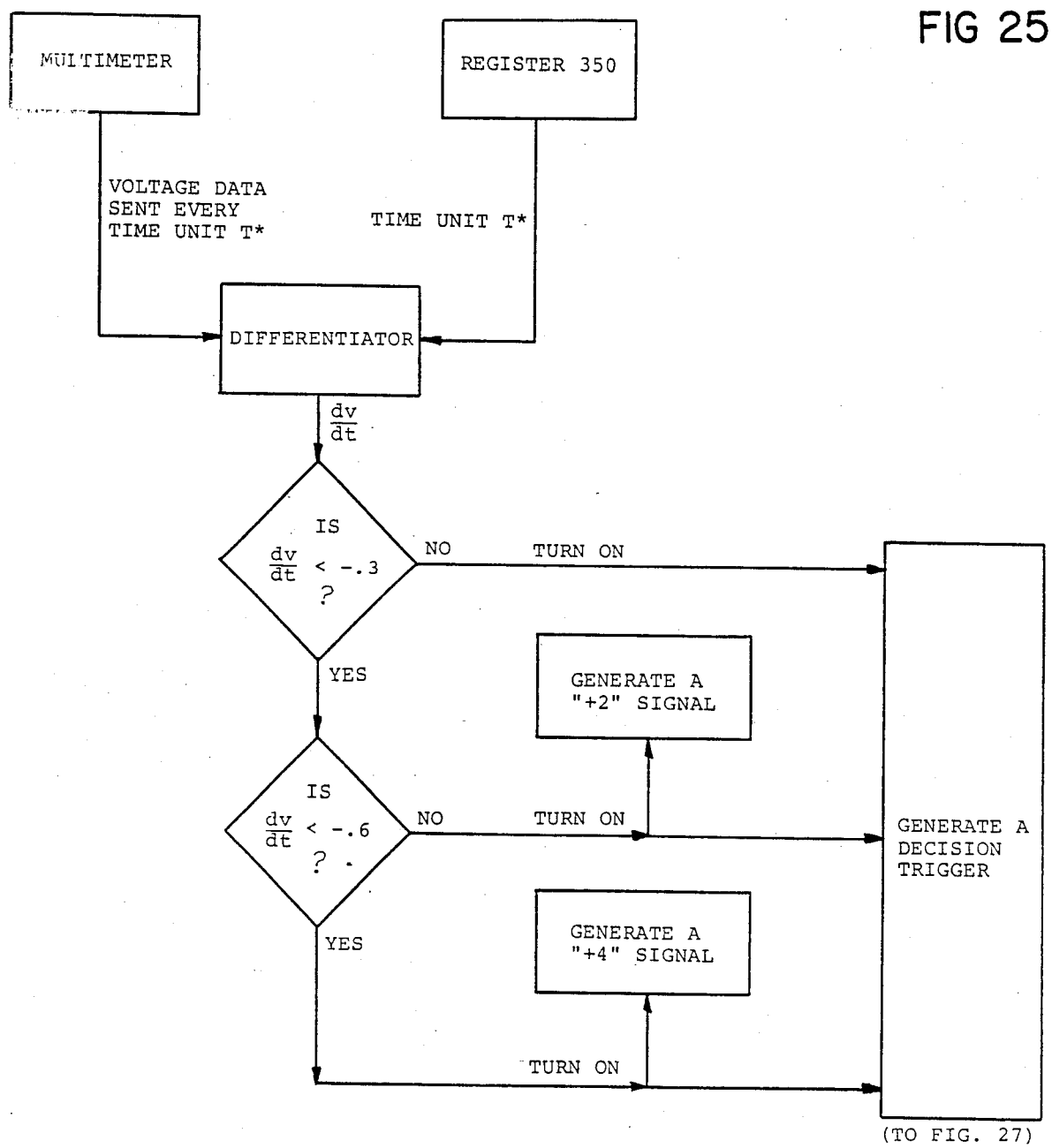

FIG. 25 shows the $V_{LOAD}$ monitor routine.

Figure 26:
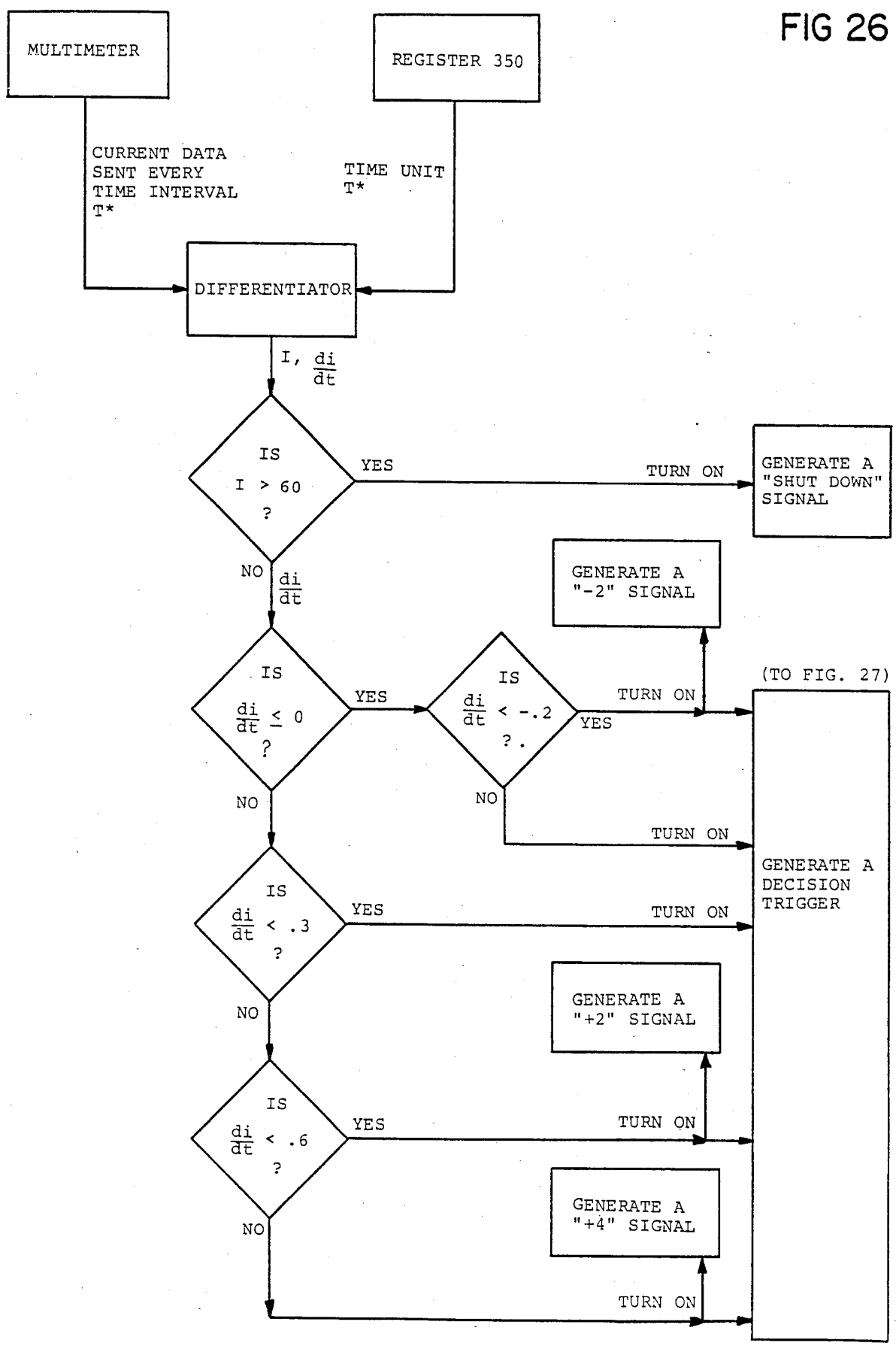

FIG. 26 shows the $I_{LOAD}$ monitor routine.

Figure 27:
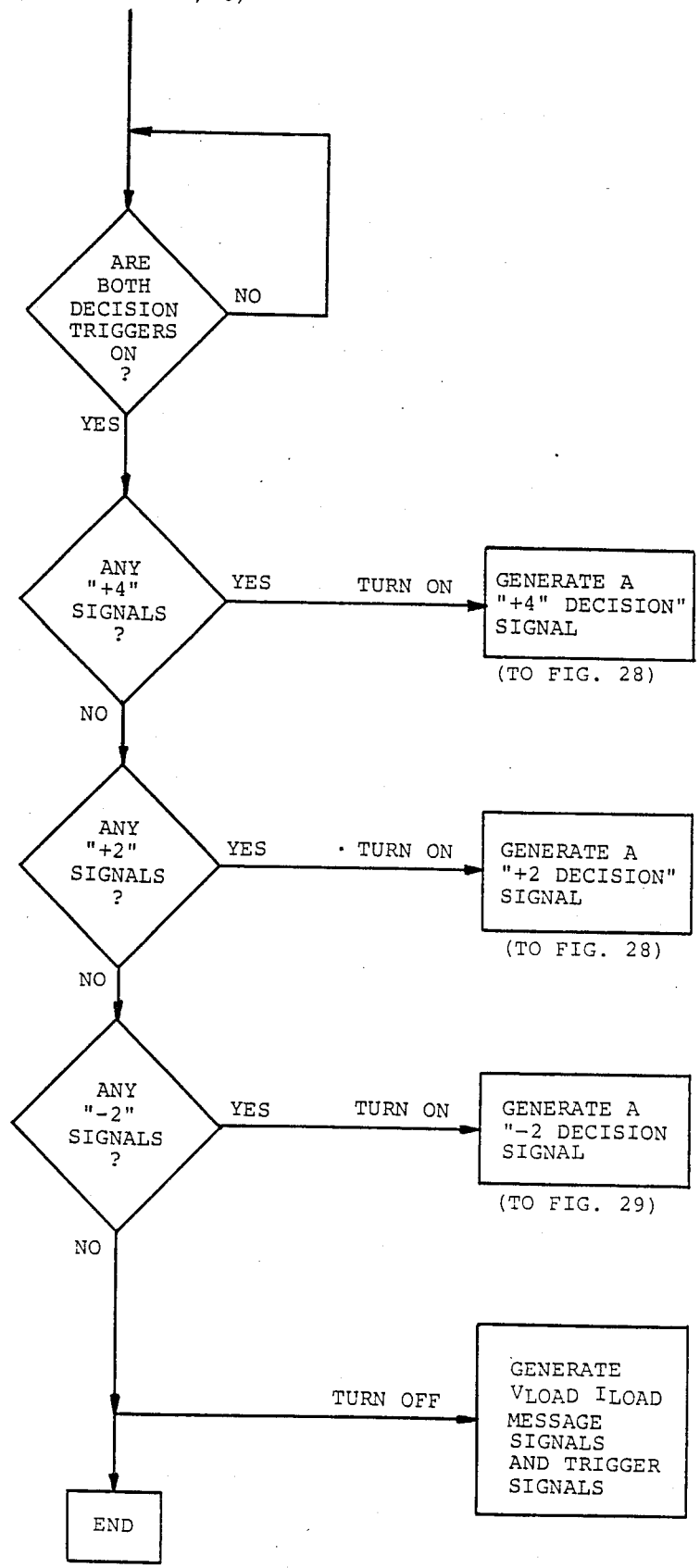

FIG. 27 shows the load monitor's signal decision routine.

Figure 28:
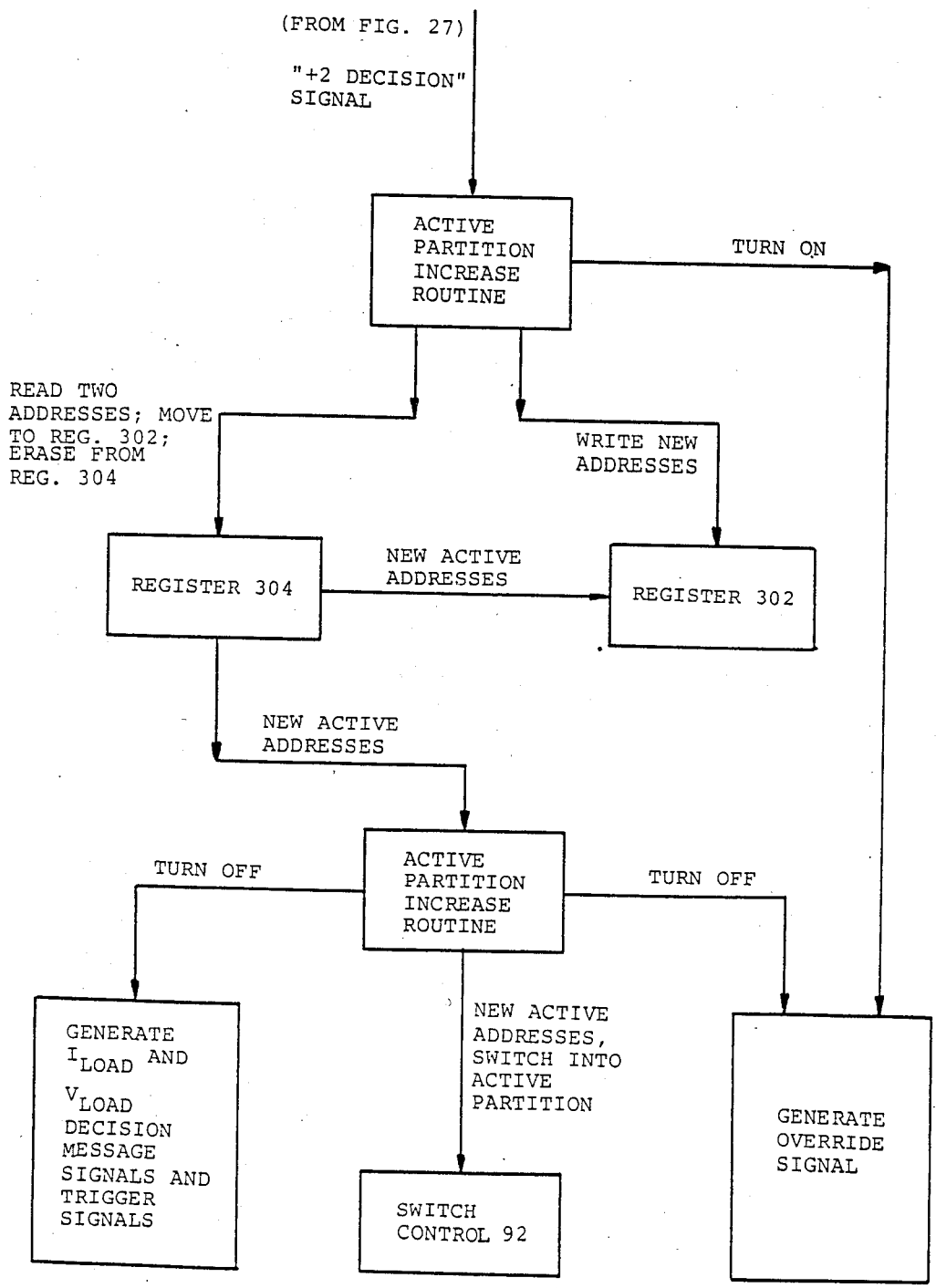

FIG. 28 shows one active partition increase routine.

Figure 29:
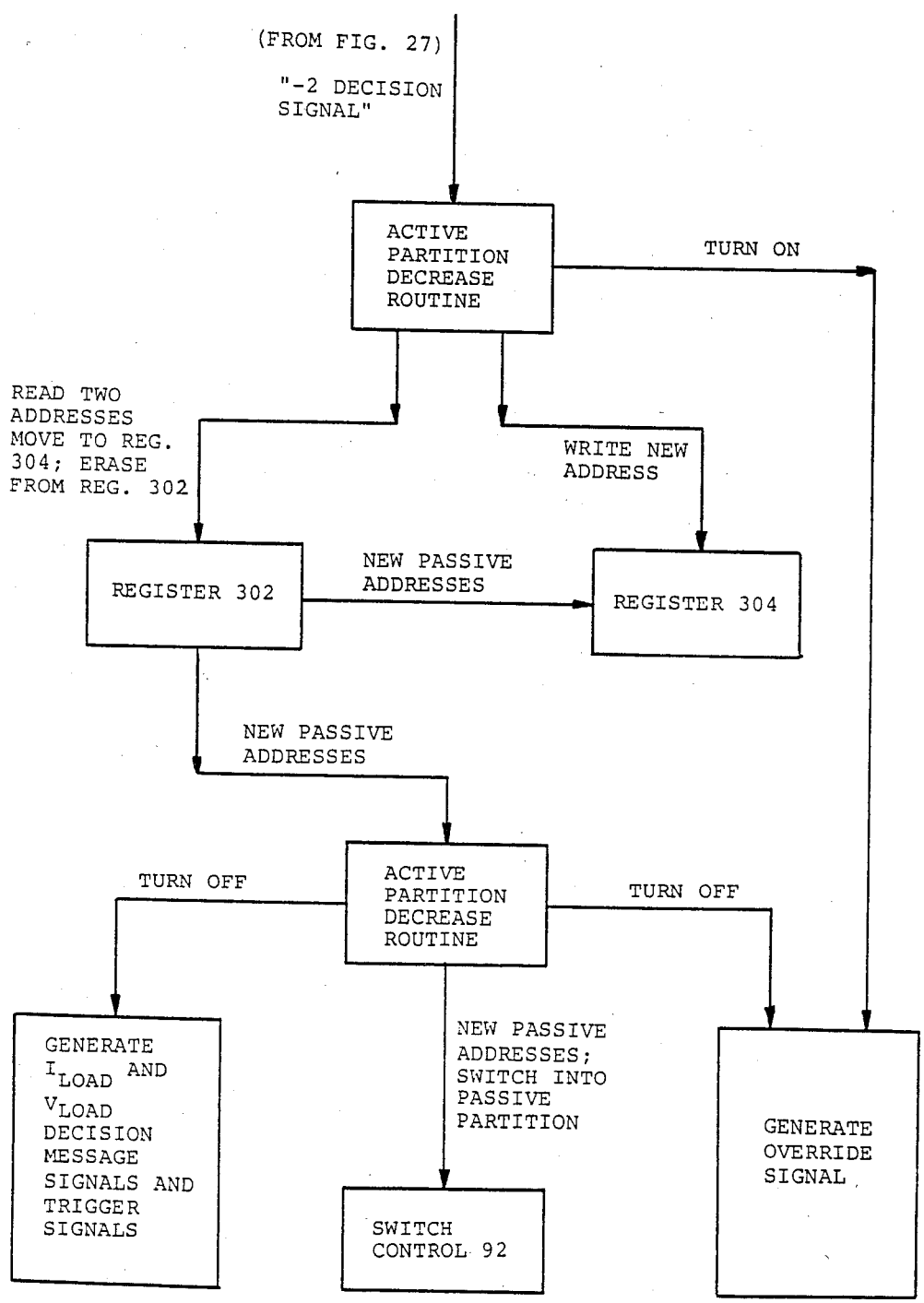

FIG. 29 shows the active partition decrease routine.

Figure 1:
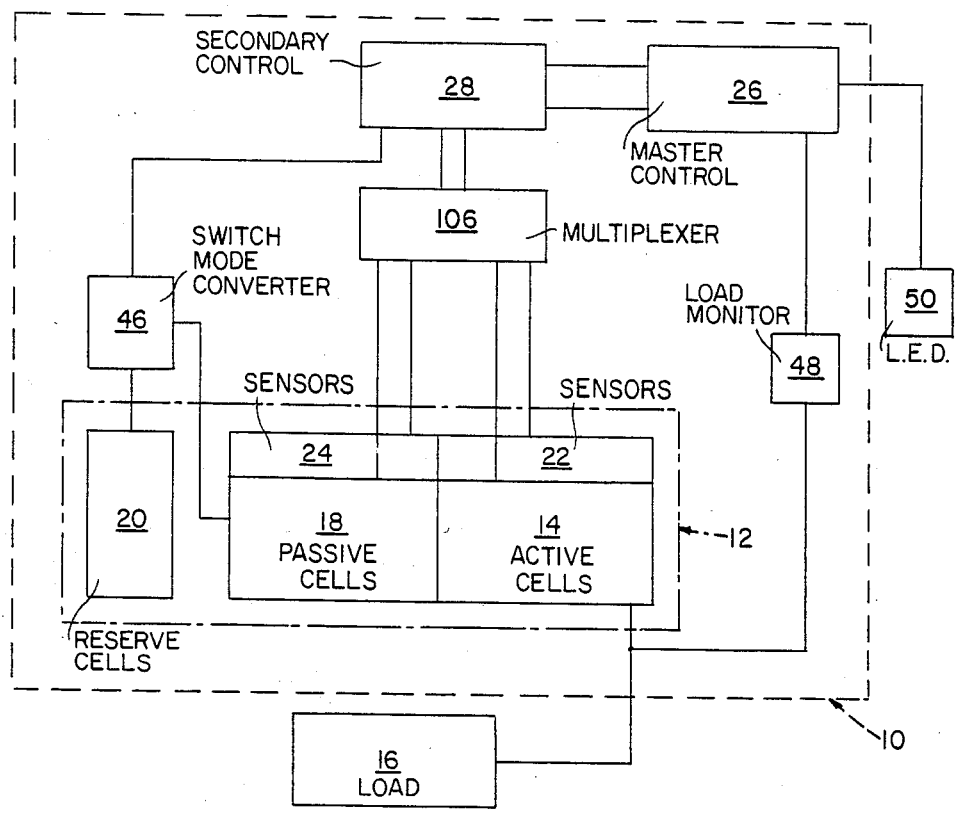
FIG. 1 is a schematic view of a first embodiment.

We turn first to FIG. 1 which illustrates a battery monitor 10 embodying the present invention and connected to a thirty cell lead-acid battery 12. Battery 12 has one group of its cells (those in what will be referred to as the active cell partition 14) connected to load 16 and a second group of cells (those in what will be referred to as the passive cell partition 18) connected to reserve cells 20. Switch mode converter 46, connected to reserve cells 20 and to the cells in the passive cell partition 18, transfers charge from the reserve cells 20 to the cells in the passive cell partition 18. Sensors are provided in different ones of the cells. In the illustrated embodiment, the cells are arranged in ten cell-units, each including three cells connected to each other in series. The three cells of each cell-unit are in a single housing so that, insofar as possible, the pressure, temperature and pH of all three will be the same. At least one sensor is provided in each cell-unit. The sensors in the cell-units in the active partition 14 are referred to herein as active cell sensors 22 and, as indicated in FIG. 1, measure physical parameters of cells in active cell partition 14. Similarly, the sensors in the cell-units in passive partition 18 are referred to as passive cell sensors 24 and measure physical parameters of cells in passive cell partition 18. The sensors in both the active cell partition 14 and the passive cell partition 18 are connected to a multiplexer 106 which receives and scans the data from all the sensors and passes it, in serial and digitized form, through a secondary control 28 to master control 26. In preferred embodiments, both the master and secondary controls are PDP DEC 1170, MOS Technology 6502, or VAX-11/730 microprocessors with 64K bit memories.

During steady state operation of the FIG. 1 embodiment, master control 26 and secondary control 28 switch cells between the active and passive partitions, without changing the size of either partition, in response to data from the sensors. Master and secondary controls 26, 28 also control recharging of cells in the passive partition so that the proper amount of charging energy will be transferred from the reserve cells 20 to the cells of the passive cell partition 18. Light-emitting diode (L.E.D.) 50, connected to control 26, indicates when the battery must be recharged from an external source, and when such recharging is no longer effective so that the battery must be replaced.

Figure 2:
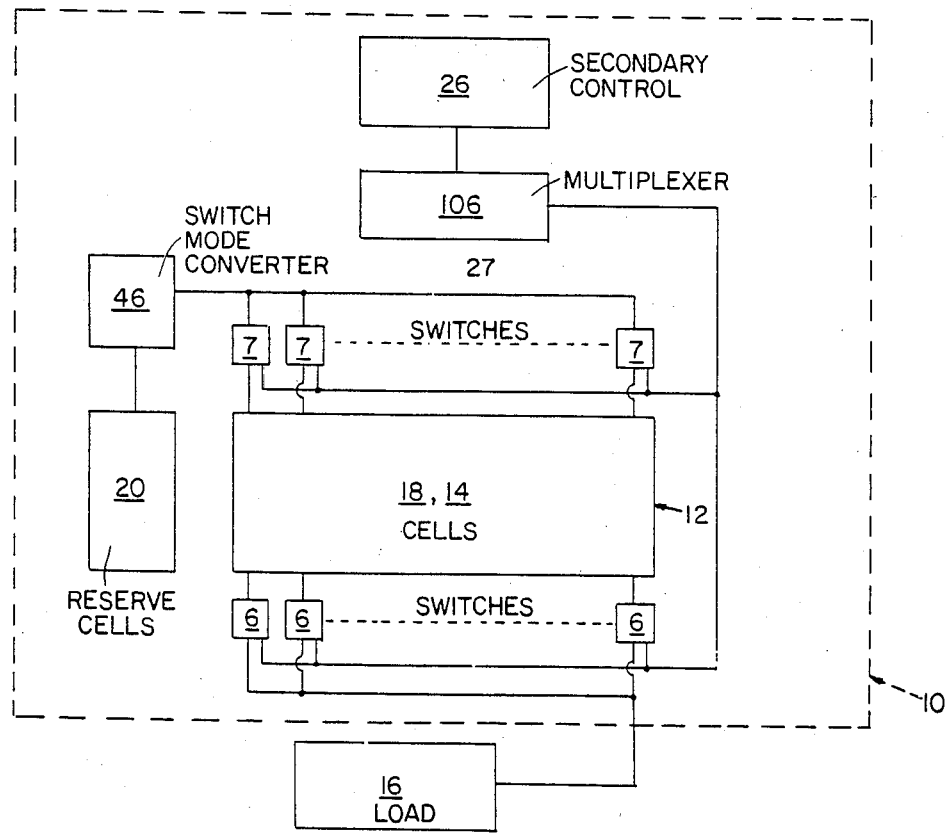
FIG. 2 is a schematic view illustrating switching of cells.

FIG. 2 illustrates the manner in which cells are switched between the active and passive partitions in the FIG. 1 embodiment. As shown, each of the 10 cell-units of battery 12 is connected to two normally-open CMOS relay switches. Of the two relays connected to each cell-unit, one relay switch 6 is connected to a bus bar attached to load 16; the other relay switch 7 is connected to a bus bar attached to switch mode converter 46. When relay 6 is closed, the cell-unit is in the active partition and is connected to load. When relay 6 is open, the cell-unit is in the passive partition. While in the passive partition, relay 7 will be closed if the cell-unit is being recharged. Only one of relays 6, 7 of each cell-unit is closed at any one time. When the cell-unit is in the passive partition but fully restored both will be open. Data bus 8 connects the control input of each relay switch 6, 7 to multiplexer unit 106. Each relay switch is connected also to a 5 volt power supply. When the condition (open or closed) of the relay is to be changed, control 28 sends signals (with appropriate headers to identify the particular switch to multiplexer 106 which in turn routes the signal (i.e., a voltage pulse) down data bus 8 to the particular relay. For example, if a particular cell-unit is recharging in passive partition 18, the switch 7 connected with that cell-unit will be closed and the switch 6 connected to the cell-unit will be open. When cell-unit has completed recharging, a signal from control 28 and multiplexer 106 is applied to the control input of the relay switch 7 of that cell-unit, and switch 7 is opened.

When system power initially is turned on (or off), all switches are open. Control 26 then sends closing signals to the relay 6 of each cell-unit to be reconnected to load. Control 26 sends no signal to the relay 7 of each cell-unit to be in the passive partition, since the passive partition initially is presumed to be fully charged.

Figure 3:
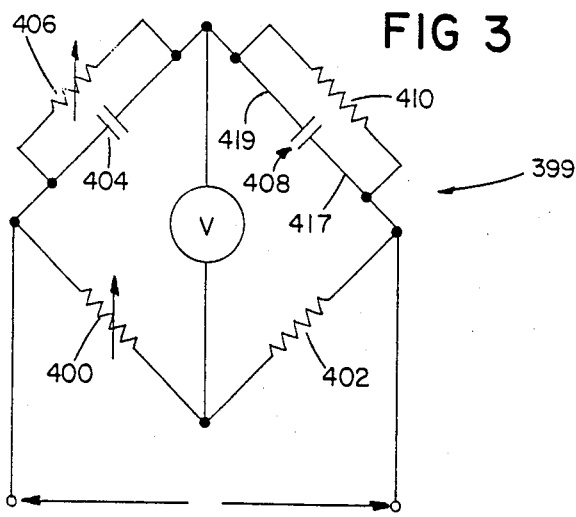
FIGS. 3–5 show sensors.
Figure 4:
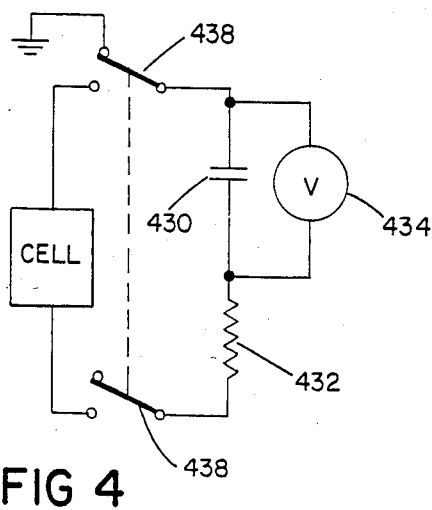
Figure 5:
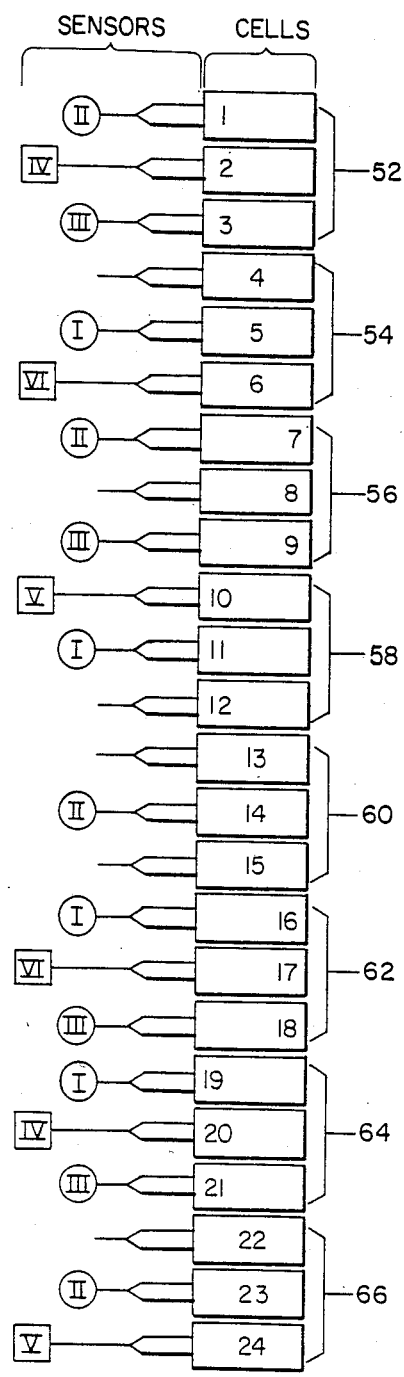

We turn now to FIGS. 3–5 which, together with FIGS. 1 and 7, illustrate the construction of the sensors used in both the FIG. 1 and FIG. 7 embodiments. As previously indicated, the sensors 22, 24 measure specific operating parameters of battery cells in active partition 14 when the battery is under load and in passive partition 18 when the cells are not connected to load. There are several different types of sensors, classified according to the particular parameters (variables) they measure as follow:

Type I sensors measure cell temperature ($T_{cell}$) and cell vapor pressure ($P_{cell}$)

Type II sensors measure cell capacity ($C_{cell}$) and cell pH ($pH_{cell}$).

Type III sensors measure cell current ($j_{cell}$) and cell voltage ($V_{cell}$).

Type IV sensors measure cell electrolyte concentration ($C_A$) and cell electrolyte activity ($F_{cell}$)

Type V sensors measure cell diffusion rate ($D_{cell}$) and cell solvated proton mobility ($H_3O^+$)$_{mob}$.

Type VI sensors measure cell electrolyte conductance ($\gamma$) and oxygen flux ($O_2$-flux).

Cell temperature ($T_{cell}$), vapor pressure ($P_{cell}$), pH ($pH_{cell}$) and voltage ($V_{cell}$) are simply the temperature (typically in °C.) of, pressure of vapor above the electrolyte in, pH of, and closed voltage under load across, the respective cell. For new lead-acid cells, the initial desired temperature ($T_o$) is about 75° F. to 90° F. (room temperature), initial desired P ($P_o$) is atmospheric pressure, initial desired V ($V_0$) is about 1.5 volts, and initial desired pH ($pH_0$) is about 2.0.

Cell capacity ($C_{cell}$) is a measure of the charge (coulombs or ampere-hours) of the cell. The initial charge of a new, fully-charged cell is referred to as $C_o$ and, in a lead-acid battery, typically is about 25–30 amp-hrs. As the cell is discharged, the charge C in the cell, i.e., the cell capacity, decreases; although recharging from the reserve cells or from external sources restores cell capacity, charge can never be restored to the level of $C_o$. At any point in time during operation the then-extant cell capacity C will be a fraction (never greater than one) of $C_o$.

Cell current ($j_{cell}$) is the current density, i.e., the amps/unit area, of the cell. The design current density, $j_o$, is determined by the design discharge rate and physical construction of the cell. The design discharge rate of a cell is $C_o/k$ where k is a time constant, typically about 5 hours for a lead-acid cell battery. The design discharge rate, thus, is a fixed number of amperes (or coulombs/hour).

The design current density (j) is the design discharge rate ($C_o/k$) divided by the area of the plates (either anode or cathode) of the cell. For typical lead-acid cells, $j_o$ (i.e., design current density of the cell at full charge) is about 40 milliamps per $cm^2$. The actual cell current at any period of time, j, may be either greater or less than $j_o$.

Of the above 12 variables, the operating parameters measured by the I, II, and III sensors are the most important and normally will be the variables measured during operation of a battery in a vehicle. The other six variables may be measured in laboratory or other specialized applications.

During operation it is desirable that the parameters measured by the type I sensor, and preferably those measured by the type II and III sensors also, be measured in one or more cell-units in the active partition. Further, it is desirable that the parameters measured by the type II sensor (and more preferably by the type I sensor also) be measured in one or more cell-units in the passive partition. It is not necessary to measure every parameter in each of the cells. In some embodiments, however, and particularly where each cell-unit includes 3 cells, it may be convenient and desirable to include a type I sensor in one cell of each unit, a type II sensor in a second, and a type III sensor in the third.

More typically, a sensor is not placed in each cell, but the sensors are distributed as required to ensure that sufficient information to operate the system is provided. The sensor arrangement in the preferred embodiment illustrated in FIG. 7 is shown in FIG. 5. The sensor arrangement in the FIG. 1 embodiment is as shown in FIG. 5, except that the type III sensors are omitted. As illustrated in FIG. 5, the twenty-four individual cells of battery 12 available for connection to load (the other six cells permanently form reserve 20) are arranged in 8 three-cell units, designated 52–66. The three cells of each cell-unit are connected to each other in series. A sensor is positioned in at least one, and in some circumstances two, of the cells of each cell-unit, as follows:

| Cell-Unit | Sensor Type |
|---|---|
| 52 | II, III |
| 54 | I |
| 56 | II, III |
| 58 | I |
| 60 | II |
| 62 | I, III |
| 64 | I, III |
| 66 | II |

In FIG. 5, these sensors are indicated by the appropriate sensor numeral surrounded by a circle.

In laboratory or other special applications, the system will include type IV, V and VI sensors also. The manner in which they would be distributed is indicated in FIG. 5 by the appropriate sensor numeral surrounded by a square, viz:

Type IV—Cell-units 52, 64
Type V—Cell-Units 58, 66
Type VI—Cell-Units 54, 62

Regardless of the manner in which the sensors are arranged, each cell in which a sensor is placed includes a port through which conduits, typically of electically inert platinum or ceramic, extend into the cell-unit housing. The output of each sensor to multiplexer 106 is either an analog signal which is digitized at multiplexer 106 before sending it to controls 26, 28, or the output is a BCD (binary-coded decimal) signal which is converted into binary digital within controls 26, 28.

Each type I sensor includes a thermocouple (Omega Engineering Co.), or if desired a Data Precision #940 $3\frac{1}{2}$ digit, digital thermometer with a range of −65° C. to +150° C., for measuring the temperature of the cell electrolyte. Thermocouples are preferred, since data from them may be accepted by a temperature controller in a digital mode. In the same port as the thermocouple, each type I sensor also measures the vapor pressure of the cell electrolyte using a capacitance bridge, typically such as the Data Precision Model 928, $3\frac{1}{2}$ digit, digital acceptance router, with a range of 0.1 picofarad to 2000 microfarads. Shown in FIG. 3, such a bridge, generally referred to as 399, includes two precision wire wound resistors 400 and 402, a known precision capacitor 404 which is in parallel with adjustable precision resistor 406 and an unknown capacitor 408 which is in parallel with resistor 410.

Figure 3A:
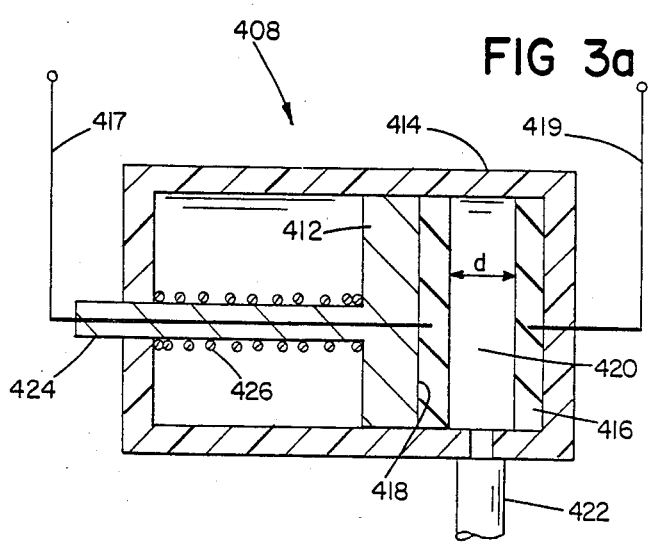

The unknown, i.e., the vapor pressure measuring capacitor, is a piston 412 fitted within an air-tight plastic cylinder 414 as shown in FIG. 3a. Thin layers of platinum are placed on the inside face 416 of the cylinder and adjacent face 418 of the piston. Electrical leads 417, 419 extend, respectively, from cylinder layer 416 through the end of cylinder 414 and form piston layer 418, piston 412 and piston rod 424. As shown in FIG. 3, the leads are connected in one arm of the capacitance measuring bridge 399.

The space 420 between piston layer 418 and cylinder layer 416 is connected by a tube 422 to the interior of the cell whose vapor pressure is to be measured. Thus, the pressure in space 420 is equal to the cell vapor pressure. The space 420 within cylinder 408 on the other side of piston 418 contains air at atmospheric pressure and a spring 426 for resisting movement of the piston to increase the distance between platinum layers 416, 418.

When the cell vapor pressure is equal to atmospheric pressure, the pistons and cylinder platinum layers are at equilibrium, spaced apart by a distance $d_o$, with spring 426 fully extended. When a voltage V is placed across the coated faces, they form a parallel plate condensor. Bridge 399 is balanced when the two plates of capacitor 408, i.e., platinum coated surface 416, 418 are $d_o$ apart. When cell pressure rises, the piston and cylinder faces are forced apart, changing the distance between them and, thus, the capacitance of capacitor 408. The change in capacitance, and thus the change in cell pressure, is determined by rebalancing the bridge. As mentioned, the bridge is a standard digital capacitance meter which provides a direct read-out of the capacitance changes.

The type II sensor measures capacity and pH in a second cell-unit of the 3-cell unit. As shown in FIG. 4, capacity is measured by using a precision capacitor 430 typically 0.50±0.01 microfarad (μf) wired in series with a precision resistor 432, typically 0.1 ohm. The resistor and capacitor are wired in series with the battery cell, and a volt-meter 434 measures the voltage across capacitor 430. The RC circuit including capacitor 430 and resistor 432 has a very short time constant, i.e. about $5 \times 10^{-8}$ sec. When ganged switches 438 connecting the capacitor and resistor to the battery cell are closed, the voltage across the capacitor rises very quickly, reaching over 90% of its steady state charge in about 200 nanoseconds. Voltmeter 434 reads the voltage across the capacitor about 200 nanoseconds to 1 microsecond after the switches are closed.

The total remaining charge (i.e. cell capacity C) of the battery is equal to a constant (k) times the capacitor's equilibrium charge (q); i.e., $$C = kq.$$

The equilibrium charge in the battery is $$q = cv$$

where c is the capacitance of, and v is the voltage measured across, capacitor 430. Thus, $$C = kcv.$$

Since k and c are constants, the voltage measured by meter 434 is directly related to, and is a good measure of, the remaining capacity C of the cell.

It will be seen, from the above description, that the point at which cell capacity (i.e., charge) has been depleted to 25% of its original charge is easily determined by voltmeter 434. When controls 28, 26 determine that the cell capacity of all cell-units having type II sensors has been depleted to $C = 0.25C_o$ (or 6.34–7.67 amp-hrs per cell in the cell-unit), a signal is sent to light-emitting diode 98 to cause it to light and indicate that the entire battery must be recharged from an external source. The number of times the battery can be recharged from an external source is predetermined; a counter counts each time the battery is so recharged. When the counter indicates that the battery has been recharged from an external source the predetermined number of times, a signal is sent to L.E.D. 100, allowing it to light and emit a stop signal notifying the operator that a new battery is needed.

The measurement of pH by the type II sensor is accomplished using a conventional digital pH meter, such as those made by Sargent-Welch Co. It is desirable for the meter to have an inert, e.g. platinum, electrode.

Type III sensors measure current and closed circuit voltage using a 3½ digit, digital multimeter (Data Precision #1750), which has an internal charger and BCD output and reads the variables directly.

During most of the operation of battery 12, simply recharging the cell-units in the passive partition 18 from reserve cells 20 restores the cell-units' operating parameters sufficiently so that the cell-units may be used in the active partition. During the reserve recharging procedure, passive cell-units' voltage and capacity are directly restored. Further, because all six operating parameters are functionally related, passive cell-unit temperature, pH, and pressure also will be affected (and tend to be restored) by reserve recharging.

At times, however, simply recharging from reserve cells 20 will not adequately restore cell-unit temperature, pressure, or pH. For this reason, each cell-unit may include controls for directly restoring each of these three parameters. These controls are shown in FIG. 6. Typically, such controls are not included in a simple embodiment such as that shown in FIG. 1, but will be included in the more sophisticated FIG. 7 preferred embodiment discussed hereinafter.

As there shown, temperature of the cell-unit 298 is controlled by a conventional refrigerator and heater. The temperature of the cell electrolyte 299 is raised using an immersion heater 350 comprising a heating coil surrounded by ceramic insulation. Overheating is prevented by a bimetallic strip 352 in the heating circuit. For reducing the cell-unit's electrolyte temperature, a refrigerator, typically a tube heat exchanger (e.g., from Thermexchanger Inc.) or an evaporator 354 (a coiled glass or ceramic unit containing freon or other low boiling point liquid), is built into each cell-unit. The evaporator 354 is attached to a conventional refrigeration unit 355. The evaporator temperature is regulated by a thermostat, and a relay 353 turns the compressor in the cell-unit on and off.

The vapor pressure in the cell-unit can be lowered by a standard pressure vent 356, which is normally closed but may be opened to release pressure. The cell-unit's vapor pressure is raised indirectly by raising its temperature.

The pH of the electrolyte is raised or lowered by titration, typically using a standard electronic titrator 358, such as those available from Fisher Scientific Co. and Sargent Welch, having a platinum or other inert electrode. Typically the titrator will include three vials of standard buffers (see e.g., Lang's Handbook of Chemistry) having pH's of, respectively, 0.2, 0.4, and 2.0. Each vial contains about 250 ml; and small measured amounts from the vials are released into the cell electrolyte to change pH.

Each of these restoring controls is connected to a source of power and is turned on and off by signals from secondary control 28. In the case of titrator 358, the signal also controls which buffer(s) is released into the electrolyte.

We turn now to the operation of the FIG. 1 embodiment. In normal steady-state operation, there are four cell-units in each of the active and passive cell partitions. Master control 26 will monitor each cell-unit in turn, and secondary control 28 will switch cell-units from one partition to the other (in response to instructions from control 26) to ensure that each cell-unit in the active partition is operating efficiently.

For example, 3-cell units 52, 54, 56, 58 may be in the active partition. As master control 26 monitors cell-unit 52, data from sensors 22 will show whether the values of the operating parameters of cell-unit 52 are within or outside allowed ranges about predetermined desired values. If they are outside, cell-unit 52 is switched off load into the passive partition for recharging, and a recharged cell-unit in the passive partition, for example cell-unit 64, is switched on load to replace it.

As such switching is accomplished, the number of 3-cell units in each of the partitions remains constant, but the particular cell-units in each will change as required to ensure that all cell-units in the active partition are operating as desired. As the active partition discharges over time, the desired operating parameter values will have to be udpated to reflect the irreversable changes brought on by the aging of the battery. One routine for accomplishing such switching, recharging and updating follows.

Master control stores in a first memory the initial desired values of the four operating parameters ($P_D$, $T_d$, $pH_D$, $C_D$) measured by the type I and type II sensors as follows $P_D$: $P_o = 1$ atmosphere
$T_D$: $T_o = 90°$ F.
$pH_D$: $pH_o = 2.0$
$C_D$: $C_o = 30$ amp-hrs (per individual cell), and in a second memory stores the amount by which the actual values of the operating parameters of the cells will be permitted to vary from these initial desired values, viz $\Delta P = P_0 = 1$ atmosphere
$\Delta T = 0.5T_0 = 45°$ F.
$\Delta pH = 0.25pH_0 = 0.5$
$\Delta C = 0.3C_0 = 9$ amp-hrs.

The determination as to the permitted amount of variation rests largely on engineering judgments; a small allowed difference results in more efficient cell operation but much more frequent switching and updating.

Multiplexer 106 scans the outputs of all of the sensors 22, 24 at regular, typically about 5 minute intervals, and sends, to master control 26, signals (having sensor and cell-unit identifying headers) representative of sensed parameter values (i.e., of the temperature and pressure of cell-units with Type I sensors and the pH and capacity of cell-units with Type II sensors).

Master control 26 monitors, in turn, each cell-unit 52–66 for its ability to operate efficiently. As sensor output from a cell unit is received, it determines whether the data signals are from active cell sensors 22 or passive cell sensors 24, compares sensed parameter values with desired values, and makes active or passive switching and recharging decisions based on whether the sensed values of the operating parameters are within allowed ranges about their respective desired values; i.e., whether the differences between the desired and sensed values of the pertinent parameters are numerically less than the respective parameters' allowed differences. Active switching decisions and, in other embodiments passive switching decisions also, are based on a measure of the conjoint difference between two related parameters. Such measures are described in a later section.

In the FIG. 1 embodiment, if the cell-unit is in the passive partition and either of the two pertinent parameters' sensed differences is greater than the respective allowed difference, then the passive cell-unit is not capable of operating efficiently. Master control 26 sends, to secondary control 28, signals ordering the recharging of the cell-unit in question; it then begins to monitor the next cell-unit in turn.

Secondary control 28 notes in a cell-unit replacement memory that the passive cell-unit in question is still inefficient, and sends signals to relay switch 7 of the passive cell-unit, closing the relay switch 7, which will now connect the cell-unit to reserve cells 20. If the cell-unit is already being recharged, the signal to relay 7 causes no action.

If master control 26 instead determines that the sensed differences of both of the two pertinent operating parameters are less than their respective allowed differences, the passive cell-unit is capable of operating efficiently. Master control 26 then adds a "one" to a switch enable counter which, when active cell-units are monitored, indicates the number of passive cell-units available to replace inefficient cell-units in the active partition. Master control 26 then sends, to secondary control 28, orders to store in its replacement memory the identity of the cell-unit and to send opening signals to the cell-unit's relay switch 7. Master control 26 then begins monitoring the next cell-unit, which may be in either the active or passive partition.

For each cell-unit in the active partition, master control 26 assumes that the cell-unit is operating efficiently if the sensed differences of both of the two operating parameters sensed in the cell-unit are less than or equal to their respective allowed differences. If this is found, master control 26 begins to monitor the next cell-unit in turn.

If, however, the sensed difference of either of the two sensed operating parameters is greater than its respective allowed difference, then the cell-unit is probably operating inefficiently. In this circumstance, master control 26 may either (1) immediately switch the cell-unit in question from the active to the passive partition or (2) conduct a further test, based on the fact that the various operating parameters are functionally related, to determine if a measure of a conjoint difference between sensed and desired values of the two related parameters is also larger than a measure of an allowed conjoint difference between the parameters.

The measure of conjoint difference involved in the further test used in embodiments such as that of FIG. 1 is the product of the differences between the two related operating parameters sensed by a particular sensor pair. In an active monitoring in which Type I sensor data is examined, for example, master control 26 compares the product of the sensed differences of pressure and temperature with the product (i.e., 45 atm-° F.) of their allowed differences (i.e., 45° F. and 1 atm).

If the product of the sensed differences is less than the product of the allowed differences, the cell-unit in good operating order, and master control 26 begins to monitor the next cell-unit in turn. If, however, the product of the sensed differences is greater than the product of the allowed differences, the inefficient cell-unit is switched into the passive partition.

Regardless of whether the switching decision is based solely on sensed and allowed differences or also on products of sensed and allowed differences, master control 26 adds a "one" to a switch necessary counter each time such a decision is made. It then examines the switch enable counter to determine whether a recharged passive cell-unit is available for the switching operation. If not, i.e., the number in the counter is equal to zero, master control 26 orders no switching; it begins to monitor the next cell-unit in turn.

If recharged passive cell-units are available, master control 26 subtracts "one" from both the switch necessary and the switch enable counters, and orders secondary control 28 to first replace the inefficient active cell-unit with a recharged passive cell-unit, and then to commence recharging it. Finally, master control 26 begins to monitor the next successive cell-unit.

The secondary control 28 stores in its memory the identity of the inefficient cell-unit and deletes the identity of a recharged passive cell-unit. It sends opening signals to the relay switch 6 and closing signals to the relay switch 7 of the inefficient cell-unit, and sends closing signals to the relay switch 6 of the chosen passive cell-unit.

The cell-unit monitoring procedure is continued until all of the cell-units have been examined once. Master control 26 then determines whether the number in the switch necessary counter is equal to zero, i.e. whether all inefficient active cell-units have been switched and are being recharged. If so, master control 26 sets the switch necessary and the switch enable counters to zero, and ends cell-unit monitoring for five minutes. Before monitoring begins again, however, master control 26 sends a signal to control 28 to clear its replacement memory location so that old information about recharged passive cell-units is not used in the new monitoring.

If the switch necessary counter number is greater than zero, i.e., all inefficient cell-units have not been switched from the active partition, master control 26 compares the switch necessary counter number to the switch enable counter number to see if further switching is possible. If the switch necessary number is less than or equal to the switch enable number, switching is possible and master control 26 sets the switch necessary counter to zero and begins another round of cell-unit monitoring in order to execute all of the necessary switching.

If the switch necessary number is greater than the switch enable number, there are not enough recharged passive cell-units available to replace inefficient active cell-units. This occurs when the cell-units in battery 12 have been operating for a period of time.

During operation, the charge on each cell-unit, i.e., its capacity C, (necessarily) decreases, and at some point, reserve cells 20 are no longer able to charge the passive cell-units to a level such that the difference between their sensed and desired capacity is less than the allowed difference. Since the all of the operating parameters are functionally related, the attainable values of C, P, T, and pH also change with time. Thus the desired values of all of the operating parameters periodically must be updated. Through updating, battery operation can be effectively controlled throughout the battery's entire useful life.

When updating is necessary, master control reads all of the sensor values from both active and passive cell-units, and using all of those values, finds the present average values of C, T, P and pH. It then replaces its initial desired operating parameter values $C_o$, $T_o$, $P_o$ and $pH_o$ in its first memory with the present average values of C, T, P and pH; sets the switch necessary and the switch enable counters to zero, and begins another round of monitoring in order to examine the cell-units using the new set of desired operating parameter values. At the same time, if the present average value of cell capacity is less than $0.25C_o$, master control 26 causes L.E.D. 50 to signal that the entire battery must be recharged from an external source.

This cycle of monitoring and updating continues until all inefficient active cell-units (as determined by updated parameter values) have been switched into the passive partition and are being recharged.

As will be apparent, there are a number of applications in which the power demands of load 16 do not remain substantially constant, but instead vary significantly. For example, in a vehicle much more power is required while accelerating than while driving at a constant speed. In such applications, the embodiment of FIG. 1 may include a load monitor 48 for monitoring the current and voltage (i.e., the power) demands of load and controlling the size of (i.e., the number of cell-units in each of) the active and passive partitions; and master and secondary controls 26, 28 will perform the additional function of changing the size of the active and passive partitions in response to signals from the load monitor.

When the power demands of the load increase, load monitor 48 signals master control 26 and secondary control 28 to switch cell-units from the passive partition 18 to the active partition 14, i.e., to increase the total number of cell-units connected to load. When power demands decrease, load monitor 48 signals the controls 26, 28 to switch cell-units off load and into passive partition 18, decreasing the number of cell-units in the active partition.

Master control 26 and secondary control 28 permit any of the following partition arrangements:

| Active partition | Passive Partition | Reserve |
| --- | --- | --- |
| 2 cell-units | 6 cell-units | 2 cell-units |
| 4 cell-units | 4 cell-units | 2 cell-units |
| 6 cell-units | 2 cell-units | 2 cell-units |
| 8 cell-units | no cell-units | 2 cell-units |

Load monitor 48 continuously measures the current and voltage applied to load 16. Load monitor 48 includes a Data Precision No. 1750 digital multimeter for measuring both current and voltage applied to load 16; and a standard electronic differentiator (for example, an EGG/Par Model 215). The multimeter sends signals indicative of the current ($I_{load}$) and voltage ($V_{load}$) being applied to load 16 to the electronic differentiator, which in turn sends signals indicative of the rate of change of current and the rate of change of voltage to master control 26.

If either the rate of current decrease or the rate of voltage increase exceeds predetermined limits, master control 26 directs secondary control 28 to add cell-units to the active partition. If the voltage is decreasing at a rate of greater than 0.3 volts per second, master control 26 directs secondary control 28 to add two 3-cell units to the active partition; if the voltage is decreasing faster than 0.6 volts per second, master control 26 directs that the size of the active partition be increased by four 3-cell units. Similarly, if $I_{load}$ is increasing faster than 0.6 amps per second, then master control 26 instructs secondary control 28 to add four three-cell units to the active partition; if the rate of increase is between 0.3 and 0.6 amps per second, secondary control is directed to connect two additional 3-cell units to load.

Secondary control 28 executes the active partition increase commands in substantially the same way as it executes the replacement switching commands of master control 26 ordered during cell-unit monitoring. It deletes the identities of the chosen number of recharged passive cell-units from its replacement memory. It also sends, to the relay switches 6 of the chosen passive cell-units, the signals necessary to connect those cell-units to load 16.

If there are an insufficient number of recharged passive cell-units in the secondary control 28 replacement memory to complete execution of the active partition increase command, secondary control 28 increases the size of the active partition with unrecharged passive cell-units. It selects, for switching, as many unrecharged passive cell-units as are needed to complete the active partition increase orders; and sends closing signals to the relay switches 6 and opening signals to the relay switches 7 of the chosen passive cell-units, Load monitor 48 also causes master control 26 and secondary control 28 to reduce the number of cell-units in the active partition when the power demands of the load 16 decrease, and to shut down the battery if the value of $I_{load}$ is too large. If current is decreasing faster than 0.2 amps per second, master control 26 identifies two active cell-units and causes secondary control 28 to move the two chosen cell-units from the active to the passive partition.

Secondary control 28 sends opening signals to the relay switch 6 of each chosen active cell-unit. Since cell-units in the active partition are assumed to be operating efficiently (without need of recharging), secondary control 28 stores, in its replacement memory, the identities of the two newly-passive passive cell-units.

The multimeter of load monitor 48 sends directly to master control 26 a digitized signal representative of the total current being applied to load 16 ($I_{load}$). If $I_{load}$ is greater than a predetermined upper limit, typically about 60 amps if the cell-units are connected to the load in series-parallel, master control 26 generates a shut down signal, ordering secondary control 28 to disconnect all cell units from load. Secondary control 28 sends opening signals to all of the relay switches 6, which open and disconnect all cell-units from load 16. It should be noted that, on start-up of an automobile, cell-units will normally be connected in parallel and a total current draw of about 250 amps will be permitted.

Reference is now made to FIG. 7, which shows the structure of the preferred embodiment of the invention. The FIG. 7 embodiment includes essentially all of the components of the previously discussed FIG. 1 embodiment, and its components are identified by the same reference numbers as used previously with reference to the FIG. 1 embodiment. Further, the operation of the systems of the two embodiments are largely the same and, as will be apparent to those skilled in the art, many of the features and operations of the FIG. 7 system could be incorporated and used in the FIG. 1 system also.

The 30 cells of battery 12 are, as previously indicated with reference to FIG. 1, divided into ten 3 cell-units; the three cells within every cell-unit are connected to each other in series. During operation, various combinations of cell-units 52–66 are switched between the active partition, in which cell-units are connected to load 16, and the passive partition, in which cell-units, disconnected from the load 16, are either (1) on standby, available to be switched into the active partition, or (2) undergoing internal recharging or restoring procedures.

Internal recharging occurs when the cell-units in the passive partition are connected via lines 231, 230 to switch mode converter 46 which transfers charge to them from reserve cells 20 (permanently formed by two three-cell units, designated 68 and 70).

Restoring occurs through the cell-unit's restoration unit. Every cell-unit, whether active or passive, is connected to a restoration unit (designated 23, 21, respectively), the structure of which is as described earlier with reference to FIG. 6. Each restoration unit restores the temperature, pressure and pH of its cell-unit to pre-determined values as previously described.

At the stage of operation shown in FIG. 7, active cell partition 14 contains 12 individual cells in the form of four 3-cell units, designated 52, 54, 56, and 58. Passive cell partition 18 contains a total of 12 individual cells in the form of four 3-cell units, designated 60, 62, 64, and 66. In the passive partition, cell-units are connected in series with each other. In the active partition, cell-units are connected to the load 16 either in parallel or in series, depending on the desired voltage. (In automobile applications, the units typically will be connected in parallel during engine start-up and in series-parallel during normal driving.)

Load 16 is a 50 hp stepped armature electric motor with a dynamometer. For monitoring the current and voltage demands on load 16, a load monitor 48 is connected to load 16 by line 270. When closed, switches 6 connect the cells in active partition 14 to load 16 through load monitor 48 by lines 263 and 265 respectively.

The drive train of load 16 is connected to fused, regulated alternator 74 by line 272 which provides, when the speed of the drive-train of load 16 is greater than about 950 rpm, a source of 110 volt/60 hz a.c. power. Alternator 74 provides ac power for the system's power supply 78. It can also be used to provide dc by means of the rectifier filter 77 and voltage regulator 79 to recharge reserve cells 20 and, if desired, to directly recharge cells in passive partition 18.

For recharging the reserve cells, alternator 74 is connected to switch mode converter 46 through a voltage regulator 73 by line 274. Switch mode converter 46 includes a rectifier/filter and applies rectified, regulated power from the alternator either to reserve cells 20, via line 275 through a voltage divider 71 which insures that the reserve cells will not be over charged, or directly to the cell-units in passive partition 18 via lines 230, 231. Switch mode converter 46 regulates the power applied to the passive partition cells, whether that power is passed from alternator 74, from reserve cells 20, or from both. When closed, switches 7 connect the cells in passive partition 18 to switch mode converter 46 by lines 231 and 230 respectively.

System power supply 78 includes an EGG-Ortec 402D fused power supply 81 fitted to an Ortec 410B bin with an Ortec 909 bin cover; and has a rated output of 132 watts/110 volts. The power supply distributes power through a source bus to a 1M $\Omega$ programmed power amplified module 80 (EGG/Par Model 214), a chopper stabilized, dual d.c. outlet, operational amplifier 82 (EGG/Par Model 215 and a low noise pre-amplifier 84 with an output of 5 volts d.c. and having a single-ended d.c. input mode (typically EGG/Par Model 225). The bin includes also a cascaded counter-timer 93 (Ortec Model 776) and time calibrator 94 (Ortec 462). For ease of understanding the operation of the system, counter-timer 93 and calibrator 94 are shown in FIG. 7 as outside the modules of power supply 78.

Low-noise pre-amp 84 is driven by power amplifier 80 and provides the fixed 5 volt digital power, via line 248, as required by master control 26. The pre-amp also provides a 5 volt digital power for the two controls 88, 92 comprising secondary control 28 via line 246, the multiplexer 106 via line 260, the load monitor 48, and the counter-timer 93 and time-calibrator 94.

The floating 12 volt analog power required by the sensors is provided by power amplifier 80 and ac/dc operational amplifier 82 which possess a dual dc ($\pm 12$ V dc) floating supply 86 via line 208. The dc power is fed into a converter with offset (in supply 86) to remove unwanted bias signals, and is then sent to multiplexer unit 106 via line 246 that receives output from the sensors 22, 24 in the active and passive partitions 14, 18.

A 50 v, 30 amp-hr monitor supply 96 is provided as an auxiliary power source subsequent to and during start-up and also so that in the event of a power failure the data already contained in the memory of the controls will not be lost. Supply 96 may be connected directly to master control 26. In preferred embodiments, supply 96 is connected to power supply module 78 (which includes counter-timer 93 and timer calibrator 94) via line 242.

As previously indicated, secondary control 28 includes a partition switching control 92 and a passive cell restoration control 88. The input of passive cell restoration control 88 is connected, through logic unit 112 (not shown in FIG. 7) and an analog/digital converter 102, to multiplexer control 106 via lines 212, 213. The input to the partition switching control 92 is also attached to multiplexer 106, again through logic unit 112 and A/D converter 102 via lines 214, 215.

Logic unit 112 includes a NAND gate 110 and NOR gate 108, each having a reversed bias diode on one of its respective inputs. The other input to NAND 110 is connected, though analog/digital converter 102 and multiplexer 106, to a data line 212 from sensors 24 in the passive partition 18. The other input to NOR 108 is connected again through analog/digital converter 102 and multiplexer 106, to a data line 214 from sensors 22 in active partition 14. The output from NAND 112 and a second data line 213 from passive sensor 24 are connected to passive cell restoration control 88. The output from NOR 108 and a second data line 215 from active sensor 22 are connected to switching control 92.

Multiplexer 106 (preferably four or five cascaded EG&G Ortec Model 714 multiplexers) has inputs connected to each of the active and passive sensors 22, 24. In FIG. 7, the wire leads from the sensors are designated 222, 224, the former referring to the data paths from the sensors of whatever cells may at any period of time be in the active partition, and the latter referring to data paths from the sensors of cells then in the passive partition. The multiplexer scans the sensors sequentially (the order of scanning does not change regardless of the partition in which any sensor may be at the time its data is sampled), and places the sampled information on one of data buses 212, 214.

The outputs of passive partition control 88 and switching control 92 are connected, through data paths 219, 202, respectively, to instrument module 90. Instrument module 90 includes inverting (typically Ortec EG & G 427A) and delay amplifiers, and connects with cascaded counter/timer 93 and calibrator 94, which in turn are connected to master control 26 by data path 206.

L.E.D. 98 and L.E.D. 100, referred to collectively as L.E.D. 50 in FIG. 1, are connected to and receive signals from master control 26 via line 210. The first, when lighted, tells the operator when the battery must be recharged using an external source; the second, when the battery must be replaced.

FIG. 8 shows the flow of sensor data and feedback test signals. The wire leads from the sensors, comprising data lines 222 and 224, continuously carry active and passive sensor data signals, respectively, to the multiplexer 106. The multiplexer scans the incoming leads at predetermined time intervals, which may vary from a few milliseconds to about 15 minutes and typically are about five minutes. Since sensor data are strongly auto-correlated, the multiplexer scans each lead a predetermined number of times (preferably five times) during each such time interval; and the time delay between each scanning is preferably on the order of microseconds.

Each individual sensor (e.g., the P sensor or the T sensor of the type I sensor pair) in each cell-unit has five reserved slots on each of data buses 212, 214, one for each of the five data signals received from the sensor during a particular time interval. Data signals from sensors in cell-units in the passive partition are placed in the proper time slots on data bus 212; data signals from cell-units in the active partition are placed in the proper time slots on data bus 214.

Each data bus branches in logic unit 112 to input both the NAND device 110 and the NOR device 108. Although both of the data buses have five corresponding time slots for each sensor, a cell-unit (and hence its sensor) is either in the active or passive partition at any particular time. Thus, data from a particular sensor can fill the reserved data bit locations in only the presently appropriate bus 212, or 214. Because NAND gate 110 has a reverse biased diode on its input lead from active sensor bus 214, it will always have a 0 at that lead; and will have a 1 on its other lead (connected to passive sensor bus 212) when passive sensor data is present on that bus. The NAND gate truth table will produce at the NAND gate output a replica of the 1 signal when passive data is present at the bus 212 input to the NAND, and no data at the NAND output when data is present only on active sensor bus 214. Similarly, the NOR gate 108 will output only active sensor data. In this way, the logic unit routes data from the sensors in the passive and active partitions, via data lines 212 and 214, to passive partition control 88 and switching control 92 respectively.

Sets of passive sensor data signals are transmitted from passive partition control 88 via data bus lines 219, 204, and 206 to master control 26 where they are stored in passive data register 360 which has a sufficient number of preassigned memory locations reserved for each set of cell-unit sensor information signals (whether or not the unit is presently passive or active). The time slots on the data bus assigned to each cell unit are stored in the memories of the above-mentioned controls; the time slots are tracked as sensor data signals are read.

Sets of active sensor data signals are sent via data bus lines 202, 204, and 206 from switching control 92 to master control 26. In master control 26, the data signals are stored in active data register 380, which also has a sufficient number of preassigned memory locations reserved for each set of cell-unit sensor information signals.

If, as in the preferred embodiment, the multiplexer scans each sensor five times every five minutes, five sets of sensor data signals (one set of data signals from each of the sensors for each of the times $T_1$, $T_2$, $T_3$, $T_4$, $T_5$ within the five minute time interval) are stored in the appropriate active or passive data registers. When the multiplexer scans the sensors during the next time cycle, some five minutes later, the new sets of data signals are written in the registers over the previous data.

In normal steady-state operation of the FIG. 7 preferred embodiment, there are four cell-units in each of the active and passive cell partitions, and secondary control 92 will switch cell-units from one partition to the other so that each active cell-unit is operating efficiently. As in the FIG. 1 embodiment, when data from sensors in an active cell-unit show that the values of the operating parameters of the cell-unit are outside desired ranges, the cell-unit is switched off load into the passive partition and a restored passive cell-unit is switched on load to replace the now-passive cell-unit. As such switching is accomplished, the number of 3 cell-units in each of the partitions remains constant, but the particular cell-units in each partition change as required to ensure that all cell-units in the active partition are operating as desired.

In the FIG. 7 embodiment, the desired operating parameter values on which control and switching are based are cell temperature ($T_D$), vapor pressure ($P_D$), capacity ($C_D$), pH ($pH_D$), current ($J_D$), and voltage ($V_D$). For initial battery operation master control stores in register 314 desired operating parameter values as follows:

---
INITIAL DESIRED OPERATING PARAMETER VALUES

Temperature: $T_o$ = 75° F. (room temperature)
Pressure: $P_o$ = 1 atm.
pH: $pH_o$ = 2
Voltage: $V_o$ = 1.5 volts (per cell)
Current: $j_o$ (rate for 6 hrs.)
 = [C/6]/cell plate area
 = 40 milliamps/cm$^2$
Capacity: $C_o$ = 30 amp-hrs. (per cell)
---

Master control 26 stores in register 312 allowed first differences which are defined to be the permitted range of values about the corresponding desired operating parameter values:

ALLOWED FIRST DIFFERENCES

Temperature: $\widetilde{\Delta T}=0.25T_o$ or 17.5° F.
Pressure: $\widetilde{\Delta P}=0.2P_0$ or 5 psi
pH: $\widetilde{\Delta pH}=0.025pH_o$ or 0.5
Voltage: $\widetilde{\Delta V}=V_o/6$ or 0.25 volts
Current: $\widetilde{\Delta j}=0.2j_o$ or 8 ma/cm$^2$
Capacity: $\widetilde{\Delta C}=0.3C_o$ or 9 amp-hrs.

When each of the allowed first differences is defined as some fraction of a standard deviation, the six critical operating parameters and their corresponding allowed first differences together can be used to define a unique normalized Gaussian distribution, from which can be generated a normalized Gaussian density hypersurface in hyperspace. Six of the dimensions of the hyperspace are the six operating parameters, and the functional interrelation among them is a measure of entropy (or, conversely, the amount of battery discharge). The density hypersurface represents a desired operating surface, where each point on the surface constitutes a set of the six desired operating parameter values for a specific moment in the battery's discharge life.

For maximum efficiency, battery operation under load is controlled such that, at every level of battery discharge, the actual values of the battery's six operating parameters correspond to a point on the desired operating surface. In practice, battery efficiency is increased by controlling cell-unit operations so that, for a given level of battery discharge, the actual parameter values are held as close as reasonably possible to the parameter values of a point on the desired operating surface; the amount of departure permitted from those values is based largely on engineering considerations. Master control 26 uses the desired point's parameter values and the allowed first differences (disclosed above) to determine whether cell-units, as a whole or separately, are discharging, or are capable of discharging, in such a way that the cell-units' actual parameter values correspond to a point on or near the desired operating surface. Master control 26 makes this determination by continuously monitoring the values of at least four of the six operating parameters of the cells under load (i.e., pressure, temperature, pH, and capacity) and comparing data obtained from the sensed values to desired value data.

The above-disclosed initial desired operating parameter values ($T_o$, $P_o$, $C_o$, $pH_o$, $j_o$, and $V_o$) may be used as the values of the initial point on the desired operating surface. However, once discharge commences, another surface point may be more suitable to describe the discharge level and corresponding desired operating parameter values. Thus, the set of initial desired operating parameter values may be updated by choosing another point on the desired operating surface and replacing the initial desired values with the chosen point's operating parameter values. As the battery discharges over time, the locus of past sets of desired operating parameter values will define a path moving along the desired operating surface. The particular discharging path can be predetermined; normally it will depend on the rate at which power is extracted from the battery.

In the FIG. 1 embodiment, master control 26 accepted as accurate the sensed values of the various parameters monitored by sensors 22, 24 and routed to master control 26 by multiplexer 106. In the FIG. 7 preferred embodiment, the master control conducts two tests to verify the accuracy of the signals which are representative of experimental sensor values. The first of these tests is an autocorrelation test, to insure the statistical reliability of the sensor's data signals. The second test is a feedback signal test, to insure the accuracy of the information in the data signals' headers as to the cell-units' active or passive status.

The autocorrelation test is based on the knowledge that sensor data from all six operating parameters are going to be highly autocorrelated, i.e., the present observation as to the sensed value of each parameter is going to be relatively well predicted by one or more of the immediately preceding obervations of the parameter value.

Before partition monitoring begins, master control 26 receives one complete set of sensor data and, using a conventional autocorrelation program stored in its memory, generates desired autocorrelation coefficients for each of the six operating parameters. During the time that data signals are being transmitted from the sensors through the secondary controls 88, 92 to registers 360, 380 in master control 26, instrument module 90 samples both active and passive sets of data signals, choosing a set of five data signals transmitted from one of the sensors in one of the sensor pairs. It produces a replica of the sampled set, which is delayed and then transmitted via data bus lines 204 and 206 to master control 26.

Master control 26 uses its autocorrelation program, the sampled set of data signals and the delayed replica set to determine the statistical reliability of the data. It generates a sample autocorrelation coefficient, which it compares to the respective desired autocorrelation coefficient for the parameter in question. If, using a predetermined reliability level (typically 0.80), master control 26 determines that the desired and sensed coefficients correspond, it will make its monitoring decisions based on the data being routed through multiplexer 106. It will also replace its desired autocorrelation coefficient with the sensed autocorrelation coefficient. If master control 26 does not obtain an 80% confidence interval, it will not make decisions based upon that data. Instead, it will wait for the next set of data signals from the sensors before monitoring.

The feedback signal test determines whether the data was received from the proper partition. Within the time slot allocated to a particular cell-unit and after the sensor data has begun to be received by master control 26, the master control generates a feedback test signal to test whether the set of data has been transmitted by the proper logic device. The signal is sent from the master control via data bus lines 216, 219, and 202 to passive partition control 88 or switching control 92, depending on whether the signals representing data originally sent to the master control were from sensors in passive or active units respectively.

If the data signals were from passive cell-units, the feedback test signal is sent to passive partition control 88. Passive partition control 88 sends the feedback test signal on data bus lines 213 to passive cell partition 18 and back through the NAND device 110 and passive partition control 88 to the master control.

The return of this test signal to master control 26 indicates that a closed circuit through the NAND device 110 properly exists and that passive partition control 88, and not switching control 92, is receiving the sensor signals representing passive data.

A nonreturn of the signal indicates that the NOR gate 108 is improperly transmitting the sensor data through switching control 92 or, that a cell was not switched or improperly switched from one partition to the other by switching control 92. The master control corrects the malfunction by turning the system off for a moment or, preferably, by instructing switching control 92 to switch the cell-units which are in the wrong partition. Similarly, if the master control was operating as if it received sets of sensor data from an active cell-unit, the active sensor data acquisition path from active cell partition 14 through NOR gate 108 and switching controller 92 is checked.

Once the accuracy of the data is established, i.e., it was received from the proper (active or passive) partition and is statistically reliable, master control 26 begins the routines which monitor the operating efficiency of the battery and control switching, recharging and restoration of the individual cell-units.

In conducting the monitoring and controlling tests, master control 26 may examine an operating parameter by testing one of the five sensed values received from a particular sensor. Master control 26 may examine a parameter using a more sophisticated, statistical estimate of its value, the estimate generated using conventional statistical techniques such as the method of maximum likelihood or least squares. In the FIG. 7 embodiment maximum likelihood estimates are preferred. In the case of an estimate from a set of five data readings (or more than five data readings if the parameter in question was measured by more than one sensor), the maximum likelihood estimate would be an average.

Throughout the following discussion, references are made to estimated values (values based on sensor data and generated using conventional statistical estimating techniques) and to estimated differences (differences between estimated and desired values). It should be understood that, in all such cases, the monitoring and controlling routines and tests could (and in many embodiments will) be conducted using the actual sensed values (or averages thereof) received from sensors and the actual differences between the sensed and desired values.

The various statistical techniques and comparisons used by master control 26 are conventional and may be performed using standard software packages such as those designed for the International Mathematical and Statistical Library (IMSL) languages. Such packages include software by Stromberg-Carlson, Tectronix (4000 Series Terminals) Zeta software, and Multics APL Graphics. The IMSL language, as described in "AP1, Revisions 4," a computer software index published by the MIT Information Processing Center, is capable of executing the following routines: BASIC Statistics, Analysis of Experimental and Categorical Data, Regression Techniques, Multivariate Analysis, Sampling, Confidence Intervals, Correlation Time-Series Analysis (including cross-correlation and auto-correlation), Generalized Least-Squares Estimating, and Matrix Operations. The IMSL Language is described in APL handbooks published by Honeywell and IBM.

To assist in understanding the following routine and test descriptions, some statistical and algebraic definitions are included in the following description of the master control's testing techniques.

As discussed with reference to the FIG. 1 embodiment, one test used by the master control is a difference comparison. For initial passive monitoring, master control 26 compares (i) the estimated difference between the passive units' sensed cell capacity ($\overline{C}$) and its currently-desired value ($C_D$), to (ii) cell capacity's allowed difference ($\Delta \overline{C}$). If the negative of the estimated difference ($C_D - \overline{C}$) is greater than the allowed difference (i.e., sensor value $\overline{C}$ is less than the minimum allowed cell capacity), master control sends signals to recharge all units of the passive partition. If the negative of the estimated difference is less than the allowed difference, then the passive units' cell capacity is at least as good as the minimum allowed cell capacity, and master control starts an individual unit monitoring routine.

For active monitoring, master control 26 generates statistical estimates of the means of temperature ($\overline{T}$) and pressure ($\overline{P}$) and computes the absolute value of their respective estimated differences; i.e. $|\overline{T} - T_D|$, $|\overline{P} - P_D|$. Master control then compares $|\overline{T} - T_D|$ and $|\overline{P} - P_D|$ to their respective allowed differences, $\Delta \overline{T}$ and $\Delta \overline{P}$.

If $|\overline{T} - T_D|$ is less than $\Delta T$, and $|\overline{P} - P_D|$ is less than $\Delta \overline{P}$, the estimated temperature and pressure values are within the desired ranges, and the active partition as a whole is operating efficiently.

If either $|\overline{T} - T_D|$ is greater than $\Delta \overline{T}$, or $|\overline{P} - P_D|$ is greater than $\Delta \overline{P}$, master control 26 uses another kind of test to examine the interrelationship between temperature and pressure values. As previously indicated, the six parameters are functionally related to each other, and a change in one of the parameters is accompanied by changes in the other parameters. To take advantage of this fact, master control 26 may use a monitoring routine which would examine any of several measures of conjoint differences between temperature and pressure. One such test, discussed with reference to FIG. 1, involves comparing the product of sensed and allowed differences of two related parameters. Other tests involve testing statistical measures such as covariances or correlation coefficients of the two parameters.

To assist in understanding covariances and correlation coefficients, some definitions follow.

The standard deviation ($\sigma_i$), referred to above in the discussion of the Gaussian surface, is a commonly used statistical measure of the dispersion of sensed data. It is the square root of the variance, which is based on deviations of sensed values from the mean. The mean is the expected (or the most likely) value of a parameter. In quantitative terms, the mean is designated E(i) or, for the purposes of this embodiment, $i_D$. Quantitatively, the standard deviation is the square root of the expected value of a parameter squared, minus the mean squared; i.e., the square root of $E[(i)^2] - i_D^2$. As already stated, the allowed difference of an operating parameter is defined as the allowed standard deviation of that parameter.

The covariance (cov(i,j) or $\sigma_{ij}$) is a measure of the degree to which two parameters move together. In quantitative terms, it is the expected (or the most likely) value of the product of the differences between two parameters and their respective ideal parameters; i.e., $E[(i-i_D)(j-j_D)]$. The covariance of one parameter with itself equals the variance of a parameter; i.e., $\sigma_{ii} = \sigma_i^2$.

The correlation coefficient ($r_{ij}$) is another measure of the degree to which two parameters move together. In quantative terms, it is the covariance of parameters i and j divided by the product of the standard deviations of i and j, or $$r_{ij} = \frac{\sigma_{ij}}{\sigma_i \sigma_j}$$

Thus, in order to determine whether the conjoint changes in temperature and pressure have exceeded their allowed conjoint changes, master control 26 could examine either experimental and allowed joint differences (as discussed with reference to FIG. 1), covariances or correlation coefficients. If a covariance test is used, master control 26 generates the experimental covariance of temperature and pressure, cov(T,P), and compares cov(T,P) to the "allowed" covariance of temperature and pressure, cov($\overline{T},\overline{P}$), which is generated using $\Delta\overline{T}$ and $\Delta\overline{P}$ as $|\overline{T}-T_D|$ and $|\overline{P}-P_D|$. If cov(T,P) is greater than cov($\overline{T},\overline{P}$), the estimated values of $\overline{T}$ and $\overline{P}$ are not within the allowed ranges about $T_D$ and $P_D$, and the active partition is not operating efficiently.

In the preferred embodiment, master control 26 generates the correlation coefficient of temperature and pressure, $r_{TP}$, and compares it to the "allowed" correlation coefficient of temperature and pressure, $\overline{r}_{TP}$, which is generated using $\Delta\overline{P} \Delta\overline{T}$ as $\sigma_T \sigma_P$. If $r_{TP}$ is greater than $\overline{r}_{TP}$, the estimated values of T and P are not within the allowed ranges about $T_D$ and $P_D$, and the active partition is not operating efficiently.

At times, master control 26 compares more than one set of estimated and allowed correlation coefficients. For example, during the passive unit routine (a routine in which the operating efficiency of individual passive cell-units is examined), master control 26 may simultaneously examine up to four parameters, namely temperature (T), pressure (P), cell capacity (C), and pH (pH). In that case, master control 26 examines six correlation coefficients at the same time; i.e., $r_{TP} = r_{PT}$, $r_{TC}$, $r_{TpH}$, $r_{PC}$, $r_{ppH}$, and $r_{CpH}$. During the active unit routine, master control 26 may simultaneously examine all operating parameters but the cell current, j. In that case, master control examines the above-listed six correlation coefficients plus $r_{TV}$, $r_{PV}$, $r_{CV}$, and $r_{pHV}$. When master control 26 examines more than one pair of parameters at a time, it organizes the coefficients into a correlation matrix, generates the inverse of the matrix, and then calculates the determinant of that inverted matrix.

A correlation matrix is a matrix of correlation coefficient terms, having as many rows and columns as parameters which are being compared. The element of the ith row, jth column is the correlation coefficient for parameters i and j. Since the correlation coefficient for a parameter and itself (i.e., when its current values are compared to its own current values) is 1, all of the diagonal elements of a correlation matrix have the value 1.

The inverse of a matrix X (designated $X^{-1}$) is a matrix which, when multiplied with the original matrix, generates the identity matrix (the matrix having ones in all of its diagonal element positions and zeros in every other element position). The determinant (designated $\Delta$) is a function in matrix algebra which produces a specific value from the elements of a matrix. The value is generated through the following definition:

$$\text{If the matrix is } \begin{bmatrix} X_{11} & X_{12} & X_{13} \\ X_{21} & X_{22} & X_{23} \\ X_{31} & X_{32} & X_{33} \end{bmatrix}$$

then $$\Delta = X_{11}X_{22}X_{33} + X_{12}X_{23}X_{31} + X_{13}X_{21}X_{32} - X_{31}X_{22}X_{13} - X_{32}X_{23}X_{11} - X_{33}X_{21}X_{12}.$$

Thus, from a matrix containing a number of correlation coefficients, master control 26 generates a single value based on all of the values of the correlation coefficient. Master control 26 uses that value to determine whether a unit's operating parameter values are outside allowed ranges, i.e., the cell-unit under load is discharging in such a way that, for the present moment in a cell-unit's discharge life, the values of its six operating parameter describe a point which does not lie on or near to the desired operating surface.

Master control 26 compares the absolute value of the determinant ($|\Delta|$) to a predetermined value (typically between 0.1 and 0.3, and preferably 0.2) that represents the permitted fraction of a standard deviation which defines the approximate size of the allowed ranges. If the value of the determinant is less than 0.2, the cell-unit is assumed to be discharging efficiently. If the value of the determinant is greater than 0.2, the cell-unit is not discharging efficiently and recharging and/or restoring is required.

As previously indicated, the values of the desired operating parameters must periodically be updated as the battery discharges. In the FIG. 1 embodiment, the four pertinent parameters were updated by periodic averaging. Using all of the available data from both active and passive senssors, master control 26 generated an average value for each of the four parameters. When the difference between any operating parameter's desired and average values was greater than the corresponding permitted difference, master control 26 replaced, in its memory, the desired values with the average values.

In the FIG. 7 preferred embodiment, master control 26 generates five of the new desired operating parameter values (namely, $T_D$, $P_D$, $pH_D$, $C_D$, and $V_D$) by multiplying the matrix composed of their then-current desired operating parameter values by the corresponding matrix of their corresponding experimental correlation coefficients. The sixth operating parameter, j, is updated by replacing the then-current desired value with the then-current statistical estimate of cell-unit current.

The use of matrices and the calculations involved in multiplying or inverting matrices and generating determinants are standard, and the above described software and language are equipped to handle matrix operations. The updating procedure used in the preferred embodiment is described in more detail hereafter.

We turn now to FIG. 9. As there shown, the operation of the preferred embodiment includes three sets of routines, the passive partition routines, the active partition routines, and the partition control routines.

The passive partition routines are concerned with determining whether the cell-units in the passive partition are capable of discharging efficiently and, if not, adjusting the appropriate one(s) of their operating parameters accordingly. The four routines involved, all of which are discussed in more detail hereafter are:

1. Passive routine start-up, which is shown in more detail in FIG. 12, collects sets of passive sensor data from one register in master control 26 and stores them in a temporary register for later use;

2. Cell capacity comparison routine, which is also shown in FIG. 12, determines whether the capacity of all of the passive cell-units, considered together, is acceptable or if the cell-units need recharging;

3. Passive unit routine, which is shown in FIG. 15, conducts a cell-unit by cell-unit examination of the cell-units in the passive partition to determine if restoring or recharging is appropriate; and 4. Passive restoring routine, which is shown in FIG. 16, determines the restoring adjustments necessary to bring the cell-unit's operating parameters (typically pressure, temperature, and pH) sufficiently close to acceptable values.

The active partition routines, which are triggered by completion of various ones of the passive partition routines, perform two basic functions, updating and monitoring. The update trigger routine (shown in more detail in FIG. 22) determines when battery discharge has advanced to the point that proper control can no longer be accomplished using the current set of desired operating parameter values. The update replacement routine (shown in more detail in FIGS. 22 and 23) generates a new set of updated desired operating parameter values. The temperature/pressure comparison routine (shown in detail in FIG. 19) and the active unit routine (shown in detail in FIG. 20) monitor the operating parameter values of cell-units in the active partition and cause them to be switched to the passive partition when recharging or restoring is required.

The partition control routines, shown in detail in FIGS. 13, 17 and 21, keep track of the location (active partition or passive partition) of each cell-unit, trigger the start of the active and passive partition routines (whichever is appropriate), send signals to switch control 92 to control switching of cells between partitions, and send signals to switch control 88 to control recharging and restoration procedures.

In addition to the routines shown in FIG. 9, the system also includes initializing routines (one of which is illustrated in FIG. 10) and a number of routines (FIG. 24-29) related to the operation of the load monitor.

Initializing routines are those routines which the master control uses to order appropriate partitioning and monitoring on power-up. Such routines may include routines in which master control 26 retrieves the earlier stored addresses of cell-units in the last previous active partition, and orders the placement of each of the formerly active cell-units into the new active partition. In that case, the new active and passive partitions will be identical to the last active and passive partitions. For initial power-up of a new battery or one that has been recharged from an external source, a memory in master control 26 is loaded with four addresses which form a predesignated initial active partition.

The preferred initializing procedure is one in which master control 26 forms an active partition of four cell-units by either increasing or decreasing the size of the last previous active partition. The procedure by which the master control increases the size of the active partition is illustrated in FIG. 10. The decreasing procedure (not shown) is essentially the same. Both routines send partitioning orders and the active cell-unit addresses to switch control 92, signal the beginning of the multiplexer 106 operation, and trigger the passive routine (start-up).

Master control 26 uses two registers to keep track of the current operating status of each of the cell-units. Register 302 holds the addresses of all of the cell-units in the active partition. Register 304 holds the addresses of all of the passive cell-units which are restored, recharged, and ready to be inserted in the active partition. Before initial power-up of a new battery and every time the battery is recharged from an external source, register 302 is loaded with four active cell-unit addresses.

Referring to FIG. 10, registers 302 and 304 send their addresses to the partition control routine, which reads the number of active cell-unit addresses in register 302. If register 302 contains fewer than four addresses, the partition control routine transfers, from register 304 to register 302, as many addresses as are necessary so that register 302 contains four addresses.

The partition control routine then sends signals representative of an initial partitioning order and the addresses in register 302 to switching control 92, via data bus lines 216, 219, 202. The initial partition switching signal initiates the start of a program stored in the memory of switching control 92, the output of which is a set of switching signals with headers denoting the identity of each of the cell-units to be switched into the initial active partition and each of the cell-units to be switched into the initial passive partition. As shown in FIG. 11, the signals are sent via bus line 215 to a relay switch control contained in multiplexer 106 which reads each header and directs the corresponding switching signal via bus line 226 or 266 to the appropriate CMOS switch 6, 7 of the appropriate cell-unit. The switching signal causes the CMOS to switch and the cell-unit is instantaneously electrically connected to the other partition. The feed back test signal, described above, ensures that proper switching has taken place.

Simultaneously with sending the active and restored cell-unit addresses to switch control 92, the partition control routine begins the transmittal of signals representative of sensor data by sending a "commence monitoring" signal on data lines 216, 213 to multiplexer 106. The partition control routine triggers the passive routine (start-up), which begins passive cell-unit monitoring.

The passive routines monitor the passive partition to determine whether the passive cell-units are capable of discharging efficiently. As shown in FIG. 12, the passive routine (start-up) causes data register 360 to send signals representative of passive sensor data into passive data register 310, a temporary register having a sufficient number of predesignated memory locations for each sensor's set of five data readings. Thus, only one set of passive sensor output from each sensor will be tested by the following monitoring routines.

When data has been received by register 310, the passive routine causes master control 26 to send a clear signal to stack 330, thus clearing old data out of the memory location into which will be written the addresses of passive cell-units found to be recharged, restored and thus capable of efficient operation. Master control 26 also clears stack 331, the memory location into which will be written the addresses of passive cell-units which need recharging.

The receipt of data by register 310 also starts the passive partition cell capacity comparison routine, also shown in FIG. 12. In this routine, master control 26 tests the cell capacity of the passive partition, considered as a whole. (In the passive unit routine, described below, master control 26 tests cell capacity unit by unit.) Master control 26 computes the estimated difference between passive units' estimated cell capacity and $C_D$, and compares the negative of the estimated difference to the cell capacity's allowed difference.

If the estimated cell capacity of the sensed passive cell-units (i.e. the cell-units in the passive partition having type II sensors) is lower than the minimum allowed cell capacity for active or potentially active cell-units (i.e., $C_D - \Delta \overline{C}$), the passive routine of master control 26 sends a signal to the passive partition control 88 to recharge the entire passive partition. A detailed description of the passive cell capacity comparison routine follows.

As shown in FIG. 12, the routine sends signals to register 310, asking to read all the sensor data corresponding to cell capacity (C) into the statistic package's autocorrelation estimating routine, which, using the method of maximum likelihood, generates an estimate of capacity, $\overline{C}$. The estimating routine reads register 314 for the desired value of cell capacity ($C_D$), subtracts $\overline{C}$ from $C_D$, and then returns control to the cell capacity comparison routine.

If $\overline{C}$ is less than 7.5 amp-hrs (the minimum allowable cell capacity for any single cell, whether active or passive), the battery must be recharged by an external source. Master control 26 sends a signal to LED 50. The comparison routine also reads, from register 312, the value of $\Delta \overline{C}$, cell capacity's allowed first difference. It then compares $C_D - \overline{C}$ to $\Delta \overline{C}$.

If $C_D - \overline{C}$ is greater than $\Delta \overline{C}$, then $\overline{C}$ is worse than the minimum allowed cell capacity for active or potentially active cell units (i.e., $C_D - \Delta \overline{C}$). The comparison routine sends a signal to the partition control routine to order recharging for the entire passive partition.

As shown in FIG. 13, the partition control routine first determines whether there is an override signal being generated by the active partition size change routines (the active partition size change routines are described in a later section). If there is a override signal, the routine waits until the signal is shut off.

When there is no longer an override signal, the partition control routine erases all of the addresses from register 304 (the memory location of restored passive cell-units addresses). The routine then reads the active cell-unit addresses (stored in register 302) and transmits them to passive partition control 88 along with signals representing instructions to recharge all battery cell-units except those having active addresses. After the partition control routine sends that information, it triggers the start of the active routine (described in a later section).

The receipt of recharging signals from the partition control routine triggers a program in the memory of passive partition control 88 to send recharging signals via data bus line 213 to multiplexer unit. As shown in FIG. 14, the multiplexer reads the header on the signal and, based upon the first header, routes the signal via data bus lines 226 to the intended cell-unit CMOS switch 7.

The switch, upon receiving this signal, instantaneously closes the connection between the cell-unit and switch mode converter 46, commencing the recharging operation via lines 277, 230, and 231. In general, the switch mode converter delivers constant current from the reserve cells 20 to the recharging passive cell-units. When the cell-unit is almost recharged, the converter delivers constant voltage until the cell-unit is recharged to the desired level. Whether or not passive units are recharging, and even when no load is applied, reserve cells 20 are recharged by a continuous trickle charge tapped from alternator 74 via lines 274, 275.

Returning to FIG. 12, if the cell capacity comparison routine instead finds that $C_D - \overline{C}$ is less than $\Delta \overline{C}$, the passive partition's estimated cell capacity is at least as good as the minimum allowed cell capacity for active or potentially active cell-units. In this event, control is passed to the passive unit routine, shown in FIG. 15, which examines the cell-units in the passive partition one by one to determine if the individual unit's cell capacity and other operating parameter values (e.g., pressure, temperature, and pH) are acceptable.

If the passive unit routine finds acceptable pressure, temperature and pH values for the above parameters in a cell-unit of the passive partition, the passive unit routine saves that cell-unit's address, eventually sending it to the partition control routine, which enters the address in register 304 (the memory location for recharged and restored passive cell-unit addresses) and sends signals to passive partition control 88 to stop recharging or restoring the cell-unit.

If the passive unit routine finds that a cell-unit's cell capacity is less than the minimum allowed cell capacity for active or potentially active cell-units, the passive unit routine saves that cell-unit's address, eventually sending it to the partition control routine, which erases the address from register 304 (the memory location for recharged and restored passive unit addresses) and sends signals to passive partition control 88 to recharge the cell-unit.

If any cell-unit has unacceptable temperature, pressure or pH values, the cell-unit needs to be restored. The passive unit routine saves that cell-unit's address, eventually sending it to the passive restoring routine, which determines the appropriate restoring procedure for the set of unrestored units.

In somewhat more detail, and with reference to FIG. 15, the passive unit routine monitors the the passive partition on a unit by unit basis as follows. For each cell-unit, starting with the first cell-unit in register 310, the passive unit routine sends all signals representative of data from any type I or II sensor pair (i.e., data on all operating parameters but voltage and current) from register 310, to the statistics package autocorrelation estimating routine.

Using information in the data signals' headers as to monitor time, cell-unit and sensor identification, the statistics package autocorrelation estimating routine generates estimates of the cell-unit's parameter values. Using those estimates and the corresponding desired operating parameter values, the routine generates a correlation matrix which has as its elements the estimated correlation coefficients of all parameters (but current and voltage) which were sensed by a passive sensor 24 in the cell-unit in question. The routine inverts the matrix, computes the determinant $\Delta$ of the inverted matrix, and transfers control and signals representative of $C_D - \overline{C}$, and the absolute value of $\Delta$ ($|\Delta|$) to the passive unit routine.

The passive routine first examines the cell-unit estimate of $\overline{C}$. (If the cell-unit lacked a type II sensor pair, the unit routine skips this step, moving to the below-described determinant comparison.) Using the value $\Delta \widetilde{C}$ from register 312, the passive unit routine compares $C_D - \overline{C}$ to $\Delta C$.

If $C_D - \overline{C}$ is greater than $\Delta \widetilde{C}$, C is less than the minimum allowable cell capacity for active or potentially active cell-units. The passive unit routine saves the address of the cell-unit in question in stack 331, and the passive unit routine begins to examine the next cell-unit. If $C_D - \overline{C}$ is less than $\Delta \widetilde{C}$, C is at least as good as the minimum allowable cell capacity for active or potentially active cell-units, so the unit routine examines the determinant The unit routine compares the absolute value of $\Delta$ to a predetermined value between 0.1 and 0.3, the value in this embodiment being 0.2. If $|\Delta|$ is less than 0.2, the passive cell-unit in question is capable of operating efficiently. Its address is saved in stack 330. If $|\Delta|$ is greater than 0.2, the cell-unit is still not capable of operating efficiently, so its address is not saved.

In either case, after the determinant comparison, the passive unit routine begins to monitor the next cell-unit. It continues to conduct such calculations and comparisons until no more cell-units are left to be tested in register 310. It then sends a set of signals representative of a trigger and the contents of stacks 330, 331 to the partition control routine (described in a later section), where the addresses in stack 330 are added to, and the addresses in stack 331 are subtracted from, register 304 (the memory location of passive restored unit addresses).

The passive unit routine also triggers the passive restoring routine when the passive unit routine has finished testing all of the passive cell-units. As described in FIG. 16, the passive restoring routine determines which passive cell-units need restoring and which type of restoring they need. It causes master control 26 to send restoring signals to the passive partition control 88 via data bus line 216.

In more detail, the passive restoring routine initially identifies all of the passive cell-unit addresses by reading passive data register 310. It reads stack 331 in order to identify all of the unrecharged passive cell-unit addresses, and also reads stack 330 in order to identify all of the restored and recharged passive cell-unit addresses. It compares all three sets of addresses, thus determining whether there are any currently recharged but unrestored passive cell units.

If there are no recharged but unrestored passive cell-units, restoring procedures are not necessary; the restoring routine ends. If there are recharged but unrestored passive cell-units, the restoring routine orders the restoring instructions. It reads passive data register 310 in order to obtain the sensor output from the cell-units in need of restoration. The passive restoring routine sends the collected data to the statistics package autocorrelated estimation routine which, again using the method of maximum likelihood, generates estimates for temperature ($\overline{T}$), pressure ($\overline{P}$), and pH ($\overline{pH}$).

The restoring routine then compares the estimates $\overline{T}$, $\overline{P}$, and $\overline{pH}$ to the desired operating parameter values $T_D$, $P_D$, and $pH_D$, which it read from register 314. If $\overline{P}$ is greater than $P_D$, the cell-unit pressure is too high and the restoring routine sends a venting signal to passive partition control 88. If $\overline{P}$ is less than $P_D$, the cell-unit pressure is too low and the restoring routine sends a heating signal. If $\overline{T}$ is less than $T_D$, cell-unit temperature is too low; the routine, again, sends a heating signal. If $\overline{T}$ is greater than $T_D$, the routine sends a refrigerating signal.

If $\overline{pH}$ is greater than $pH_D$, cell-unit pH is too acidic; the routine sends an acidic titrating signal and a signal representative of the difference between sensed and desired pH ($\overline{pH} - pH_D$) If $\overline{pH}$ is less than $pH_D$, the restoring routine sends a basic titrating signal and a signal representative of $\overline{pH} - pH_D$.

The restoring routine sends all of the restoring signals, along with the addresses of the recharged but unrestored units, to the passive partition control 88 via data bus line 216.

The restoring signals from the passive restoring routine in master control 26 trigger a restoring program contained in the memory of the passive partition control 88. Using $\overline{pH} - pH_D$, the program determines the proper pH buffer and sends a signal with the recharged but unrestored cell-unit addresses and temperature, pressure, and pH instructions via data bus line 262 to the intended restoration unit (e.g. heater, refrigerator, titrator, vent) connected to the cell-units requiring restoration. The signal causes the respective CMOS switch of the restoration unit to close the circuit of the restoring unit (e.g. temperature, pressure, and the proper pH buffer vial) and initiate the restoration process.

Referring back to FIG. 15, when the passive unit routine has completed its examination of the passive cell-units, the passive unit routine sends a triggering signal and the contents of stack 330, 331 to the partition control routine. The partition control routine stores the recharged and restored cell-unit addresses in register 304, erases from register 304 the addresses of cell-units which need recharging, stops recharging and restoring procedures on the stack 330 cell-units, orders recharging for the unrecharged stack 331 cell-units, and triggers the start-up of the active routine. If there were no addresses saved in stacks 330 or 331, the partition routine simply triggers the start-up of the active routine.

As shown in FIG. 17, the partition control routine first determines whether there is an override signal being generated by the active partition size change routines. (The active partition size change routines are described in a later section.) If there is is an override signal, the partition control routine waits until the signal is shut off. Then the routine reads the addresses of Stack 330 into register 304, which stores the addresses of recharged and restored passive cell-units ready to be added to the active partition. (If the stack 330 addresses are already in register 304, the routine does not write them again.) The routine next erases the addresses of stack 331 from register 304.

The partition control routine then sends three more sets of signals. It transmits the contents of stack 330 (the addresses of the newly recharged and restored cell-units), stop recharge signals, and stop restore signals to passive partition control 88, via data bus line 216. It also transmits the contents of stack 331 (the addresses of unrecharged units) and recharge signals to passive partition control 88, also via data bus line. Finally it triggers the start of the active routine (described in later sections).

As previously indicated, the stop recharge signal, sent by the partition control routine to the passive partition control 88 via data bus line 216, triggers a stop recharge program contained in the memory of control 88. This program outputs a set of signals with cell-unit address headers. The signals are sent to multiplexer unit 106, which routes the signals to the intended CMOS switch. The signals open the intended CMOS switch, which opens connection 230 between switch mode converter 46 and the specified cell-unit to end the recharging process.

The stop restore signal is also sent by the partition control routine to the passive partition control 88 via data bus line 216. It triggers a stop restore program contained in the memory of the control 88 which in turn outputs a set of signals having cell-unit address headers, which are sent via line 262 to the CMOS switches connecting the valves, vents, heaters, refrigerators, and titrators of the cell restoration units 21, 23 to the particular cell unit. Thus, when the parameter restored by each such device, e.g. temperature by a heater, reaches the desired level, a stop signal for that unit is sent opening the related switch and ends the particular restoration process.

We turn now to the active partition routines. The active routine (start-up) is triggered when one of the following has occurred: (1) when the cell capacity comparison routine sends to the partition control routine a signal that all cell-units in the passive partition need recharging, the partition control routine sends a signal to trigger the start of the active routine; or (2) when the passive unit routine signals the partition control routine that unit monitoring is completed, the partition control routine triggers the start of active routine.

As previously indicated, multiplexer 106 acquires and sends data from sensors in both the active and passive partitions. Thus, the initial signal from the partition control routine in master control 26 to multiplexer 106 to commence monitoring (see FIG. 10) causes data from the sensors 22 in the active partition to be sent to active data register 380 in master control 26 (see FIG. 8) where the data signals are stored in preassigned memory locations.

As shown in FIG. 18, and in a manner similar to that previously discussed in connection with the start of the passive routines, the active routine starts by routing one group of the five sets of sensor data from active data register 380 to active data register 308.

When every active cell-unit sensor's set of five data signals has been written into active data register 308, the active routine sends a clearing signal to stack 322, the memory location into which addresses of active cell-units incapable of efficient operation will be written; it also turns off any "monitor finished" signals (signals which, as later described, indicate that active monitoring is finished and that update replacement may be considered).

The active routine reads the desired parameter values of temperature ($T_D$) and pressure ($P_D$) in register 314, and the allowed first differences for temperature ($\widetilde{\Delta T}$) and pressure ($\widetilde{\Delta P}$) in register 312. The routine also reads active data register 308 for sensor I data (the cell-unit temperature (T) and pressure (P) values). The active routine sends all of these values (i.e., $T_D$, $P_D$, $\widetilde{\Delta T}$, $\widetilde{\Delta P}$, and the sensor I values of T and P) to the statistics package autocorrelation estimating routine in master control 26.

In preparation for both the monitoring and updating routines, the estimating routine uses the method of maximum likelihood to generate estimated values for temperature ($\overline{T}$) and pressure ($\overline{P}$). It subtracts $T_D$ from $\overline{T}$, and $P_D$ from $\overline{P}$, and then takes the absolute value of those values, generating $|\overline{T} - T_D|$ and $|\overline{P} - P_D|$.

The master control also generates the estimated correlation coefficient of T and P ($r_{TP} = r_{PT}$). Using $\widetilde{\Delta T}$, $\widetilde{\Delta P}$ and the fact that the operating surface is a normalized Gaussian hypersurface which is defined by the operating parameters and their allowed first differences, the estimating routine then generates the allowed correlation coefficient of temperature and pressure ($\widetilde{r}_{TP}$).

After the estimating routine has performed all of its computations, it sends triggering signals and necessary data to the updating routines (FIGS. 22, 23) and the active monitoring routines (FIGS. 19, 20).

Referring first to FIG. 19, the estimating routine sends a trigger signal and the values $|\overline{T} - T_D|$, $|\overline{P} - P_D|$, $\widetilde{\Delta T}$, $\widetilde{\Delta P}$, $\widetilde{r}_{TP}$ and $r_{TP}$ to the temperature, pressure comparison routine, which compares the above values. The routine first compares $|\overline{T} - T_D|$ to $\widetilde{\Delta T}$, and then compares $|\overline{P} - P_D|$ to $\widetilde{\Delta P}$. If $|\overline{T} - T_D|$ is less than $\widetilde{\Delta T}$, and $|\overline{P} - P_D|$ is less than the values of T and P in the monitored cell units are within the allowed ranges about the desired values. The active partition as a whole is operating efficiently, and switching of active units into the passive partition is not required. The comparison routine turns on the "monitor finished" signal for the update replacement routine, and ends.

If either $|\overline{T} - T_D|$ is greater than $\widetilde{\Delta T}$, or $|\overline{P} - P_D|$ is greater than $\widetilde{\Delta P}$, there may be some active cell-units which are operating inefficiently. In that case, the comparison routine in master control 26 examines the joint movements of temperature and pressure by comparing $\widetilde{r}_{TP}$ to $r_{TP}$.

If the comparison indicates that $r_{TP}$ is less than $\widetilde{r}_{TP}$, the active cell partition as a whole is still operating efficiently and no switching is required. In this case, also, the monitoring routine turns on the "monitor finished" signal for the update replacement routine, and ends.

If $r_{TP}$ is greater than $\widetilde{r}_{TP}$, the cell-unit values of T and P are not within the desired ranges about the desired values; some of the active cell-units are operating inefficiently and should be switched into the passive partition. In order to determine which units should be switched into the passive partition, master control 26 transfers control to the active unit routine, which examines each cell-unit individually.

As shown in FIG. 20, the active unit routine first reads active data register 308 for all of the first cell-unit's sensor data (except for j data). It also reads register 314, for all of the desired operating parameter values except $j_D$. The active unit routine sends signal representative of the above data to the statistics package autocorrelation estimating routine.

Using information in the data signals' headers as to monitor, cell-unit and sensor identity, the estimating routine generates a correlation matrix which has as its elements the estimated correlation coefficients of all parameters (but current) which were sensed by an active sensor 22 in the cell-unit in question. It inverts the matrix, and then computes the determinant $\Delta$ of the inverted matrix.

The active unit routine in master control 26 then compares the absolute value of $\Delta$ ($|\Delta|$) to a predetermined value between 0.1 and 0.3, in this embodiment 0.2. If $|\Delta|$ is greater than 0.2, the active cell-unit in question is in need of recharging or restoring, and master control 26 stores that cell-unit's address in stack 322. If $|\Delta|$ is less than 0.2, the active cell-unit in question is assumed to be still operating efficiently, and the cell-unit address is not saved.

In either event, the active unit routine is ready to test the next active cell-unit. Master control 26 continues the comparisons until all of the active cell-units have been tested. At that point, the active unit routine turns on a "monitor finished" signal for the update replacement routine. If stack 322 contains any addresses of inefficient active cell-units, the active unit routine also sends the contents of stack 322 to the partition control routine.

As shown in FIG. 21, the partition control routine first determines whether there is an override signal being generated by one of the active partition size change routines. (The size change routines are described in a later section.) If there is an override signal, the partition control routine waits the override signal stops. The partition control routine then clears the stack 322 addresses from register 302, the memory location of active cell-unit addresses.

The partition control routine replaces the erased addresses with an equal number of addresses from register 304, which contains the addresses of recharged and restored passive cell-units. The partition control routine then erases the replacement addresses from register 304. (If there are not enough addresses in register 304 to replace the addresses of the units leaving the active partition, the partition control routine replaces as many active unit addresses as possible and causes LED 98 to signal that the entire battery needs to be recharged by an external source or causes LED 100 to signal that the battery needs to be replaced.)

Once registers 302, 304 have been changed, the partition control routine sends four sets of signals. Two of the sets are transmitted to switch control 92 via data bus lines 216, 219, and 202. The first set of signals represents the new active cell-unit addresses and instructions ordering switch control 92 to switch the units with newly active addresses into the active partition. The second set represents the new passive cell-unit addresses and instructions ordering switch control 92 to switch the units with newly passive addresses into the passive partition. Switch control 92 executes the above switching procedure in the same manner as the switching described above in connection with the initial routine (see FIG. 10).

The third set of signals which the partition control routine transmits are signals representing recharging instructions and the addresses of the newly passive units. The partition control routine sends the third set of signals to passive partition control 88; the signals trigger the same recharging program in passive partition control 88 as described in the passive routines section (see FIG. 14).

The fourth set of partition control signals triggers the start of another passive partition monitoring.

The updating routines perform the updating function of the active partition routines. As shown in FIGS. 9 and 18, at the same time that the active routine start-up triggers the temperature, pressure comparison routine, it sends a trigger signal and the values $|\overline{T}-T_D|$, $|\overline{P}-P_D|$, $\Delta T$, and $\Delta P$ to the update trigger routine.

As shown in FIG. 22, the update trigger routine first determines whether passive partition's estimated T and P are at least a predetermined distance away from the desired values $T_D$ and $P_D$. This determination is made by comparing the absolute values of their estimated differences, $|\overline{T}-T_D|$, $|\overline{P}-P_D|$, to a predetermined fraction (in this embodiment, one-half) of the allowed differences, $\Delta T$, $\Delta P$. If $|\overline{T}-T_D|$ is less than $0.5(\Delta T)$, or if $|\overline{P}-P_D|$ is less than $0.5(\Delta P)$, the estimated values $\overline{T}$ and $\overline{P}$ are very close to the desired values $T_D$ and $P_D$; there is no need to update the set of desired operating parameter values. The update trigger routine generates a "no updating" signal, triggers the update replacement routine, and ends.

If $|\overline{T}-T_D|$ is greater than $0.5(\Delta T)$, and $|\overline{P}-P_D|$ is greater than $0.5(\Delta P)$, the estimated values $\overline{T}$ and $\overline{P}$ are sufficiently different from $T_D$ and $P_D$ to indicate that updating is necessary. In that case, the update trigger routine generates an "update" signal, triggers the update replacement routine, and ends.

As shown in FIG. 22, the update replacement routine consists of 2 subroutines. Replacement subroutine 1 is triggered by the "no updating" signals; replacement subroutine 2 is triggered by the "update" signal.

Both subroutines start by waiting for the "monitor finished" signal to be generated by one of the active monitoring routines. When the "monitor finished" signal is received, both replacement subroutines read the contents of stack 322 to determine whether switching has been indicated. If stack 322 contains any addresses, the system's need to switch cell-units precludes updating. Both subroutines end. The do not transfer control to the start up of the passive routine because the partition control routine (which also reads the contents of stack 322) will trigger the next passive monitoring during its natural execution.

If replacement subroutine 1 (which is triggered when the need to switch is indicated) finds no addresses in stack 322, switching is not necessary and the values of T, P are too close to $T_D$, $P_D$ to warrant updating. Updating and monitoring routines are completed, so replacement subroutine 1 triggers the start up of the passive routines.

If replacement subroutine 2 finds no addresses in stack 322, it calculates a new set of desired operating parameter values and writes the new set over the old set.

As shown in FIG. 23, replacement subroutine 2 sends signals representative of all of the active partition sensor data from active data register 308 to the statistics package autocorrelation estimating routine. Replacement subroutine 2 also sends the desired operating parameter values (stored in register 314) to the estimating routine.

The estimating routine, using header information as to monitor, cell-unit, and sensor identity, generates statistical estimates of all six operating parameters values (P, T, pH, j, V, C) and uses them (other than j) to generate an updating correlation matrix which has as its elements the estimated correlation coefficients of all parameters (other than cell current) which were sensed by active sensors 22 in the active partition. (In the preferred embodiment all parameters are sensed in the active partition, so the updating correlation matrix has five rows and five columns). The autocorrelation estimating routine transfers the five parameter updating correlation matrix, the five corresponding desired operating parameter values, and the statistical estimate $\bar{j}$ to the matrix multiplication routine.

The matrix multiplication routine generates five of the new desired operating parameter values (all of the new desired parameter values except $j_D$) by multiplying the current desired operating parameter values ($T_D$, $P_D$, $pH_D$, $C_D$, $V_D$) by the (five by five) parameter updating correlation matrix. The elements of the product matrix are the new desired values of the operating parameters (T', P', pH', C' and V'). Each of the new values is equal to the old value ($T_D$, $P_D$, $pH_D$, $C_D$ and $V_D$) plus a small positive or negative amount, which is a numerical combination of the estimated standard deviations and covariances of all of the parameters in question. Specifically, if the current desired value of temperature is x, the new desired temperature value is:

$$x + \left[ \frac{1}{\sigma_T} \quad \frac{\sigma_{TP}}{\sigma_P} + \frac{\sigma_{TpH}}{\sigma_{pH}} + \frac{\sigma_{TC}}{\sigma_C} + \frac{\sigma_{TV}}{\sigma_V} \right].$$

The new desired value of $j_o$ is $\bar{j}$, the statistical estimate of cell current generated by the estimating routine from active sensor data.

Master control 26 then writes all six new desired operating parameter values in register 314 over the old set of desired operating parameter values. At that point, (T', P', C', pH', V', $\bar{j}$) become ($T_D$, $P_D$, $C_D$, $pH_D$, $V_D$, $j_D$). Finally, before the replacement subroutine 2 ends, it triggers the start-up of the passive routines.

The updated set set of operating parameters is be verified using a standard statistical test. The t-test is designed to determine whether, with a certain percentage of confidence, sampling error is the only reason for any numerical differences between a desired parameter value and the estimated value of that parameter from sample data. Master control 26 uses the t-test to determine whether the new updated desired operating parameter values are statistically close to the corresponding current desired operating parameter values.

Using the new desired set, the current desired set, and information obtained from the data from which the new data set was derived, master control 26 generates t-values for each operating parameter. Using a pre-determined level of confidence (typically 80%), it also chooses, from a table stored in memory, t-statistics for each operating parameter.

Master control 26 then compares each parameter's t-value to its corresponding t-statistic. If any of the t-values are greater than the corresponding t-statistic, that new desired parameter value is too far from the current desired parameter value to qualify as an updating value, and the updating procedure is terminated. If, however, all of the t-values are less then their corresponding t-statistics, the new desired operating parameter values have been verified as replacements for the desired current operating parameter values.

Returning to the preferred embodiment, the second (and each subsequent) monitoring of the passive partition is triggered by completion of one of the active routines. As described above, the initial start up of the passive routine is triggered by a signal from the partition control routine. The second and all other subsequent triggerings of the passive routine occur after one of the following events: (1) If there are no inefficient cell-units which must be switched into the passive partition and master control does not update the desired values, replacement subroutine 1 sends a signal triggering the start of the passive routines; (2) after replacement subroutine 2 updates the set of desired operating parameter values, it triggers the start of passive routines; and (3) after the active unit routine sends inefficient cell-unit addresses to the partition control routine, the partition control routine triggers the start of the passive routines.

As also occurred after the triggering of the initial passive routine, the passive routine start-up is delayed until receipt of new data into the passive data register 360. The predetermined delay, typically five minutes, is sufficiently large so that the passive monitoring is delayed until after inefficient cells are switched into the passive partition and have started the recharging procedure.

We turn now to active partition size change procedures. As the power demand on the battery increases, master control 26 reacts by increasing the numbers of cell-units in the active partition. Similarly, as power demand decreases, master control 26 reduces the size of the active partition. Such changes in the size of the active partition constitute an override feature, in that switching and recharging procedures of the partition control routine are interrupted until master control 26 completes the partition size change procedure. A detailed description of the partition size change procedures follows.

As discussed with reference to the embodiment of FIG. 1, the battery load monitor 48 monitors both the voltage and current being applied to load 16. In the preferred embodiment of FIG. 7, the changes in partition size are controlled by the routines shown in FIG. 24; viz:

1. The $V_{LOAD}$ monitor routine (FIG. 25) generates signals to increase the size of the active partition when the voltage applied to the load is decreasing rapidly.

2. The $I_{LOAD}$ monitor routine (FIG. 26) sends signals to decrease the size of the active partition when the current applied to load 16 is decreasing at a rate faster than a predetermined amount. It also sends signals to increase the size of the active partition when applied current is increasing at a rate faster than a predetermined amount. The $I_{LOAD}$ monitor also generates an emergency shutdown signal if the total amount of current being applied to the load exceeds a predetermined upper limit, typically 60-80 amps when the cell-units in the active partition are connected in series-parallel, so as to limit I but give sufficient open circuit voltage at fixed load.

3. The load monitor decision routine follows a predetermined priority procedure which chooses between the conflicting or duplicate orders which may be generated by the $I_{LOAD}$ or $V_{LOAD}$ monitor routines. The load monitor decision routine sends out intended decision signals to the active partition increase or decrease routines.

4. The active partition increase or decrease routines generate override signals and order switch control 92 to change the size of the active partition by the amounts determined by the load monitor decision routine.

The data used by the $V_{LOAD}$ and $I_{LOAD}$ monitor routines is provided by the Data Precision 1750 multimeter of load monitor 48 which measures both the amount of voltage($V_{LOAD}$) and current ($I_{LOAD}$) being applied to the battery. The multimeter reads $V_{LOAD}$ and $I_{LOAD}$ at regular time intervals and transmits the data to an EGG/PAR differentiator. The differentiator reads the incoming $V_{LOAD}$ and $I_{LOAD}$ data, then calculates and transmits dv/dt and di/dt to the monitor routines. It also transmits a signal indicative of total current.

As shown in FIG. 25, $V_{LOAD}$ monitor routine uses dv/dt to determine whether to increase the size of the active partition, comparing dv/dt to predetermined rates of change. The multimeter in load monitor 48 measures the amount of voltage ($V_{LOAD}$) being applied by the battery. At regular time intervals T* (typically one second intervals), it sends data representing the voltage (then being applied to load 16) to the differentiator.

The differentiator reads time interval T* from register 350 in load monitor 48. Using T* and voltage data, the differentiator determines the rate of change of voltage with respect to time, dv/dt. The differentiator transmits dv/dt to the $V_{LOAD}$ monitor routine.

The $V_{LOAD}$ monitor routine compares dv/dt to predetermined rates of change. If dv/dt is greater than $-0.3$ (i.e., the voltage applied to load 16 is decreasing at a rate slower than 0.3 volts/second), the $V_{LOAD}$ routine generates a decision trigger without sending a partition size change order. If voltage is decreasing at a rate faster than 0.3 volts/second but slower than 0.6 volts/second, dv/dt is less than $-0.3$ but greater than $-0.6$, and the routine generates a decision trigger and a $V_{LOAD}$ "+2" signal. If voltage is decreasing at a rate faster than 0.6 volts per second, dv/dt is less than $-0.6$, and the routine generates a decision trigger and a $V_{LOAD}$ "+4" signal.

The $I_{LOAD}$ monitor routine, shown in FIG. 26, is similar. The multimeter in load monitor 48 measures the amount of current ($I_{LOAD}$) being used by the battery. At regular time intervals T* (typically one second intervals), it transmits signal representative of that current data to the differentiator.

The differentiator reads time interval T* from register 350 in load monitor 48. Using T* and current data, the differentiator determines the rate of change of current with respect to time, di/dt. The differentiator transmits the values of the total current $I_{LOAD}$ and di/dt to the $I_{LOAD}$ monitor routine.

The $I_{LOAD}$ monitor routine first determines whether $I_{LOAD}$ is greater than 60 amps. If so, the $I_{LOAD}$ monitor generates an emergency signal to switch control 28 to takes all of the active cell units off load 16, thus completely shutting down the battery.

If $I_{LOAD}$ is less than 60 amps, the $I_{LOAD}$ monitor routine then compares di/dt to predetermined rates of change. It first determines whether current is constant, increasing or decreasing. If current is decreasing, di/dt is less than 0. If current is decreasing faster than 0.2 amps/second (i.e., if di/dt is less than $-0.2$), the routine generates a decision trigger and an $I_{LOAD}$ "$-2$" signal.

If current is constant or is changing at a very small rate (i.e., di/dt is between $-0.2$ and 0.3 amps/second), the routine sends a decision trigger but no partition size change order. If current is increasing at a rate between 0.3 and 0.6 amps/second, the routine generates a decision trigger and an $I_{load}$ "+2" signal. Finally, if current is increasing at a rate faster than 0.6 amps/second, the routine sends a decision trigger and an $I_{LOAD}$ "+4" signal.

Thus, it is to be seen that both the load and current monitor routines may generate partition size change signals, and that some decision mechanism accordingly must be provided to eliminate duplicate or conflicting signals. A description of the decision routine used follows.

As shown in FIG. 27, the decision routine is triggered by the receipt of trigger signals from the $I_{LOAD}$ and $V_{LOAD}$ monitor routines. The decision routine waits until signals have been received from both routines, and then reads the various partition size change signals (i.e., "$-2$", "+2" and "+4" signals). Using a pre-determined priority scheme, the decision routine decides whether to change partition size, and, if so, by what amount.

First, the decision routine determines whether there are any "+4 signals". If any are found, the routine generates a "+4" decision signal and transfers control to the active partition increase routine.

If the decision routine finds no "+4" signals, it determines whether there are any "+2" signals. If a "+2" signal is found, the routine generates an "+2 decision" signal and transfers control to the active partition increase routine.

If the decision routine finds no "+2" or "+4" signals, it determines whether there are any "$-2$" signals. If one is found, the routine generates a "$-2$ decision" signal and transfers control to the active partition decrease routine.

If the decision routine finds no signals at all, partition size need not be changed. The decision routine first turns off all signals and triggers, and then ends.

In tabular form, the priority scheme of the decision routine is as follows:

| $I_{LOAD}$ Signals | $V_{LOAD}$ Signals | DECISION SIGNAL |
|---|---|---|
| "$-2$" | none | "$-2$ decision" |
| none | none | none |
| "+2" | none | "+2 decision" |
| "+4" | none | "+4 decision" |
| "$-2$" | "+2" | "+2 decision" |
| none | "+2" | "+2 decision" |
| "+2" | "+2" | "+2 decision" |
| "+4" | "+2" | "+4 decision" |
| "$-2$" | "+4" | "+4 decision" |
| none | "+4" | "+4 decision" |
| "+2" | "+4" | "+4 decision" |
| "+4" | "+4" | "+4 decision" |

As indicated above, control is transferred to an active partition increase routine when the decision routine generates either a "+2 decision" or "+4 decision" signal.

The active partition increase routine which adds two cell-units to the active partition is essentially the same as the increase routine which adds four cell-units to the active partition. The routine which adds two cell-units is described below.

The receipt of a "+2 decision" signal triggers the active partition increase routine shown in FIG. 28. The increase routine turns on an override signal in order to prevent the partition control routine from executing any switching or recharging orders until the number of units in the active partition has been increased. The active partition increase routine then reads two cell-unit addresses from register 304 (which stores the addresses of passive restored units). The routine erases those two addresses from register 304 and writes them into register 302 (which stores the addresses of cell-units in the active partition).

The increase routine sends signals representative of the two addresses to switch control 92, along with instructions to switch those cell-units into the active partition. The switching occurs in the manner described above in connection with initial partitioning.

The active partition increase routine then ends, after turning off the $I_{LOAD}$ and $V_{LOAD}$ signals, triggers, the decision routine signals, and the override signal. The load monitor routines resume monitoring power demand changes, and the partition control routine returns to executing switching or recharging orders found necessary through active or passive monitoring.

The active partition size decrease routine shown in FIG. 29 is similar to the active partition size increase routine shown in FIG. 28. The receipt of a "−2 decision" signal triggers the active partition decrease routine. The decrease routine turns on an override signal in order to prevent the partition control routine from executing any switching or recharging orders until the number of units in the active partition has been decreased. The active partition decrease routine then reads two cell-unit addresses from register 302 (which stores the addresses of cell-units in the active partition) The routine erases those two addresses from register 302 and writes them into register 304 (which stores the addresses of passive restored units).

The decrease routine sends signals representative of the two addresses to switch control 92, along with instructions to switch those cell-units into the passive partition. The switching occurs in the manner described above in connection with initial partitioning. The decrease routine does not order recharging of the newly-passive cell-units because switching was ordered without monitoring and the cell-units are presumed to be capable of operating efficiently.

The decrease routine then ends after turning off the $I_{LOAD}$ and $V_{LOAD}$ signals, triggers, the decision routine signals, and the override signal. The load monitor routines resume monitoring power demand changes, and the partition control routine returns to executing switching or recharging orders found necessary through active or passive monitoring.

Other Embodiments

The system of the present invention may be said to control batteries of any type (e.g., nickel-cadmium, nickel-iron, zinc-bromide, aluminum-aluminum oxide, zinc-air, elevated lithium or high density plastic). Whatever type of battery or fuel cell is used, the construction of the monitoring system need not change, but the operating parameters and permitted differences, the basis on which the master and other controls switch, recharge and restore cells, will be based on battery type and engineering materials fabrication and design stability decisions. For example, conventional automobile lead-acid batteries typically deliver current ($j_{cell}$) of about 40 ma/cm$_2$; but the $j_{cell}$ for pasted plate lead-acid batteries of the types used in laboratory environments may vary from 3.5 to 150 ma/cm$^2$. If the system of the present invention were being used to control such a laboratory battery, $j_o$ and $\Delta j$ would obviously not be the same as in the embodiments of FIGS. 1 and 7.

Similarly different initial desired operating parameter values and allowed differences will be used in a system which controls non-lead-acid batteries. Typical desired operating parameter values and allowed first differences for nickel-cadmium cells are:

Initial Desired Operating Parameter Values

Temperature: $T_{cell}=60°-90°$ F. (Room Temp.)
Pressure: $P_{cell}=1.5$ atm.
pH: pH$=12$ ( 4N KOH); or 20% aqueous soln. 1.19 specific gravity
Voltage: $V_{cell}=1.3$ Volts
Current: $j_{cell}$(rate for 6 hrs.)$=(C/6)/$ 4 ½"$\times$5 ½" plate area (10 ma/cm$^2$)
Capacity: ($C_{cell}$)$=20$ amp-hrs.

Allowed First Differences

Temperature: $T_{cell}=0.5T=50°$ F.
Pressure: $P_{cell}=1$ atm.
pH: pH$=0.2$ (pH)$=2.4$
Capacity: $C_{cell}=0.2C=4$ amp/hrs
Voltage: $V_{cell}=0.5V$ V 0.65 (per cell)
Current: $j_{cell}=0.2$ $j_{cell}=8$ amp-hrs.

Further, and again regardless of the type of cell used, the magnitude of the particular permitted difference will vary depending on the particular control system used—a smaller permitted difference results in closer control of battery operation but requires more rapid sensing and frequent switching and, thus normally, a more complicated and expensive control system.

No matter what type of battery is being controlled, each cell-unit may contain more or fewer than 3 individual cells; sensors may be arranged within different ones of the cells in any manner that, statistically, will provide sufficient information; and master control 26 may compare sensed data using any of a number of different routines.

For example, cell switching and control in an embodiment such as that of FIG. 7 may be based on the other conjoint differences between any selected pairs of parameters. In such a case, the various pairs normally will be the pairs monitored by each type of sensor pair, e.g., a first pair will consist of cell temperature and pressure, a second pair will consist of cell pH and capacity, and a third pair will consist of cell current and voltage.

Further, rather than updating acceptable values of operating parameters in the manner previously discussed, master control 26 may store in memory a number of successive sets of values of acceptable operating parameters, each representing acceptable operating values for a successively later stage of battery life. If this is done, master control 26 will compare the sensed operating values to a first set of acceptable operating values so long as the difference between the average of each sensed value of a particular operating parameter and the respective acceptable operating value for the same parameter does not exceed the permitted difference; and will update to the next set of values of acceptable operating parameters when the difference becomes too great. Such continued stepwise updating will continue until the control system can no longer maintain the difference between sensed values and the last of the sets of acceptable values within acceptable levels, at which point master control will cause L.E.D. 98 to signal that the battery must be recharged.

An example of the successive sets of desired operating parameter values for a lead-acid battery operating at elevated temperature and pressure (in the nature of a fuel cell) and at constant voltage and capacity is as follows:

| $t_0$ | $P_0$ | $T_0$ | $J_0$ | $(ph)_0$ |
|---|---|---|---|---|
| $t_1$ | $5.33P_0$ | $4.6T_0$ | $2.0J_0$ | 1.08 |
| $t_2$ | $6.33P_0$ | $6.2T_0$ | $3.4J_0$ | 1.25 |
| $t_3$ | $6.33P_0$ | $7.2T_0$ | $5.0J_0$ | 1.50 |
| $t_4$ | $7.17P_0$ | $7.8T_0$ | $6.9J_0$ | 1.67 |
| $t_5$ | $7.50P_0$ | $8.2T_0$ | $7.0J_0$ | 2.00 |
| $t_6$ | $7.67P_0$ | $8.5T_0$ | $7.4J_0$ | 2.50 |
| $t_7$ | $7.67P_0$ | $8.5T_0$ | $6.8J_0$ | 3.00 |
| $t_8$ | $7.67P_0$ | $8.4T_0$ | $6.0J_0$ | 4.99 |
| $t_9$ | $7.5P_0$ | $8.4T_0$ | $5.4J_0$ | 4.67 |
| $t_{10}$ | $7.45P_0$ | $8.2T_0$ | $4.0J_0$ | 5.33 |
| $t_{11}$ | $7.33P_0$ | $8.1T_0$ | $3.2J_0$ | 5.83 |
| $t_{12}$ | $7.17P_0$ | $8.0T_0$ | $2.7J_0$ | 6.25 |
| $t_{13}$ | $7.08P_0$ | $7.8T_0$ | $2.4J_0$ | 6.33 |
| $t_{14}$ | $7.00P_0$ | $7.8T_0$ | $2.2J_0$ | 6.50 |
| $t_{15}$ | $7.00P_0$ | $7.6T_0$ | $2.0J_0$ | 6.54 |
| $t_{16}$ | $7.00P_0$ | $7.6T_0$ | $1.9J_0$ | 6.67 |
| $t_{17}$ | $7.08P_0$ | $7.5T_0$ | $1.8J_0$ | 6.75 |
| $t_{18}$ | $7.16P_0$ | $7.4T_0$ | $1.7J_0$ | 6.83 |
| $t_{19}$ | $7.17P_0$ | $7.3T_0$ | $1.6J_0$ | 6.92 |
| $t_{20}$ | $7.25P_0$ | $7.2T_0$ | $1.6J_0$ | 7.00 |
| $t_{21}$ | $7.33P_0$ | $7.2T_0$ | $1.5J_0$ | 7.08 |
| $t_{22}$ | $7.33P_0$ | $7.1T_0$ | $1.4J_0$ | 7.17 |
| $t_{23}$ | $7.41P_0$ | $7.0T_0$ | $1.4J_0$ | 7.17 |
| $t_{24}$ | $7.41P_0$ | $7.0T_0$ | $1.4J_0$ | 7.33 |
| $t_{25}$ | $7.41P_0$ | $6.9T_0$ | $1.3J_0$ | 7.33 |
| $t_{26}$ | $7.41P_0$ | $6.8T_0$ | $1.3J_0$ | 7.41 |
| $t_{27}$ | $7.41P_0$ | $6.8T_0$ | $1.3J_0$ | 7.50 |
| $t_{28}$ | $7.42P_0$ | $6.8T_0$ | $1.2J_0$ | 7.50 |
| $t_{29}$ | $7.45P_0$ | $6.7T_0$ | $1.2J_0$ | 7.59 |
| $t_{30}$ | $7.50P_0$ | $6.7T_0$ | $1.2J_0$ | 7.67 |
| $t_{31}$ | $7.58P_0$ | $6.6T_0$ | $1.2J_0$ | 7.67 |
| $t_{32}$ | $7.67P_0$ | $6.6T_0$ | $1.2J_0$ | 7.75 |
| $t_{33}$ | $7.67P_0$ | $6.5T_0$ | $1.1J_0$ | 7.83 |
| $t_{34}$ | $7.67P_0$ | $6.5T_0$ | $1.1J_0$ | 7.87 |
| $t_{35}$ | $7.75P_0$ | $6.4T_0$ | $1.0J_0$ | 7.92 |
| $t_{36}$ | $7.83P_0$ | $6.4T_0$ | $1.0J_0$ | 8.00 |

In this example, the sets of parameters for the 36 points lie on or closely adjacent to the operating surface and the desired operating initial operating parameters ($T_o$, $P_o$ and $j_o$) and permitted differences are the same as those previously discussed with reference to the FIG. 1 embodiment. For each successive time period, the values of the desired operating values of the pressure, temperature and cell current are expressed in terms of the initial operating parameters e.g., $P=5.33P_o$, $T=4.6T_o$, $j=2.0j_o$, $ph=1.08$) for the particular time period. The time period $t_i$ during which each set of values is used as the then-desired set of value continues so long as master control 26 determines that the difference between the average sensed values of operating parameters from the cells or cell-units and the set of desired operating parameters for the particular time period is not greater than the respective permitted differences. Master control updates from one set of values to another until the system can not longer maintain the average of the sensed values within permitted differences from the set of desired parameters for the last time period, $t_{36}$.

If the microprocessor or the like used for master control 26 is sufficiently powerful, it may perform the functions of partition switching control 92 and passive restoration control 88 also, and it may also perform many of the functions of load monitor 48. These and other embodiments are within the scope of the following claims.

What is claimed is:

1. A system for controlling the operation under load of a battery including a plurality of cell-units, said system comprising:
   a plurality of sensors adapted for connection to cell-units of said battery and arranged to sense the values of selected physical operating parameters of selected ones of said cell units;
   switches for selectively connecting each of said cell-units to one of a source of power and a load, said cell-units connected to said load comprising an active partition and said cell-units not connected to said load comprising a passive partition; and,
   a control attached to said sensors and said switches, said control being arranged to receive from said sensors data representative of sensed values of said selected physical operating parameters of selected ones of said cell-units and to switch cell-units from said active partition to said passive partition in response to said data and including means for
   (i) storing data representative of predetermined acceptable values of said selected physical operating parameters,
   (ii) comparing said data representative of predetermined acceptable values with said data representative of sensed values of said selected ones of said cell-units, and
   (iii) causing said switches to disconnect a cell-unit in said active partition from said load and switch said cell-unit into said passive partition when the difference between said data representative of sensed values of said cell-unit and said data representative of said predetermined acceptable values is greater than a predetermined acceptable difference,
   said control being arranged to receive data representative of the sensed values of at least two of the temperature, vapor pressure, capacity, pH, current and voltage of a cell-unit of said battery and to switch said cell-unit when a conjoint difference of said two differs from a predetermined standard by more than a predetermined amount.

2. The system of claim 1 wherein said control receives data representative of two selected operating parameters from each selected one of said cell-units.

3. The system of claim 1 wherein said control receives data representative of a first selected operating parameter from a first selected one of said cell-units and data representative of a second selected operating parameter from a second selected one of said cell-units.

4. The system of claim 1 wherein each of said cell-units includes a plurality of cells, and a said sensor is arranged to sense the value of at least two selected physical operating parameters of cells in each of said cell-units.

5. The system of claim 1 wherein said physical operating parameters are cell temperature, vapor pressure, pH and capacity.

6. The system of claim 5 wherein said sensors sense, and said controller stores data representative of acceptable values of said four parameters.

7. The system of claim 5 wherein said sensors sense two of said parameters of each of said selected ones of said cells.

8. The system of claim 5 wherein said sensors are arranged to sense said values of cell-units in said active partition such that each of said temperature and vapor pressure are monitored in cell-units in said active partition.

9. The system of claim 8 wherein said sensors are arranged to sense four operating parameters of cell-units in said active partition.

10. A system for controlling the operation under load of a battery including a plurality of cell-units, said system comprising:

a plurality of sensors adapted for connection to cell-units of said battery and arranged to sense the values of selected physical operating parameters of selected ones of said cell-units;

switches for selectively connecting each of said cell-units units to one of a source of power and a load, said cell-units connected to said load comprising an active partition and said cell-units not connected to said load comprising a passive partition; and, a control attached to said sensors and said switches, said control being arranged to receive from said sensors data representative of sensed values of said selected physical operating parameters of selected ones of said cell-units and to switch cell-units froms said active partition to said passive partition in response to said data and including means for (i) storing data representative of predetermined acceptable values of said selected physical operating parameters, (ii) comparing said data representative of predetermined acceptable values with said data representative of sensed values of said selected ones of said cell-units, and (iii) causing said switches to disconnect a cell-unit in said active partition from said load and switch said cell-unit into said passive partition when the difference between said data representative of sensed values of said cell-unit and said data representative of said predetermined acceptable values is greater than a predetermined acceptable difference, said sensors being arranged to sense a said value of selected ones of said cell-units of said passive partition, said cell-units in said passive partitions being connectible to said source of power, and said control including means causing said switches to connect said cell-units in said passive partition to said source of power and to disconnect a cell-unit in said passive partition from said source of power and permit said cell-unit to be switched into said active partition when the difference between said data representative of said sensed value of said cell-unit in said passive partition and said data representative of said predetermined acceptable value is less than a predetermined acceptable difference.

11. The system of claim 10 wherein said physical parameters include cell temperature, vapor pressure and capacity, and said sensors are arranged to sense said cell capacity of at least one cell-unit of said passive partition.

12. The system of claim 11 wherein each said cell-unit comprises a plurality of cells and said sensors are arranged to sense at least one of the pressure, temperature and capacity of a cell of each cell-unit.

13. The system of claim 1 wherein said physical parameters include cell temperature, vapor pressure, capacity, pH and voltage, said sensors sense at least four of said parameters, and said controller stores data representative of acceptable values of said four.

14. The system of claim 13 wherein said at least four parameters are cell temperature, vapor pressure, capacity and pH.

15. The system of claim 13 wherein said sensors include a plurality of sensor pairs of different types, a sensor pair of a first type being arranged to sense said values of a first two of said parameters, and a sensor pair of a second type arranged to sense values of a second two of said parameters.

16. The system of claim 13 wherein said sensor pairs include a sensor pair of a third type arranged to sense values of a third two of said parameters.

17. The system of claim 15 wherein each of said cell-units contains not fewer than three cells, each of said cell-units including at least one sensor pair, and different ones of said cell-units include sensor pairs of different types.

18. The system of claim 15 wherein said sensor pairs of said first type are arranged to monitor cell temperature and pressure, and said sensor pair of a second type are arranged to monitor cell capacity and another of said parameters.

19. The system of claim 18 wherein said another of said parameters is pH.

20. A system for controlling the operation under load of a battery including a plurality of cell-units, said system comprising:

a plurality of sensors adapted for connection to cell-units of said battery and arranged to sense the values of selected physical operating parameters of selected ones of said cell-units;

switches for selectively connecting each of said cell-units to one of a source of power and a load, said cell-units connected to said load comprising an active partition and said cell-units not connected to said load comprising a passive partition; and, a control attached to said sensors and said switches, said control being arranged to receive from said sensors data representative of sensed values of said selected physical operating parameters of selected ones of said cell-units and to switch cell-units froms said active partition to said passive partition in response to said data and including means for (i) storing data representative of predetermined acceptable values of said selected physical operating parameters, (ii) comparing said data representative of predetermined acceptable values with said data representative of sensed values of said selected ones of said cell-units, and (iii) causing said switches to disconnect a cell-unit in said active partition from said load and switch said cell-unit into said passive partition when the difference between said data representative of sensed values of said cell-unit and said data representative of said predetermined acceptable values is greater than a predetermined acceptable difference, said parameters including cell temperature, pressure and capacity, said sensors being arranged to sense the values of said cell temperature and pressure of selected ones of said cell-unit in said active partition and said cell capacity of selected ones of said cell-units in said passive partition, and said control comparing data representative of said sensed values of cell capacity of said cell-units in said passive partition and a desired value of cell capacity and causing said switches to disconnect a cell-unit whose cell capacity has been sensed from said source of power and permitting said cell-unit to be switched into said active partition when the difference between said cell capacity of said cell-unit and the desired value of said cell capacity is less than a predetermined difference.

21. The system of claim 20 wherein each of said cell-units contains a plurality of said cells, and each of a first group of said cell-units includes sensors arranged to sense pressure and temperature and each of a second group of said cell-units includes sensors arranged to sense pH and capacity.

22. The system of claim 1 including the steps of sensing said values and comparing said data at intervals during said operation under load.

23. The system of claim 22 wherein said values are sensed and said data are compared at regular intervals in the range of a few microseconds to about 20 minutes.

24. The system of claim 23 wherein said regular intervals are about 5 minutes.

25. The system of claim 1 wherein said control stores data representative of said predetermined acceptable difference, compares the absolute value of the difference between said data representative of said sensed value of a said cell and said data representative of said predetermined acceptable values, and causes said switches to disconnect said cell-unit when the absolute value of said predetermined acceptable difference is greater than said absolute value of said difference between.

26. The system of claim 1 wherein said source of power is at least one cell-unit of said battery forming a reserve partition but not part of either of said active and passive partitions.

27. The system of claim 26 wherein said reserve partition has not fewer than 25 percent of the total number of cells in said active and passive partitions.

28. The system of claim 1 wherein said conjoint difference is the product of differences.

29. The system of claim 1 wherein said conjoint difference is the covariance.

30. The system of claim 1 wherein said conjoint difference is the determinant of the inverse matrix of the correlation coefficient.

31. A system for controlling the operation under load of a battery including a plurality of cell-units, said system comprising:
a plurality of sensors adapted for connection to cell-units of said battery and arranged to sense the values of selected physical operating parameters of selected ones of said cell-units;
switches for selectively connecting each of said cell-units to one of a source of power and a load, said cell-units connected to said load comprising an active partition and said cell-units not connected to said load comprising a passive partition;
a control attached to said sensors and said switches, said control being arranged to receive from said sensors data representative of sensed values of said selected physical operating parameters of selected ones of said cell-units and to switch cell-units from said active partition to said passive partition in response to said data and including means for
(i) storing data representative of predetermined acceptable values of said selected physical operating parameters,
(ii) comparing said data representative of predetermined acceptable values with said data representative of sensed values of said selected ones of said cell-units, and
(iii) causing said switches to disconnect a cell-unit in said active partition from said load and switch said cell-unit into said passive partition when the difference between said data representative of sensed values of said cell-unit and said data representative of said predetermined acceptable values is greater than a predetermined acceptable difference; and,
said sensors sensing the values of at least four of the temperature, vapor pressure, capacity, pH, current and voltage of said cell-units,
said control recalculating said predetermined acceptable values of said four when said sensed values of said four differ from predetermined standards by more than a predetermined amount, and
said recalculated predetermined acceptable values of said four then being stored in place of previous stored predetermined acceptable values of said four.

32. The system of claim 10 wherein said control is responsive to data representative of sensed values of said parameters of cell-units in said passive partition and prevents said cells in said passive partition from being switched into said active partition when the difference between any of said sensed values differs from the respective one of said predetermined values by more than a said predetermined amount.

33. A system for controlling the operation under load of a battery including a plurality of cell-units, said system comprising:
plurality of sensors adapted for connection to cell-units of said battery and arranged to sense the values of selected physical operating parameters of selected ones of said cell-units;
switches for selectively connecting each of said cell-units to one of a source of power and a load, said cell-units connected to said load comprising an active partition and said cell-units not connected to said load comprising a passive partition;
a control attached to said sensors and said switches, said control being arranged to receive from said sensors data representative of sensed values of said selected physical operating parameters of selected ones of said cell-units and to switch cell-units froms said active partition to said passive partition in response to said data and including means for
(i) storing data representative of predetermined acceptable values of said selected physical operating parameters,
(ii) comparing said data representative of predetermined acceptable values with said data representative of sensed values of said selected ones of said cell-units, and
(iii) causing said switches to disconnect a cell-unit in said active partition from said load and switch said cell-unit into said passive partition when the difference between said data representative of sensed values of said cell-unit and said data representative of said predetermined acceptable values is greater than a predetermined acceptable difference; and
a recharging control connected to said cells of said reserve partition and cells of said passive partition,
said first-mentioned control being connected to said recharging control and controling connected to said recharging control and controling power flow from said cells of said reserve partition to said cells of said active partition.

34. A system for controlling the operation under load of a battery including a plurality of cell-units, said system comprising:

a plurality of sensors adapted for connection to cell-units of said battery and arranged to sense the values of selected physical operating parameters of selected ones of said cell-units;

switches for selectively connecting each of said cell-units to one of a source of power and a load, said cell-units connected to said load comprising an active partition and said cell-units not connected to said load comprising a passive partition;

a control attached to said sensors and said switches, said control being arranged to receive from said sensors data representative of sensed values of said selected physical operating parameters of selected ones of said cell-units and to switch cell-units froms said active partition to said passive partition in response to said data and including means for (i) storing data representative of predetermined acceptable values of said selected physical operating parameters, (ii) comparing said data representative of predetermined acceptable values with said data representative of sensed values of said selected ones of said cell-units, end (iii) causing said switches to disconnect a cell-unit in said active partition from said load and switch said cell-unit into said passive partition when the difference between said data representative of sensed values of said cell-unit and said data representative of said predetermined acceptable values is greater than a predetermined acceptable difference; and, cell restoration means connected to said cell-units and to said control, said restoration means including means for changing the temperature, pressure and pH of said cell-units and said control being arranged to cause said means to change selected ones of said temperature, pressure and pH of said cell-units in response to said data representative of sensed values of said cell-units.

35. The system of claim 34 wherein said control is arranged first to cause power from said source to recharge cell-units in said passive partition and thereafter to sense values of said temperature, pressure and pH of cells in said passive partition and cause said restoration means to change selected ones of said temperature, pressure and pH in response to said values sensed subsequent to said recharging.

36. The method of controlling the operation under load of a battery including a plurality of cell-units, each of said cell-units being connectible to a source of power and to a load, a first group of said cell-units being connected to said load and comprising an active partition, a second group of said cell-units not being connected to said load and being connectible to said source of power and comprising a passive partition, and said cell-units being switchable from one of said groups of the other, said method comprising the steps of;

sensing the values of selected physical operating parameters of selected ones of said cell-units, said physical operating parameters including at least two of cell temperature, pressure, pH, capacity, voltage and current, and two of said parameters of each of said selected ones of said cell-units being sensed;

storing data representative of predetermined acceptable values of said selected physical operating parameters in a memory;

comparing said data representative of predetermined acceptable values with said data representative of said sensed values of successive ones of said cell-units by determining a conjoint difference of the differences between the sensed values of two of said parameters and predetermined acceptable values of said two, determining an acceptable conjoint difference of said two, and comparing the first-mentioned conjoint difference with the acceptable conjoint difference; and, disconnecting a cell-unit of said first group from said load and switching said cell-unit into said second group when the first-mentioned conjoint difference of said data representative of said sensed values of said two of said parameters of said cell-unit is greater than the acceptable conjoint difference of said data representative of said predetermined acceptable values.

37. The method of claim 1 including the steps of sensing said values and comparing said data at intervals during said operation under load.

38. The method of claim 38 wherein said values are sensed and said data are compared at regular intervals in the range of a few microseconds to about 20 minutes.

39. The method of claim 38 wherein said regular intervals are about 5 minutes.

40. The method of claim 36 wherein said physical operating parameters are at least four of cell temperature, pressure, pH, capacity, voltage and current, and including the steps of storing data representative of acceptable values of said four and sensing two of said parameters of each of said selected ones of said cell-units.

41. The method of controlling the operation under load of a battery including a plurality of cell-units, each of said cell-units being connectible to a source of power and to a load, a first group of said cell-units being connected to said load and comprising an active partition, a second group of said cell-units not being connected to said load and being connectible to said source of power and comprising a passive partition, and said cell-units being switchable from one of said groups to the other, said method comprising the steps of;

sensing the values of selected physical operating parameters of selected ones of said cell-units, said physical operating parameters being at least four of cell temperature, pressure, pH, capacity, voltage and current, and two of said parameters of each of said selected ones of said cell-units being sensed, storing data representative of predetermined acceptable values of said four selected physical operating parameters in a memory;

comparing said data representative of predetermined acceptable values with said data representative of said sensed values of successive ones of said cell-units by determining a conjoint difference of the differences between the sensed values of two of said parameters and predetermined acceptable values of said two, determining an acceptable conjoint difference of said two, and comparing the first-mentioned joint difference with the acceptable conjoint difference; and disconnecting a cell-unit of said first group from said load and switching said cell-unit into said second group when said first mentioned conjoint difference of said said data representative of said sensed values of said two of said parameters of said cell-unit is greater than said acceptable conjoint difference of said data representative of said predetermined acceptable values of said two.

42. The method of claim 36 including the steps of sensing data representative of two selected operating characteristics of a first selected one of said cell-units and data representative of two selected operating characteristics of a second selected one of said cell-units.

43. The method of claim 42 including the step of sensing the temperature and vapor pressure of cell-units in said active partition.

44. The method of claim 43 including the step of sensing capacity of cell-units in said passive partition.

45. The method of claim 36 wherein said sensors are arranged to sense a said value of selected ones of said cell-units of said passive partition and including the steps of disconnecting a cell-unit in said passive partition from said source of power and switching said cell-unit in said passive partition into said active partition when the difference between said data representative of said sensed value of said cell-unit in said passive partition and said data representative of said predetermined acceptable value is ess than a predetermined aceptable difference.

46. The method of claim 36 wherein each of said cell-units contains a plurality of said cells, and including the steps of sensing pressure and temperature of the cell-units of the units of a first group of said cell-units and the pH and capacity of cell-units of a second group of cell-units.

47. The method of claim 36 including the steps of sensing the values of at least four of the temperature, vapor pressure, capacity, pH, current and voltage of said cell-units, recalculating said predetermined acceptable values when said sensed values of said four differ from predetermined standards by more than a predetermined amount, and then storing said recalculated predetermined acceptable values in place of previous stored predetermined acceptable values.

48. The method of claim 41 wherein said conjoint difference is a product of differences.

49. The method of claim 41 wherein said conjoint difference is the covariance.

50. The method of claim 41 wherein said conjoint difference is the determinant of the inverse matrix of the correlation coefficient.

51. The method of controlling the operation under load of a battery including a plurality of cell-units, each of said cell-units being connectible to a source of power and to a load, a first group of said cell-units being connected to said load and comprising an active partition, a second group of said cell-units not being connected to said load and being connectible to said source of power and comprising a passive partition, and said cell-units being switchable from one of said groups to the other, said method comprising the steps of:

sensing the values of selected physical operating parameters of selected ones of said cell-units;

storing data representative of predetermined acceptable values of said selected phyical operating parameters in a memory;

comparing said data representative of predetermined acceptable values with said data representative of said sensed values of successive ones of said cell-units; and, disconnecting a cell-unit of said first group from said load and switching said cell-unit into said second group when the difference between said data representative of said sensed values of said cell-unit and said data representative of said predetermined acceptable values is greater than a predetermined acceptable difference, the values of selected physical operating parameters of cell-units in said passive partition being sensed and said data representative of predetermined acceptable values being compared with said data representative of said sensed values of said cell-units in said passive partition prior to comparing said data representative of sensed values of cell-units in said active partitions with said data representative of acceptable values.

52. The method of claim 36 including the steps of determining the likely cell capacity of cell-units in said passive partition and comparing data representative of said likely cell capacity with data representative of a predetermined acceptable value of cell capacity.

53. The method of claim 52 wherein said likely cell capacity is an average cell capacity determined from sensed values of cell capacity of all cell-units in said passive partition that includes sensors for determining the cell capacity.

54. The method of controlling the operation under load of a battery including a plurality of cell-units, each of said cell-units being connectible to a source of power and to a load, a first group of said cell-units being connected to said load and comprising an active partition, a second group of said cell-units not being connected to said load and being connectible to said source of power and comprising a passive partition, and said cell-units being switchable from one of said groups to the other, said method comprising the steps of:

sensing the values of selected physical operating parameters of selected ones of said cell-units;

storing data representative of predetermined acceptable values of said selected physical operating parameters in a memory;

comparing said data representative of predetermined acceptable values with said data representative of said sensed values of successive ones of said cell-units;

disconnecting a cell-unit of said first group from said load and switching said cell-unit into said second group when the difference between said data representative of said sensed values of said cell-unit and said data representative of said predetermined acceptable values is greater than a predetermined acceptable difference, determining the likely cell capacity of cell-units in said passive partition and comparing data representative of said likely cell capacity with data representative of a predetermined acceptable value of cell capacity; and, recharging all cell-units in said passive partition from a set of reserve cell-units of said battery if the difference between said likely cell capacity and said predetermined acceptable value is greater than a predetermined difference.

55. The method of controlling the operation under load of a battery including a plurality of cell-units, each of said cell-units being connectible to a source of power and to a load, a first group of said cell-units being connected to said load and comprising an active partition, a second group of said cell-units not being connected to said load and being connectible to said source of power and comprising a passive partition, and said cell-units being switchable from one of said groups to the other, said method comprising the steps of:

sensing the values of selected physical operating parameters of selected ones of said cell-units;

storing data representative of predetermined acceptable values of said selected physical operating parameters in a memory;

comparing said data representative of predetermined acceptable values with said data representative of said sensed values of successive ones of said cell-units;

disconnecting a cell-unit of said first group from said load and switching said cell-unit into said second group when the difference between said data representative of said sensed values of said cell-unit and said data representative of said predetermined acceptable values is greater than a predetermined acceptable difference, determining the likely cell capacity of cell-units in said passive partition and comparing data representative of said likely cell capacity with data representative of a predetermined acceptable value of cell capacity; and, sensing at least one of the temperature, vapor pressure and pH of each cell-unit in said passive partition if the difference between said likely cell capacity and said predetermined acceptable value is less than a predetermined difference, and thereafter adjusting the said temperature, vapor pressure and pH of any cell-unit if the difference between data representative of the sensed value of said temperature, vapor pressure or pH of said any cell-unit and a predetermined acceptable value of said temperature, vapor pressure or pH is greater than a respective predetermined difference.

56. The method of controlling the operation under load of a battery including a plurality of cell-units, each of said cell-units being connectible to a source of power and to a load, a first group of said cell-units being connected to said load and comprising an active partition, a second group of said cell-units not being connected to said load and being connectible to said source of power and comprising a passive partition, and said cell-units being switchable from one of said groups to the other, said method comprising the steps of:

sensing the values of selected physical operating parameters of selected ones of said cell-units;

storing data representative of predetermined acceptable values of said selected physical operating parameters in a memory;

comparing said data representative of predetermined acceptable values with said data representative of said sensed values of successive ones of said cell-units;

disconnecting a cell-unit of said first group from said load and switching said cell-unit into said second group when the difference between said data representative of said sensed values of said cell-unit and said data representative of said predetermined acceptable values is greater than a predetermined acceptable difference, determining the likely cell capacity of cell-units in said passive partition and comparing data representative of said likely cell capacity with data representative of a predetermined acceptable value of cell capacity; and sensing at least two of the temperature, vapor pressure, pH and cell capacity of each cell-unit in said passive partition if the difference between said likely cell capacity and said predetermined acceptable value is less than a predetermined difference, determining whether the determinant of the inverse of the correlation matrix of data representative of the sensed values of all values sensed by sensors of said each cell-unit is less than a predetermined value, and, if so, thereafter correcting said parameters the sensed values of which are less than acceptable predetermined values.

57. The method of claim 56 wherein said predetermined value to which said determinant is compared is in the range of 0.1 to 0.3.

58. The method of controlling the operation under load of a battery including a plurality of cell-units, each of said cell-units being connectible to a source of power and to a load, a first group of said cell-units being connected to said load and comprising an active partition, a second group of said cell-units not being connected to said load and being connectible to said source of power and comprising a passive partition, and said cell-unit being switchable from one of said groups to the other, said method comprising the steps of:

sensing the values of selected physical operating parameters of selected ones of said cell-units;

storing data representative of predetermined acceptable values of said selected physical operating parameters in a memory;

comparing said data representative of predetermined acceptable values with said data representative of said sensed values of successive ones of said cell-units, disconnecting a cell-unit of said first group from said load and switching said cell-unit into said second group when the difference between said data representative of said sensed values of said cell-unit and said data representative of said predetermined acceptable values is greater than a predetermined acceptable difference; and, sensing the cell capacity of each cell unit in said passive partition to determine the likely cell capacity of cell-units in said passive partition considering the passive partition as a whole and thereafter monitoring said cell-units in said passive partition individually by comparing data representative of sensed values of at least two of the temperature, vapor pressure, pH and cell capacity of each cell unit in said passive partition to data representative of acceptable values of said two.

59. The method of controlling the operation under load of a battery including a plurality of cell-units, each of said cell-units being connectible to a source of power and to a load, a first group of said cell-units being connected to said load and comprising an active partition, a second group of said cell-units not being connected to said load and being connectible to said source of power and comprising a passive partition, and said cell-units being switchable from one of said groups to the other, said method comprising the steps of:

sensing the values of selected physical operating parameters of selected ones of said cell-units;

storing data representative of predetermined acceptable values of said selected physical operating parameters in a memory;

comparing said data representative of predetermined acceptable values with said data representative of said sensed values of successive ones of said cell-units; and, disconnecting a cell-unit of said first group from said load and switching said cell-unit into said second group when the difference between said data representative of said sensed values of said cell-unit and said data representative of said predetermined acceptable values is greater than a predetermined acceptable difference, said predetermined acceptable difference being in the range of 0.1 to 0.3 of the determinant of the inverse correlation matrix of the difference between data representative of the sensed values of operating parameters of said cell unit and data representative of acceptable values of the same operating parameters as those sensed in said cell unit.

60. The method of controlling the operation under load of a battery including a plurality of cell-units, each of said cell-units being connectible to a source of power and to a load, a first group of said cell-units being connected to said load and comprising an active partition, a second group of said cell-units not being connected to said load and being connectible to said source of power and comprising a passive partition, and said cell-units being switchable from one of said groups to the other, said method comprising the steps of:

sensing the values of selected physical operating parameters of selected ones of said cell-units;

storing data representative of predetermined acceptable values of said selected physical operating parameters in a memory;

comparing said data representative of predetermined acceptable values with said data representative of said sensed values of successive ones of said cell-units, disconnecting a cell-unit of said first group from said load and switching said cell-unit into said second group when the difference between said data representative of said sensed values of said cell-unit and said data representative of said predetermined acceptable values is greater than a predetermined acceptable difference; and, determining a new set of predetermined acceptable values of said operating parameters based on said sensed values of said operating parameters and replacing said previous predetermined acceptable values of said operating parameters with said new set.

61. The method of claim 60 including the steps of determining said new set after the difference between the temperature of cell-units in the passive partition and the previous predetermined acceptable value of cell temperature is greater than a predetermined fraction of the permitted difference between said temperature and the acceptable value of said temperature.

62. The method of claim 60 wherein said new set is determined by (i) determining statistical estimates of said operating parameters, (ii) generating a correlation matrix from said statistical estimates, and (iii) multiplying each of said previous acceptable values by said correlation matrix.

63. The method of claim 62 wherein said operating parameters are cell temperature, pressure, pH, capacity and voltage.

64. The method of claim 63 including the step of providing a new acceptable value/of cell current by determining a statistical estimate of said cell current.

65. The method of claim 36 including the step of sensing the power applied to said load and varying the number of cell-units in said active partition in response to changes in said power applied to said load.

66. The method of controlling the operation under load of a battery including a plurality of cell-units, each of said cell-units being connectible to a source of power and to a load, a first group of said cell-units being connected to said load and comprising an active partition, a second group of said cell-units not being connected to said load and being connectible to said source of power and comprising a passive partition, and said cell-units being switchable from one of said groups to the other, said method comprising the steps of:

sensing the values of selected physical operating parameters of selected ones of said cell-units;

storing data representative of predetermined acceptable values of said selected physical operating parameters in a memory;

comparing said data representative of predetermined acceptable values with said data representative of said sensed values of successive ones of said cell-units, disconnecting a cell-unit of said first group from said load and switching said cell-unit into said second group when the difference between said data representative of said sensed values of said cell-unit and said data representative of said predetermined acceptable values is greater than a predetermined acceptable difference; and sensing the value of one of the current and voltage applied to said load, and varying the number of cell-units in said active partition when said one is changing at faster than a predetermined rate.

67. The method of claim 66 including the step of increasing the number of cell-units in said active partition when said current applied to said load is increasing at faster than a predetermined rate or said voltage applied to said load is decreasing at faster than a predetermined rate.

68. The method of claim 66 including the step of decreasing the number of cell-units in said active partition when said current applied to said load is decreasing at faster than a predetermined rate.

69. The method of claim 66 including the step of sensing said power applied to said load and varying the number of cells in said active partition in response to changes in said load prior to switching any cell-units from one of said partitions to the other of said partitions in response to differences between sensed values of said operating parameters and acceptable values of said operating parameters.

70. The method of claim 36 including the step of sensing the cell capacity of all of said cell-units having sensors for sensing cell capacity and generating a signal when said sensed cell capacity is less than a predetermined fraction of the original cell capacity of said cell-units.

71. The method of claim 70 wherein said fraction is 0.25.

72. The method of claim 36 including the step of sensing the temperature and pressure of all cell-units in said active partition having sensors for sensing temperature and pressure.

73. A method for controlling the operation of a battery comprising a plurality of cell-units, each of said plurality being selectively connectible into one of a first (active) partition of cell-units under load and a second (passive) partition of cell-units not under load, said battery having sensors for monitoring the conditions of physical operating parameters distributed among the cell-units, said operating parameters, said sensors including cell temperature, pressure, pH and capacity and said method comprising the steps of:

at intervals, sensing the value of one or more of said physical operating parameters for cell-units of active partition;

for each sensed operating parameter comparing said sensed value with a predetermined acceptable value, said comparing including generating measures of conjoint differences between said operating parameter values, one of said sets being generated using said sensed and said predetermined acceptable values, and the other of said sets being generated using predetermined acceptable differences between said sensed and said acceptable values; and comparing said sets to determine whether the difference therebetween is acceptable;

for each sampled cell-unit, switching said cell-unit from said active partition to said passive partition if said difference therebetween is not acceptable.

74. The method of claim 73 including the step of maintaining said cell-unit under load in response to said comparing if said differences therebetween based on the sensed operating parameters of said cell-unit are acceptable.

75. A system for controlling the operation under load of a battery including a plurality of cell-units, said system comprising:

a plurality of sensors adapted for connection to cell-units of said battery and arranged to sense the values of of the temperature, pressure, pH and capacity of select ones of said cell-units, each of said cell-units including sensors arranged to sense the values of a selected two of said temperature, pressure, pH and capacity;

switches for selectively connecting each of said cell-units to one of a source of power and a load, said cell-units connected to said load comprising an active partition and said cells not connected to said load comprising a passive partition; and, a control attached to said sensors and said switches, said control being arranged to receive from said sensors data representative of sensed values of said temperature, pressure, pH and capacity of cell-units in said active partition, to switch cell-units from said active partition to said passive partition in response to said data, and including means for (i) storing data representative of predetermined acceptable values of said temperature, pressure, pH and capacity, (ii) comparing said data representative of predetermined acceptable values with said data representative of sensed values of said cell-units in said active partition, (iii) calculating new acceptable values of said parameters when the differences between said data representative of said sensed values and said data representative of said predetermined acceptable values exceed a first predetermined difference and replacing said predetermined acceptable values with said new acceptable values, and, (iv) causing said switches to disconnect a cell-unit in said active partition from said load and switch said cell-unit into said passive partition when the difference between said data representative of the sensed values of said cell-unit and said data representative of acceptable values is greater than a second predetermined acceptable difference.

76. The system of claim 75 wherein said first predetermined difference is greater than said second predetermined difference.

77. The system of claim 75 wherein said control compares said data representative of predetermined acceptable values of said capacity, pH, temperature and pressure of cell-units in said active partition with data representative of predetermined acceptable values of said parameters and permits said switches to switch a cell-unit in said passive partition from said source of power into said active partition when the difference between said data representative of sensed values of said cell-unit is greater than said second predetermined acceptable difference.

78. The system of claim 75 wherein said source of power is a plurality of cell-unit of said battery.

79. The method of claim 36 wherein said data representative of said sensed values is data representative of estimated values of the operating parameters of a said cell unit, said estimated values being statistically generated based on values of said operating parameters sensed by said sensors.

80. The method of claim 36 wherein said control stores data representative of the value of all of said parameters at essentially the same moment of time in a memory, generates a matrix including data representative of all of said parameters at said moment, and monitors a said cell unit by comparing data representative of the value of the said parameters sensed in said cell unit at said moment with data representative of said matrix.

81. The method of claim 36 including the step of disconnecting a cell-unit of said first group based at least in part on a said comparing of data representative of said sensed values of a different cell-unit.

82. The method of claim 36 including the steps of sensing the temperature and pressure of each cell unit in said active partition to determine a likely cell temperature and a likely cell pressure of cell-units in said active partition considering said active partition as a whole and thereafter monitoring said cell-units in said active partition individually by comparing data representative of the sensed values of at least two of the operating parameters of each cell-unit in said active partition to data representative of acceptable values of said two.

83. The method of claim 40 including the step of comparing the sensed value of each of said two of said parameters with the predetermined acceptable value of each of said two of said parameters prior to determining said conjoint differences.

* * * * *

UNITED STATES PATENT OFFICE
CERTIFICATE OF CORRECTION

Patent No. 4,564,798          Dated January 14, 1986

Inventor(s) James E. Young

It is certified that error appears in the above-identified patent and that said Letters Patent are hereby corrected as shown below:

Column 9, line 7 "$(P_D, T_d$ " should be --$(P_D, T_D$--

Column 17, line 36 "$\Delta P$" should be --$\widetilde{\Delta P}$--
           line 36 "$0.2\widetilde{P_0}$" should be --$0.2P_0$--
           line 37 "$0.025pH$" should be --$0.25pH$--
Column 20, line 50 "$|/ -P_D|$" should be -- $|\widetilde{P-P_D}|$ --
           line 52 "less than$\Delta T$" should be --less than$\widetilde{\Delta T}$--
Column 21, lines 46 and 47 "values of T and $\widetilde{P}$" should be
                           --values of $\widetilde{T}$ and P--
Column 27, line 23 "$\Delta C$" should be --$\widetilde{\Delta C}$--
           line 32 no period at end of paragraph
           line 65 no period after "addresses"
Column 28, line 26 no period after "$(pH-pH_D)$"
Column 32, line 11 "$\Delta T$ and $\Delta P$" should be --$\widetilde{\Delta T}$ and $\Delta P$--
           line 19 "$\Delta T, \Delta P$" should be --$\widetilde{\Delta T}, \widetilde{\Delta P}$--
           line 26 "$(\Delta T)$" should be --$(\widetilde{\Delta T})$--
           line 27 "$(\Delta P)$" should be --$(\widetilde{\Delta P})$--
Column 37, line 63 "$ma/cm_2$" should be --$ma/cm^2$--
Column 45, line 23 "end" should be --and--
Column 50, line 13 "cell-unit" should be --cell-units--
Column 51, line 1 "difference" should be --differences--
           line 53 "value/of" should be -- value of--
Column 54, line 19 "cell-unit" should be --cell-units--

Signed and Sealed this

Twenty-eighth Day of October, 1986

[SEAL]

Attest:

DONALD J. QUIGG

Attesting Officer      Commissioner of Patents and Trademarks